US008593932B2

(12) United States Patent
Laroia et al.

(10) Patent No.: US 8,593,932 B2
(45) Date of Patent: Nov. 26, 2013

(54) EFFICIENT SIGNAL TRANSMISSION METHODS AND APPARATUS USING A SHARED TRANSMISSION RESOURCE

(75) Inventors: Rajiv Laroia, Baking Ridge, NJ (US); Hui Jin, Clinton, NJ (US); Tom Richardson, South Orange, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1077 days.

(21) Appl. No.: 11/370,204

(22) Filed: Mar. 7, 2006

(65) Prior Publication Data

US 2006/0203713 A1 Sep. 14, 2006
US 2010/0278034 A9 Nov. 4, 2010

Related U.S. Application Data

(63) Continuation-in-part of application No. 10/640,718, filed on Aug. 13, 2003.

(60) Provisional application No. 60/659,539, filed on Mar. 8, 2005, provisional application No. 60/471,000, filed on May 16, 2003.

(51) Int. Cl.
*H04B 14/04* (2006.01)
*H04B 7/165* (2006.01)

(52) U.S. Cl.
USPC .............................. 370/203; 375/242; 455/23

(58) Field of Classification Search
USPC ......... 370/203–215, 310, 312, 316, 318, 328, 370/329, 342–345, 477–480; 375/130, 141, 375/219, 224, 242, 244, 259–274, 295, 300, 375/308, 316, 340, 341, 346–348; 455/23, 455/42, 44, 59–62, 67.16, 73, 102–110, 450
See application file for complete search history.

(56) References Cited

U.S. PATENT DOCUMENTS 4,679,244 A 7/1987 Kawasaki et al.
4,833,701 A 5/1989 Comroe et al.
(Continued)

FOREIGN PATENT DOCUMENTS

CA 2442400 A1 11/2002
DE 2330263 1/1975
(Continued)

OTHER PUBLICATIONS

Notification of Transmittal of The International Search Report and The Written Opinion of The International Searching Authority with International Search Report and Written Opinion, pp. 1-11, dated Jul. 4, 2006, from PCT/US2006/008010.

(Continued)

*Primary Examiner* — Chi Pham
*Assistant Examiner* — Prince A Mensah
(74) *Attorney, Agent, or Firm* — Joseph B. Agusta

(57) ABSTRACT

A device includes a zero symbol rate (ZSR) coding/modulation module and a second type coding/modulation module. Both modules generate modulation symbols to be conveyed using the same air link resources but with the non-zero ZSR symbols having a higher power level. The ZSR module generates a mixture of zero and non-zero modulation symbols. A ZSR modulation scheme communicates information using both the position of the non-zero modulation symbols and the phase and/or amplitude of the non-zero modulation symbols. Different ZSR schemes, implementing different ratios relating the number of zero symbols to the total number of symbols, can be associated with different low data rates while second module modulation schemes can be associated with different high data rates. Modulation symbols from two modules are in some embodiments, superimposed. In some embodiments, non-zero ZSR modulation symbols punch out second module modulation symbols which occupy the same air link resource.

63 Claims, 24 Drawing Sheets

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |
| 5,267,261 A | 11/1993 | Blakeney, II et al. | |
| 5,311,543 A | 5/1994 | Schreiber | |
| 5,325,432 A | 6/1994 | Gardeck et al. | |
| 5,369,781 A | 11/1994 | Comroe et al. | |
| 5,387,905 A | 2/1995 | Grube et al. | |
| 5,420,909 A | 5/1995 | Ng et al. | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'dea et al. | |
| 5,513,381 A | 4/1996 | Sasuta | |
| 5,542,108 A | 7/1996 | Sasuta | |
| 5,566,366 A | 10/1996 | Russo et al. | |
| 5,590,396 A | 12/1996 | Henry | |
| 5,594,948 A | 1/1997 | Talarmo et al. | |
| 5,610,559 A | 3/1997 | Dent | |
| 5,623,511 A * | 4/1997 | Bar-David et al. | 375/143 |
| 5,625,882 A | 4/1997 | Vook et al. | |
| 5,627,882 A | 5/1997 | Chien et al. | |
| 5,634,197 A | 5/1997 | Paavonen | |
| 5,710,982 A | 1/1998 | Laborde et al. | |
| 5,720,455 A | 2/1998 | Kull et al. | |
| 5,771,224 A * | 6/1998 | Seki et al. | 370/206 |
| 5,809,401 A | 9/1998 | Meidan et al. | |
| 5,809,419 A | 9/1998 | Schellinger et al. | |
| 5,815,531 A | 9/1998 | Dent | |
| 5,831,479 A | 11/1998 | Leffel et al. | |
| 5,867,060 A | 2/1999 | Burkett, Jr. et al. | |
| 5,884,196 A | 3/1999 | Lekven et al. | |
| 5,923,651 A | 7/1999 | Struhsaker | |
| 5,982,760 A | 11/1999 | Chen | |
| 5,991,635 A | 11/1999 | Dent et al. | |
| 5,999,818 A | 12/1999 | Gilbert et al. | |
| 6,021,123 A | 2/2000 | Mimura | |
| 6,078,815 A | 6/2000 | Edwards | |
| 6,108,542 A | 8/2000 | Swanchara et al. | |
| 6,108,560 A | 8/2000 | Navaro et al. | |
| 6,125,148 A | 9/2000 | Frodigh et al. | |
| 6,125,150 A | 9/2000 | Wesel et al. | |
| 6,160,791 A | 12/2000 | Bohnke | |
| 6,167,270 A | 12/2000 | Rezaiifar et al. | |
| 6,185,259 B1 * | 2/2001 | Dent | 375/261 |
| 6,201,785 B1 | 3/2001 | Fouche et al. | |
| 6,222,851 B1 | 4/2001 | Petry | |
| 6,226,280 B1 | 5/2001 | Roark et al. | |
| 6,230,022 B1 | 5/2001 | Sakoda et al. | |
| 6,239,690 B1 | 5/2001 | Burbidge et al. | |
| 6,243,584 B1 | 6/2001 | O'byrne | |
| 6,259,685 B1 | 7/2001 | Rinne et al. | |
| 6,266,529 B1 | 7/2001 | Chheda | |
| 6,275,712 B1 | 8/2001 | Gray et al. | |
| 6,307,849 B1 | 10/2001 | Tiedemann, Jr. | |
| 6,308,080 B1 | 10/2001 | Burt et al. | |
| 6,321,095 B1 | 11/2001 | Gavette | |
| 6,334,047 B1 | 12/2001 | Andersson et al. | |
| 6,347,081 B1 | 2/2002 | Bruhn | |
| 6,377,803 B1 | 4/2002 | Ruohonen | |
| 6,385,261 B1 | 5/2002 | Tsuji et al. | |
| 6,396,803 B2 | 5/2002 | Hornsby et al. | |
| 6,400,703 B1 | 6/2002 | Park et al. | |
| 6,408,038 B1 | 6/2002 | Takeuchi | |
| 6,424,678 B1 | 7/2002 | Doberstein et al. | |
| 6,442,152 B1 | 8/2002 | Park et al. | |
| 6,456,604 B1 | 9/2002 | Lee et al. | |
| 6,456,627 B1 | 9/2002 | Frodigh et al. | |
| 6,470,030 B1 | 10/2002 | Park et al. | |
| 6,473,624 B1 | 10/2002 | Corbett et al. | |
| 6,496,543 B1 | 12/2002 | Zehavi | |
| 6,498,934 B1 | 12/2002 | Muller | |
| 6,538,985 B1 | 3/2003 | Petry et al. | |
| 6,546,252 B1 | 4/2003 | Jetzek et al. | |
| 6,553,019 B1 | 4/2003 | Laroia et al. | |
| 6,563,881 B1 * | 5/2003 | Sakoda et al. | 375/260 |
| 6,574,211 B2 | 6/2003 | Padovani et al. | |
| 6,587,510 B1 | 7/2003 | Minami et al. | |
| 6,609,008 B1 | 8/2003 | Whang et al. | |
| 6,611,506 B1 | 8/2003 | Huang et al. | |
| 6,657,988 B2 | 12/2003 | Toskala et al. | |
| 6,661,771 B1 | 12/2003 | Cupo et al. | |
| 6,690,936 B1 | 2/2004 | Lundh | |
| 6,694,147 B1 | 2/2004 | Viswanath et al. | |
| 6,721,289 B1 | 4/2004 | O'toole et al. | |
| 6,731,939 B1 | 5/2004 | Watanabe et al. | |
| 6,765,893 B1 | 7/2004 | Bayley | |
| 6,788,963 B2 | 9/2004 | Laroia et al. | |
| 6,799,038 B2 | 9/2004 | Gopikanth | |
| 6,801,759 B1 | 10/2004 | Saifuddin | |
| 6,804,521 B2 | 10/2004 | Tong et al. | |
| 6,904,283 B2 | 6/2005 | Li et al. | |
| 6,952,454 B1 | 10/2005 | Jalali et al. | |
| 6,961,569 B2 | 11/2005 | Raghuram et al. | |
| 6,961,582 B2 | 11/2005 | Su et al. | |
| 6,961,595 B2 | 11/2005 | Laroia et al. | |
| 6,967,937 B1 | 11/2005 | Gormley | |
| 6,978,149 B1 | 12/2005 | Morelli et al. | |
| 6,999,799 B1 | 2/2006 | Almassy | |
| 7,029,511 B2 | 4/2006 | Ichikawa et al. | |
| 7,054,296 B1 | 5/2006 | Sorrells et al. | |
| 7,069,319 B2 | 6/2006 | Zellner et al. | |
| 7,085,595 B2 | 8/2006 | Kitchin | |
| 7,123,662 B2 | 10/2006 | Li et al. | |
| 7,142,864 B2 | 11/2006 | Laroia et al. | |
| 7,143,299 B1 | 11/2006 | Rubinstein et al. | |
| 7,158,804 B2 | 1/2007 | Kumaran et al. | |
| 7,162,265 B2 | 1/2007 | Ormson et al. | |
| 7,203,158 B2 | 4/2007 | Oshima et al. | |
| 7,209,524 B2 | 4/2007 | Chen | |
| 7,218,948 B2 | 5/2007 | Laroia et al. | |
| 7,257,103 B2 | 8/2007 | Yeh et al. | |
| 7,269,145 B2 | 9/2007 | Koo et al. | |
| 7,277,498 B2 * | 10/2007 | Hanaoka et al. | 375/316 |
| 7,295,840 B2 | 11/2007 | Ormson | |
| 7,302,227 B2 | 11/2007 | Sakoda | |
| 7,317,750 B2 | 1/2008 | Shattil | |
| 7,318,185 B2 | 1/2008 | Khandani et al. | |
| 7,321,569 B2 | 1/2008 | Takagi et al. | |
| 7,356,103 B2 | 4/2008 | Nishikawa | |
| 7,362,736 B2 | 4/2008 | Suzuki | |
| 7,363,039 B2 | 4/2008 | Laroia et al. | |
| 7,391,819 B1 | 6/2008 | von der Embse | |
| 7,398,111 B2 | 7/2008 | Laroia et al. | |
| 7,403,472 B2 | 7/2008 | Okada et al. | |
| 7,411,895 B2 | 8/2008 | Laroia et al. | |
| 7,420,939 B2 | 9/2008 | Laroia et al. | |
| 7,450,926 B2 | 11/2008 | Chang et al. | |
| 7,480,234 B1 | 1/2009 | Hart et al. | |
| 7,512,424 B2 | 3/2009 | Hossain et al. | |
| 7,522,553 B2 | 4/2009 | Kang et al. | |
| 7,522,672 B2 | 4/2009 | Saed | |
| 7,542,437 B1 | 6/2009 | Redi et al. | |
| 7,558,572 B2 | 7/2009 | Anigstein | |
| 7,587,001 B2 | 9/2009 | Hazani et al. | |
| 7,620,021 B1 | 11/2009 | Chen et al. | |
| 7,620,395 B2 | 11/2009 | Yamashita et al. | |
| 7,627,770 B2 | 12/2009 | Jones | |
| 7,652,978 B2 | 1/2010 | Kim et al. | |
| 7,653,035 B2 | 1/2010 | Lin et al. | |
| 7,668,573 B2 | 2/2010 | Laroia et al. | |
| 7,706,456 B2 | 4/2010 | Laroia et al. | |
| 7,720,112 B2 | 5/2010 | Morris | |
| 7,746,896 B2 | 6/2010 | Venkatachalam | |
| 7,778,643 B2 | 8/2010 | Laroia et al. | |
| 7,817,996 B2 | 10/2010 | Brunner | |
| 7,925,291 B2 | 4/2011 | Anigstein et al. | |
| 8,099,099 B2 | 1/2012 | Laroia et al. | |
| 8,315,662 B2 | 11/2012 | Anigstein et al. | |
| 8,374,613 B2 | 2/2013 | Laroia et al. | |

| | | |
|---|---|---|
| 2001/0031639 A1 | 10/2001 | Makipaa |
| 2002/0012334 A1 | 1/2002 | Strawczynski et al. |
| 2002/0031189 A1 | 3/2002 | Hiben et al. |
| 2002/0077152 A1 | 6/2002 | Johnson et al. |
| 2002/0090942 A1 | 7/2002 | Karabinis et al. |
| 2002/0136157 A1 | 9/2002 | Takaoka et al. |
| 2002/0145985 A1 | 10/2002 | Love et al. |
| 2002/0172165 A1 | 11/2002 | Rosen et al. |
| 2003/0037033 A1 | 2/2003 | Nyman et al. |
| 2003/0053524 A1 | 3/2003 | Dent |
| 2003/0086379 A1 | 5/2003 | Terry et al. |
| 2003/0086381 A1 | 5/2003 | Terry et al. |
| 2003/0090993 A1 | 5/2003 | Sato |
| 2003/0117969 A1 | 6/2003 | Koo et al. |
| 2003/0152059 A1 | 8/2003 | Odman |
| 2003/0189997 A1* | 10/2003 | Shanbhag et al. ............ 375/348 |
| 2003/0232619 A1 | 12/2003 | Fraser |
| 2004/0005904 A1 | 1/2004 | Wolf et al. |
| 2004/0062274 A1 | 4/2004 | Hakansson et al. |
| 2004/0097231 A1 | 5/2004 | Marque-Pucheu |
| 2004/0100897 A1 | 5/2004 | Shattil |
| 2004/0116110 A1 | 6/2004 | Amerga et al. |
| 2004/0184567 A1 | 9/2004 | McDonough et al. |
| 2004/0189603 A1 | 9/2004 | Arrigo et al. |
| 2004/0203727 A1 | 10/2004 | Abiri et al. |
| 2004/0203838 A1 | 10/2004 | Joshi et al. |
| 2004/0219925 A1 | 11/2004 | Ahya et al. |
| 2004/0224684 A1 | 11/2004 | Dorsey et al. |
| 2004/0229625 A1* | 11/2004 | Laroia et al. .................. 455/450 |
| 2005/0002326 A1* | 1/2005 | Ling et al. ..................... 370/208 |
| 2005/0002461 A1* | 1/2005 | Giannakis et al. ............ 375/259 |
| 2005/0002463 A1* | 1/2005 | Sakamoto ..................... 375/260 |
| 2005/0018784 A1* | 1/2005 | Kurobe et al. ................. 375/260 |
| 2005/0047357 A1 | 3/2005 | Benveniste |
| 2005/0049013 A1 | 3/2005 | Chang et al. |
| 2005/0054302 A1* | 3/2005 | Hanaoka et al. ............ 455/67.16 |
| 2005/0058089 A1* | 3/2005 | Vijayan et al. ................ 370/312 |
| 2005/0058115 A1 | 3/2005 | Levin et al. |
| 2005/0105593 A1* | 5/2005 | Dateki et al. .................. 375/130 |
| 2005/0118981 A1 | 6/2005 | Laroia et al. |
| 2005/0136960 A1 | 6/2005 | Timus et al. |
| 2005/0153751 A1 | 7/2005 | Bultan et al. |
| 2005/0176436 A1* | 8/2005 | Mantravadi et al. .......... 455/450 |
| 2005/0181799 A1 | 8/2005 | Laroia et al. |
| 2005/0233710 A1 | 10/2005 | Lakkis et al. |
| 2006/0023666 A1 | 2/2006 | Jalali et al. |
| 2006/0080344 A1 | 4/2006 | McKibben et al. |
| 2006/0087993 A1 | 4/2006 | Sengupta et al. |
| 2006/0093067 A1 | 5/2006 | Jalali et al. |
| 2006/0114813 A1 | 6/2006 | Seki et al. |
| 2006/0172747 A1 | 8/2006 | Mohammed |
| 2006/0194577 A1 | 8/2006 | Su |
| 2006/0203713 A1 | 9/2006 | Laroia et al. |
| 2006/0246840 A1 | 11/2006 | Borowski et al. |
| 2006/0262739 A1 | 11/2006 | Ramirez et al. |
| 2006/0269005 A1 | 11/2006 | Laroia et al. |
| 2007/0025283 A1* | 2/2007 | Koslov ........................... 370/316 |
| 2007/0042775 A1 | 2/2007 | Umatt et al. |
| 2007/0082696 A1 | 4/2007 | Wang |
| 2007/0173202 A1 | 7/2007 | Binder et al. |
| 2007/0189259 A1 | 8/2007 | Sollenberger et al. |
| 2007/0201346 A1 | 8/2007 | Geile et al. |
| 2007/0207815 A1 | 9/2007 | Alfano et al. |
| 2007/0223365 A1 | 9/2007 | Tsfaty et al. |
| 2007/0230403 A1 | 10/2007 | Douglas et al. |
| 2007/0242764 A1 | 10/2007 | Anigstein et al. |
| 2007/0259673 A1 | 11/2007 | Willars et al. |
| 2007/0286080 A1 | 12/2007 | Kim et al. |
| 2007/0291728 A1 | 12/2007 | Dalsgaard et al. |
| 2008/0027586 A1 | 1/2008 | Hern et al. |
| 2008/0046132 A1 | 2/2008 | Dalsgaard et al. |
| 2008/0101268 A1 | 5/2008 | Sammour et al. |
| 2008/0102880 A1 | 5/2008 | Gholmieh et al. |
| 2008/0123576 A1 | 5/2008 | Son et al. |
| 2008/0130543 A1 | 6/2008 | Singh et al. |
| 2008/0165698 A1 | 7/2008 | Dalsgaard et al. |
| 2008/0182580 A1 | 7/2008 | Laroia et al. |
| 2008/0212710 A1 | 9/2008 | Boehlke et al. |
| 2008/0261530 A1 | 10/2008 | Gerstenberger et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2009/0005095 A1 | 1/2009 | Chun et al. |
| 2009/0122736 A1 | 5/2009 | Damnjanovic et al. |
| 2009/0245241 A1 | 10/2009 | Martin |
| 2009/0274084 A1 | 11/2009 | Terry et al. |
| 2009/0296662 A1 | 12/2009 | Laroia et al. |
| 2010/0027502 A1 | 2/2010 | Chen et al. |
| 2010/0029212 A1 | 2/2010 | Malladi et al. |
| 2010/0093363 A1 | 4/2010 | Malladi |
| 2010/0130220 A1 | 5/2010 | Laroia et al. |
| 2010/0182942 A1 | 7/2010 | Kim et al. |
| 2010/0234059 A1 | 9/2010 | Yang et al. |
| 2010/0262404 A1 | 10/2010 | Bertness |
| 2010/0267420 A1 | 10/2010 | Chou |
| 2011/0142150 A1 | 6/2011 | Anigstein et al. |
| 2011/0195697 A1 | 8/2011 | Kim et al. |
| 2013/0150055 A1 | 6/2013 | Laroia et al. |

FOREIGN PATENT DOCUMENTS

| | | |
|---|---|---|
| EP | 0923202 | 6/1999 |
| EP | 0961515 A1 | 12/1999 |
| EP | 0986278 A1 | 3/2000 |
| EP | 1022920 A2 | 7/2000 |
| EP | 1079578 | 2/2001 |
| EP | 1361686 | 11/2003 |
| EP | 1499144 A1 | 1/2005 |
| EP | 1592176 A1 | 11/2005 |
| JP | 06511371 | 12/1994 |
| JP | 8162998 | 6/1996 |
| JP | 10112695 | 4/1998 |
| JP | 10135893 A | 5/1998 |
| JP | 10313286 | 11/1998 |
| JP | 11178050 | 7/1999 |
| JP | 11196043 | 7/1999 |
| JP | 2001111522 | 4/2001 |
| JP | 2005260906 A | 9/2005 |
| KR | 2000011693 | 2/2000 |
| KR | 100414932 B1 | 12/2003 |
| RU | 2122288 | 11/1998 |
| RU | 2168277 | 5/2001 |
| RU | 2005102111 | 10/2005 |
| TW | 200415887 | 8/2004 |
| TW | 200421801 | 10/2004 |
| WO | WO95012297 | 5/1995 |
| WO | WO9626620 A1 | 8/1996 |
| WO | WO9627993 A1 | 9/1996 |
| WO | WO9712475 A1 | 4/1997 |
| WO | WO97046038 | 12/1997 |
| WO | WO9938278 | 7/1999 |
| WO | WO0010353 A1 | 2/2000 |
| WO | WO0038457 A1 | 6/2000 |
| WO | WO0054542 | 9/2000 |
| WO | WO0067394 A2 | 11/2000 |
| WO | WO0074292 | 12/2000 |
| WO | WO03001726 | 1/2003 |
| WO | WO03065628 | 8/2003 |
| WO | WO2004071020 A1 | 8/2004 |
| WO | WO2004075442 | 9/2004 |
| WO | WO2004098093 A1 | 11/2004 |
| WO | WO 2004/105337 | 12/2004 |
| WO | WO2005020490 | 3/2005 |

OTHER PUBLICATIONS

International Preliminary Report on Patentability, pp. 1-5, dated Feb. 9, 2007, from PCT US2006/008010.

Cover, T.M. "Broadcast Channels" IEEE Transactions on Information Theory, IEEE Inc., New York, US, vol. IT-18, No. 1, Jan. 1972, pp. 2-14, XP000760860, ISSN: 0018-9448.

ETSI TS123 122 v7.3.0: Digital cellular telecommunications system (Phase 2+); Universal Mobile Telecommunications System (UMTS); Non-Access-Stratum (NAS) functions related to Mobile Station (MS) in idle mode (3GPP TS 23.122 version 7.3.0 Release 7); ETSI Standards, European Telecommunication Standards Institute, Sophia-Antipolis Cedex, FR, (Sep. 2005), XP014032445.

(56) References Cited

OTHER PUBLICATIONS

Goldsmith, Andrea. "Multiuser Capacity of Cellular Time-Varying Channels," Signals, Systems and Computers; 1994. 1994 Conference Record of the Twenty-Eighth Asilomar Conference in Pacific Grove, CA, USA Oct. 31-Nov. 2, 1994, Los Alamitos, CA, USA, IEEE Comput. Soc, US, vol. 1, pp. 83-88, XP010148618 ISBN: 978-0-8186-6405-2, p. 85, left-hand column.

Jianming, Zhu et al.: "Ergodic Capacities for Downlink of MC-CDMA System with Different Detection and Resource Allocation Strategies," Conference Record of the 36TH Asilomar Conference on Signals, Systems, & Computers. Pacific Grove, CA, Nov. 3-6, 2002; [Asilomar Conference on Signals, Systems and Computers], New York, NY IEEE, US, vol. 2, pp. 1458-1462, XP010638439, ISBN: 978-0-7803-7576-5, p. 1461, right-hand column, paragraph 1.

Pradhan, S. Sandeep et al.: "Efficient Layered Video Delivery Over Multicarrier Systems Using Optimized Embedded Modulation," Image Processing, 1997. Proceedings, International Conference on Santa Barbara, CA, USA Oct. 26-29, 1997, Los Alamitos, CA, USA, IEEE Comput. Soc, US, vol. 3, pp. 452-455, XP010253736, ISBN: 978-0-8186-8183-7, p. 452, right-hand column, paragraphs 1,2 and p. 454, section 3.3.

Supplementary European Search Report—EP03818352, Search Authority—The Hague Patent Office, Dec. 16, 2010.

European Search Report—EP12001311—Search Authority—Berlin—Apr. 11, 2012.

Taiwan Search Report—TW095107785—TIPO—Jan. 31, 2012.

\* cited by examiner

| 1ST USER EXEMPLARY SCENARIOS | NUMBER OF MINIMUM TRANSMISSION UNITS (MTUs) IN A SUB-SEGMENT | NUMBER OF NON-ZERO QPSK MOD. SYMBOLS IN SUB-SEGMENT | NSR | NUMBER OF CODED BITS CONVEYED IN SUB-SEGMENT BY POSTION OF NON-ZERO MODULATION SYMBOL(S) IN SUB-SEGMENT | NUMBER OF CODED BITS CONVEYED IN SUB-SEGMENT BY PHASE OF NON-ZERO MODULATION SYMBOL(S) IN SUB-SEGMENT | NUMBER OF CODED BITS CONVEYED IN SUB-SEGMENT | MAX BPM | NUMBER OF POTENTIAL CODED BITS USING STANDARD QSPK WITH A NON-ZERO QSPK MODULATION SYMBOL IN EACH MTU OF THE SUB-SEGMENT BASED ON SUB-SEGMENT SIZE (2CODED BITS/MOD. SYMBOL SLOT) (n) |
|---|---|---|---|---|---|---|---|---|
| 1 | 2 | 1 | .5 | 1 | 2 | 3 | 1.5 | 4 |
| 2 | 4 | 1 | .75 | 2 | 2 | 4 | 1.0 | 8 |
| 3 | 8 | 7 | .125 | 3 | 14 | 17 | 2.125 | 16 |
| 4 | 4 | 3 | .25 | 2 | 6 | 8 | 2.0 | 8 |
| 5 | 8 | 1 | .875 | 3 | 2 | 5 | .625 | 16 |

FIGURE 7

| | DATA RATE OPTION | NUMBER OF FRAMES | NUMBER OF INFORMATION BITS (k) | CODEWORD LENGTH | CODING RATE (APPROXIMATE) | MODULATION SCHEME | FIRST/SECOND USER |
|---|---|---|---|---|---|---|---|
| | \multicolumn{7}{c}{EXEMPLARY DATA RATE OPTIONS AVAILABLE FOR A DOWNLINK TRAFFIC SEGMENT} | | | | | | |
| 1504 → | 0 | 1 | 224 | 672 | 0.333 | (3/4 ZSR QPSK) | FIRST |
| 1506 → | 1 | 2 | 432 | 672 | 0.642 | (3/4 ZSR QPSK) | FIRST |
| 1508 → | 2 | 3 | 640 | 1008 | 0.634 | (1/2 ZSR QPSK) | FIRST |
| 1510 → | 3 | 4 | 848 | 1344 | 0.631 | QPSK | SECOND |
| 1512 → | 4 | 5 | 1056 | 2624 | 0.402 | QAM16 | SECOND |
| 1514 → | 5 | 6 | 1264 | 2624 | 0.482 | QAM16 | SECOND |
| 1516 → | 6 | 8 | 1680 | 2624 | 0.640 | QAM16 | SECOND |
| 1518 → | 7 | 10 | 2096 | 3936 | 0.533 | QAM64 | SECOND |
| 1520 → | 8 | 12 | 2512 | 3936 | 0.638 | QAM64 | SECOND |
| 1522 → | 9 | 14 | 2928 | 5248 | 0.558 | QAM256 | SECOND |
| 1524 → | 10 | 18 | 3760 | 5248 | 0.716 | QAM256 | SECOND |

FIGURE 15

EFFICIENT SIGNAL TRANSMISSION METHODS AND APPARATUS USING A SHARED TRANSMISSION RESOURCE

RELATED APPLICATION

The present application claims the benefit of U.S. Provisional Patent Application Ser. No. 60/659,539 which was filed on Mar. 8, 2005, and which is hereby expressly incorporated by reference and is a continuation-in-part of U.S. patent application Ser. No. 10/640,718, filed Aug. 13, 2003 which claims the benefit of U.S. Provisional Patent Application Ser. No. 60/471,000 filed May 16, 2003.

FIELD OF THE INVENTION

The present invention relates to methods and apparatus for efficient use of air link resources for signaling, and more particularly to methods and apparatus for efficient superposition signaling in a wireless communications system.

BACKGROUND

In wireless multiple access communications systems, a limited amount of available air link resources, e.g., bandwidth over time, needs to be shared among a plurality of users. A fixed amount of air link resources may be reserved for downlink traffic channel signaling, which is allocated to wireless terminals, e.g., on a per segment basis by a base station scheduler. A base station acting as a point of network attachment for wireless terminals located within its wireless coverage area, e.g., designated sector and/or cell, is limited in the number of active uses which can be serviced to receive downlink traffic channel signals over a given time interval. Such limitations are based on the number and capacity of traffic channel segments available within the given time interval to assign to users. Other factors contributing to user capacity include channel conditions and levels of interference in the system. In some embodiments, for convenience of assignment and to reduce overhead signaling associated with assignment, each of the downlink traffic channel segments include a fixed number of minimum transmission units (MTUs), e.g., the same fixed number of MTUs, that may be used to convey modulation signals. For a given downlink traffic channel segment of fixed size, the number of information bits that can be communicated in a given downlink traffic channel segment is a function of the coding rate selected and the modulation scheme used, e.g., QSPK, QAM16, QAM64 for the segment.

In order to increase the number of active users supported in a sector or cell by a base station point of network attachment, some systems employ superposition signaling, where for a given MTU or set of MTUs, high power signaling is directed to a first user or group of users and low power signaling directed to a second user or group of users, both signals being communicated simultaneously using the same air link resources. The implementation of superposition signaling tends to create interference problems.

Typically, at any given time in a communications system, there is a wide variation of user requests and/or requirements, in terms of downlink traffic channel signaling needs. Some users, e.g., users downloading large data files, video images, programs, etc., may have large amounts of information bits or frames of information bits to receive and would be well served by large size traffic channel segments using block encoding. Other users, e.g., a user receiving a packet of voice information or a short message, may need to receive only a small amount of information bits at one time and would be better served if the downlink traffic channel segment size and coded block size were small. A user may have been receiving a large information bit stream and efficiently utilizing air link resources, but now only requires a small number of addition bits to be communicated to complete the transmission. Typically unused information bit capacity within a coded downlink traffic channel segment may be padded with known values, e.g., zeros, to complete the coding block. However, such implementations waste the air link resource and create unnecessary interference.

Time constraints on the downlink data may also be an important consideration when scheduling users. For example, some users, e.g., in voice applications such as VoIP, may only require small amounts of data to be intermittently transmitted in the downlink; however, the delivery of each small amount of data is timing critical. Some existing downlink traffic channel segment structures, e.g., implementations structured to efficiently communicate data such as, e.g., text or video, may not efficiently facilitate such an embodiment. For example, each downlink traffic channel segment may be structured to include many MTUs to support data applications; however, a typical block of voice information bits to be communicated at one time may be significantly smaller than the number of information bit locations of the downlink traffic channel segment. Timing constraints on the block of voice bits may preclude grouping multiple blocks of voice bits into a single downlink traffic channel segment. Also, the frequent request for downlink traffic channel segments by the voice users may have a tendency to monopolize the available downlink transmission slots and lower the overall system downlink user data throughput.

In addition, at different times, the same wireless terminal may have different downlink data requirements, e.g., as it switches between user applications, digests received data, proceeds to input data to be communicated on the uplink, etc.

In view of the above discussion, it is clear that a need exists for more efficient apparatus and methods to use air link resources for downlink traffic channel signaling in wireless communications systems supporting a plurality of users with a wide range of varying resource needs. Methods and apparatus that allow for both low data rate users and high data rate users to co-exist and share the air link resources, with each employing a coding and modulation technique which efficiently utilizes resources would be beneficial. Techniques which reduce the amount of wasted resource due to unused excessive information bit capacity in segments would also be beneficial. Resource efficient superposition signaling techniques which limit the amount of superimposed signals transmitted within a segment where possible thus limiting interference, yet allowing for the number of active user supported to be increased would also be beneficial.

SUMMARY

Various embodiments are directed to method and apparatus for implementing superposition coding. The method and apparatus of various embodiments are well suited for use in, for example, base stations. While the superposition techniques of various embodiments can be used with a variety of encoding methods and different type of transmission signals, various embodiments are directed to OFDM applications. The methods of various embodiments are well suited for downlink signaling applications. In some such embodiments, a communications device, e.g., a base station, implements encoding and modulation and then transmits signals in, e.g., transmission segments, which may be received by one or more wireless terminals.

In various embodiments, two or more different sets of data are transmitted using the same communications segment. At least one set is coded and/or modulated to have a zero symbol rate of at least a minimum zero symbol rate which may be predetermined based on a variety of factors such as the coding, modulation and/or number of information bits corresponding to the first data set which are communicated using a minimum transmission unit. In various embodiments, for a given bits per minimum transmission unit, the number of zero modulation symbols generated from the set of data is forced to satisfy a minimum requirement. Thus, a modulation symbol stream generated from the first set of data, using a encoding method such as QPSK, will have a predictable minimum number of zero modulation symbols on average. In some embodiments, the first set of data is communicated using a combination of phase and position coding with the position of non-zero modulation symbols communicating at least some information in the first set of data with phase and/or amplitude modulation being used to communicate additional information included in the first set of data.

In accordance with various embodiments, modulation symbols generated from a second set of data are transmitted in the same communications segment as the modulation symbols corresponding to the first set of data. The non-zero modulation symbols corresponding to the first and second sets of data are transmitted at different power levels. The non-zero modulation symbols corresponding to the first set of data are transmitted at a higher power level than the non-zero modulation symbols corresponding to the second set of data.

As part of the transmission process, the first and second modulation symbol streams are combined.

The methods and apparatus of various embodiments are well suited for use in base stations, e.g., wherein different sets of data are to be transmitted to different user devices having different power requirements for successful reception.

The transmission methods and apparatus of various embodiments may, but need not be, implemented in base stations. Various embodiments are directed, in addition to transmission method and apparatus, to data storage devices, e.g., memory devices, which store one or more routines which can be used to implement one or more steps as well as circuits, e.g., integrated circuit chips, which can be used to implement one or more modules or apparatus.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 7 is a table summarizing exemplary embodiments of FIG. 6.

FIG. 15 is a table illustrating exemplary data rate options for a downlink traffic channel segment in an exemplary system.

DETAILED DESCRIPTION

Figure 1:
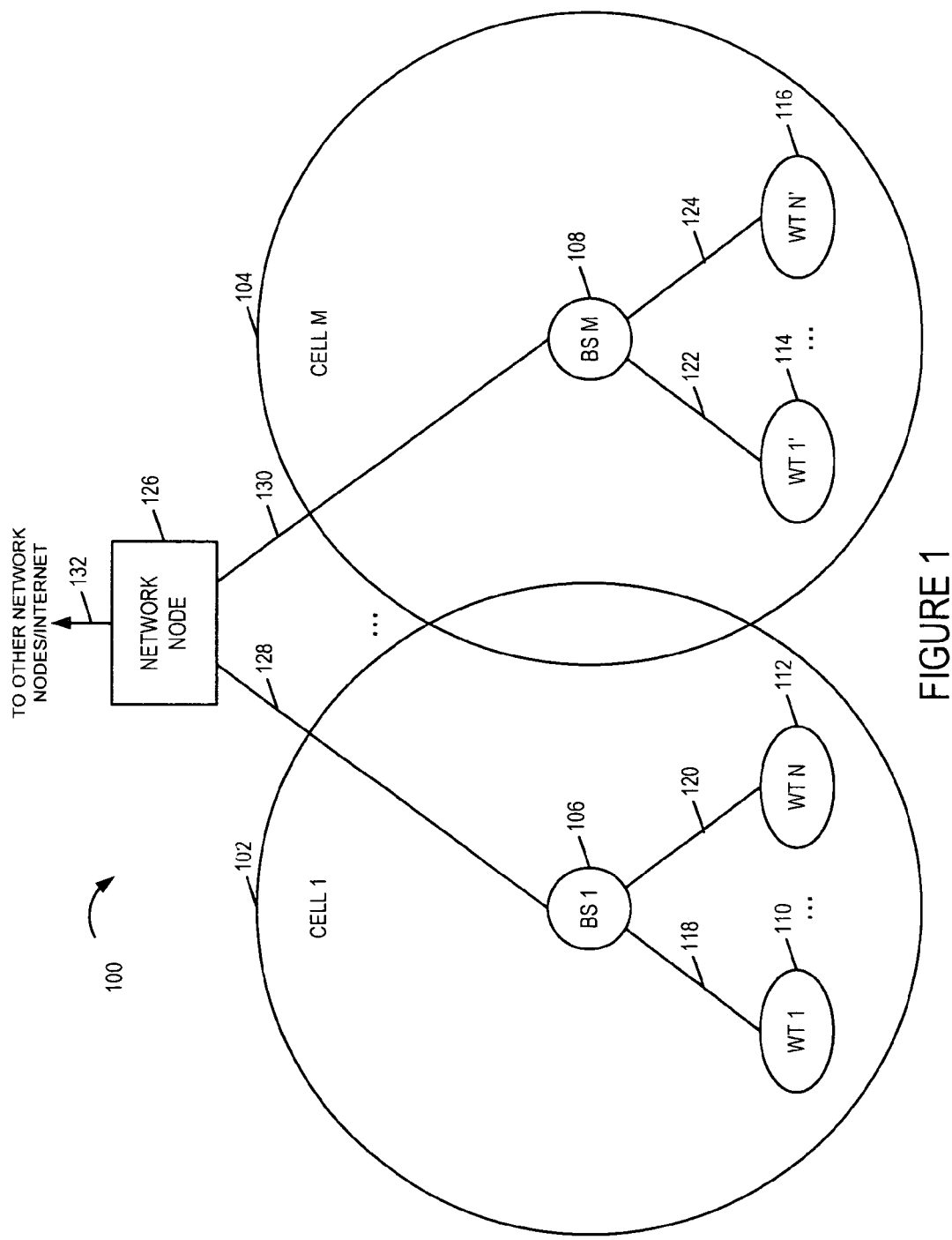
FIG. 1 is a drawing of an exemplary communications system.

FIG. 1 is a drawing of an exemplary communications system 100. System 100 includes apparatus and methods directed to efficiently utilizing downlink traffic channel air link resources. Exemplary system 100 may be, e.g., an orthogonal frequency division multiplexing (OFDM) multiple access wireless communication system using superposition signaling in the downlink. System 100 includes a plurality of cells (cell 1 102, cell M 104). Each cell (cell 1 102, cell M 104) represents a wireless coverage area for a corresponding base station (BS 1 106, BS M 108), respectively. A plurality of wireless terminal (WTs) (WT 1 110, WT N 112, WT 1' 114, WT N' 116) are included in system 100. At least some of the WTs are mobile nodes (MNs); the MNs may move throughout the system 100. Each WT (110, 112, 114, 116) may establish a wireless link with the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 is shown having cells with one sector per cell. The methods and apparatus are also applicable in systems having more than one sector per cell, e.g., 2, 3, or more than 3 sectors per cell and in systems having different numbers of sectors per cell in different portions of the system. In addition, the methods and apparatus are also applicable to many non-cellular wireless communications systems including at least one base station and a plurality of wireless terminals.

Figure 2:
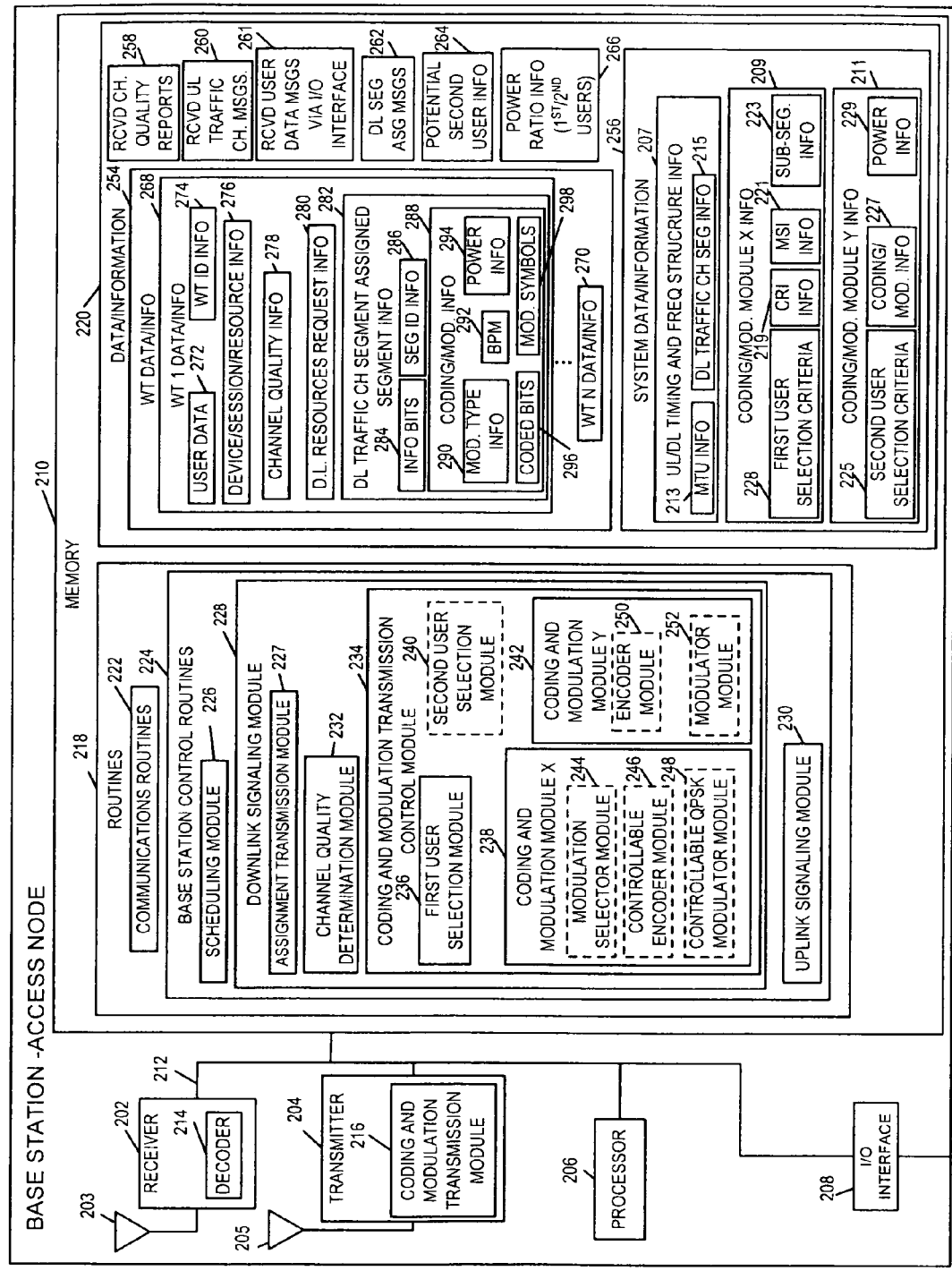
FIG. 2 is a drawing of an exemplary base station.

FIG. 2 is a drawing of an exemplary base station 200. Exemplary BS 200 is sometimes referred to as an access node. BS 200 may be any of the BS (106, 108) of system 1100 of FIG. 1. Exemplary BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Receiver 202 includes a decoder 214 for decoding received encoded uplink signals. Received encoded uplink signals may include requests for uplink traffic channel resources, channel quality report feedback messages, and uplink traffic channel signals.

Transmitter 204 is coupled to transmit antenna 205 over which downlink signals, e.g., pilot signals, beacon signals, assignment messages, downlink traffic channel signals, are sent to a plurality of wireless terminals. Transmitter 204 includes a coding and modulation transmission module 216. Coding and modulation transmission module 216 supports superposition signaling. Coding and modulation transmission module 216 can code and module information bits corresponding to a first selected user and a second selected user, combine the information and transmit the combined superposed signal over the same downlink traffic channel segment air link resource.

I/O interface 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells.

Memory 210 includes routines 218 and data/information 220. The processor 206, e.g., a CPU, executes the routines 218 and uses the data/information 220 in memory 210 to operate the BS 200 and implement methods.

Routines 218 include communications routines 222 and base station control routines 224. The communications routines 222 implement various communications protocols used by BS 200. The base station control routines 224 control the operation of BS 200 including receiver 202 operation, transmitter 204 operation, I/O interface 208 operation, and the implementation of methods. Base station control routines 224 include a scheduling module 226, downlink signaling module 228 and uplink signaling module 230.

Downlink signaling module 228 includes a channel quality determination module 232, an assignment transmission module 227, and a coding and modulation transmission control module 234. The coding and modulation transmission module 234 includes a first user selection module 236, a coding and modulation module X 238, a second user selection module 240, and a coding and modulation module Y 242.

The scheduling module 226, e.g., a scheduler, schedules uplink and downlink channel air link resources, e.g., segments, to wireless terminal users. Scheduler 226 operations include assigning downlink traffic channel segments to specific wireless terminals from a plurality of wireless terminal in accordance with a scheduling policy. Scheduler 226 operating in coordination with first user selection module 236 and second user selection module 240 may schedule the same downlink traffic channel segment to two users, different information being communicated for each of the two users.

Downlink signaling module 228 controls operation of the transmitter 204 and its coding and modulation transmission module 216 to transmit downlink signals including downlink traffic segment assignment messages 262 and downlink traffic channel signals including superposed signals. Channel quality determination module 232 determines, for each WT 300 under consideration, communications channel quality between the base station 200 and wireless terminal 300 (See FIG. 3), e.g., based on received channel quality feedback reports 258 from WTs 300.

Assignment transmission module 227 generates assignment messages and controls the transmission of the generated assignment messages, the generated assignment messages including assignment information for downlink traffic channel segments. At least some of the assignment information indicates a first wireless terminal to which a corresponding downlink traffic channel segment is assigned for use in receiving a first set of data and a second wireless terminal to which the same downlink traffic channel segment is assigned for use in receiving a second set of data. For example, the first set of data is data directed to a first user, the first set of data being conveyed by a combination of zero and non-zero QPSK modulation symbols using a zero symbol rate coding and modulation scheme of coding and modulation module X 238; the second set of data is data directed to a second user, the second set of data being conveyed by modulation symbols, e.g., QPSK, QAM16, QAM64, or QAM256 modulation symbols from coding and modulation module Y 242.

Coding and modulation transmission module 234 controls the operation of the coding and modulation transmission module 216. First user selection module 236 selects users to be assigned as first users for specific downlink traffic channel segments, the information to be conveyed to first users being coded and modulated by coding and modulation module X 238. In some embodiments, the amount of information bits that can be conveyed in a given downlink traffic channel segment for a first type user is less than the amount of information bits that can be conveyed in the same downlink traffic channel segment for a second type user. First user selection module 236 selects first type users as a function of the amount of information to communicate over a given time interval. For example, a typical selected first type user for a given segment may have a small amount of user data/information to receive in the downlink at the present time, and if such a user were assigned as a second type user for the given traffic channel segment, some of the available information bit locations of the segment would not be required and would be padded, e.g., with zeros, wasting the air link resource. Coding and modulation module X 238 includes a modulation selector module 244, a controllable encoder module 246, and a controllable QPSK modulator module 248. Modulation selector module 244 receives a Bits per MTU (BPM) value or an indicator of a BPM value, e.g., a data rate indicator value indicating a number of frames of information bits to be transmitted in a segment with each frame having a fixed number of information bits, for a selected first user, and the modulation selector module 244 generates: (i) a coding rate indicator (CRI) signal directed to the controllable encoder module 246 and (ii) a modulation scheme indicator (MSI) directed to the controllable QPSK modulation module 248. The coding rate indicator indicates a number of input information bits and a corresponding number of coded bits to be produced from the indicated number of input bits, e.g., for each segment. Controllable encoder module 246 receives an uncoded information bit stream, and a coding rate indicator, both inputs corresponding to a selected first user. The controllable encoder module 246 performs block encoding on the number of received information bits (k) to be communicated in the segment generating a number of coded bits (n). The controllable encoder 246 groups the coded bit stream into subsets of coded bits, each subset of bits to be communicated in a sub-segment, and forwards the coded bits to the controllable QPSK modulator module 248. In some embodiments, some of the coded bits of a sub-segment correspond to a symbol energy level pattern for the sub-segment and other coded bits of a sub-segment correspond to values conveyed on modulation symbols which are generated. The modulation scheme indicator (MSI) indicates which one of a plurality of zero symbol rate QPSK modulation schemes to be used to modulate coded bits. In some embodiments each of the possible zero symbol rate QPSK modulation schemes corresponds to a different number of zero MTU fractions. For example, a first modulation scheme may include one zero modulation symbol and one non-zero QPSK modulation symbol per sub-segment, with each sub-segment including two MTUs; a second modulation scheme may include three zero modulation symbols and one non-zero QPSK modulation symbol per sub-segment with each sub-segment including four MTUs, and a third modulation scheme may include seven zero modulation symbols and one non-zero QPSK modulation symbol per sub-segment, with each sub-segment including eight MTUs. Some different QPSK zero symbol rate modulation schemes may have different numbers of sub-segments per segment. Some different QPSK zero symbol rate modulation schemes may have the same number of sub-segments per segment, e.g., with different number of non-zero QPSK modulation symbols per sub-segment. Controllable QPSK modulation module 248 receives a MSI from the modulation selector module 244 and coded bits from the controllable encoder module 246, and generates a set of QPSK modulation symbols for each sub-segment of the segment, each set of modulation symbols including at least some zero modulation symbols, the number of zero modulation symbols divided by the number of MTUs per sub-segment being a function of the MSI. The location of non-zero modulation symbols within the sub-segment and the values of the non-zero modulation symbols, generated by controllable QPSK modulator module 248, conveying the coded bits corresponding to the first user's information bits.

Second user selection module 240 selects users to be assigned as second users for specific downlink traffic channel segments, the information to be conveyed to second users being coded and modulated by coding and modulation module Y 242. Second user selection module 240 selects a second user for a downlink traffic channel segment, from a plurality of potential second users, as a function of: (i) the potential second user profile information, e.g., channel conditions and modulation symbol power levels, and (ii) power levels of the non-zero QSPK modulation symbols of the first user previously assigned to the same downlink traffic channel segment. For example, in the selection process for a downlink traffic channel segment, the second user selection module 240 may determine a ratio of the selected first user non-zero modulation symbol power level to the power level of modulation symbols associated with a potential second user such that for a potential second user to be acceptable the ratio should exceed a predetermined threshold which is greater than the minimum acceptable threshold expected to be required so that the first user should be able to successfully detect the first user modulation signal, e.g., a 3 dB or 5 dB margin. The second user selection module 240 controls the direction of an uncoded information bit stream corresponding to the second user to the coding and modulation module Y 242 and sends an indicator signal to the coding and modulation module Y 242 indicating the BPM, which is a measure of the data rate, and power level to be used for encoding and modulation of the second user information bit stream. For example, the coding and modulation module Y 242 may support at a plurality of different data rates levels which can be selected, each data rate corresponding to a modulation scheme, e.g., conventional QPSK, QAM 16, QAM64, QAM256, a coding rate, and an associated modulation symbol power level. Coding and modulation module Y 242 includes an encoder module 250 and a modulator module 252. The encoder module 250 encodes an information bit set, e.g., to be conveyed in a segment, into a set of coded bits, the pattern of coded bits indicating a codeword. The output from encoder module 250, coded bits, is directed to modulator module 252 which modulates the coded bit values onto the modulation symbols, e.g., QAM 16 or QAM 64 or QAM 256 modulation symbols, according to the selected modulation scheme, e.g., conventional QPSK, QAM 16 or QAM 64 or QAM 256 at the specified power level.

Figure 4:
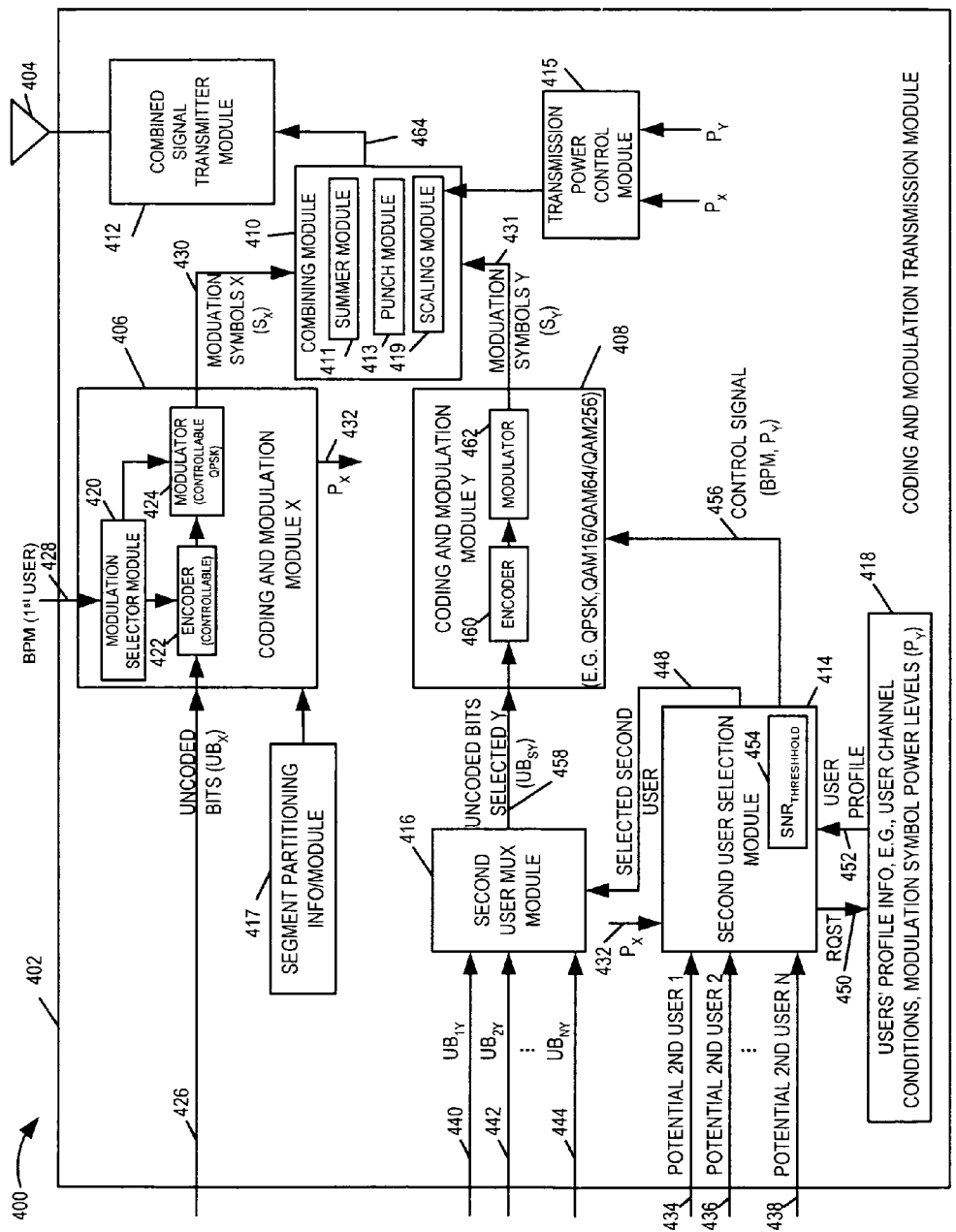
FIG. 4 is a drawing of an exemplary coding and modulation transmission module.
Figure 5:
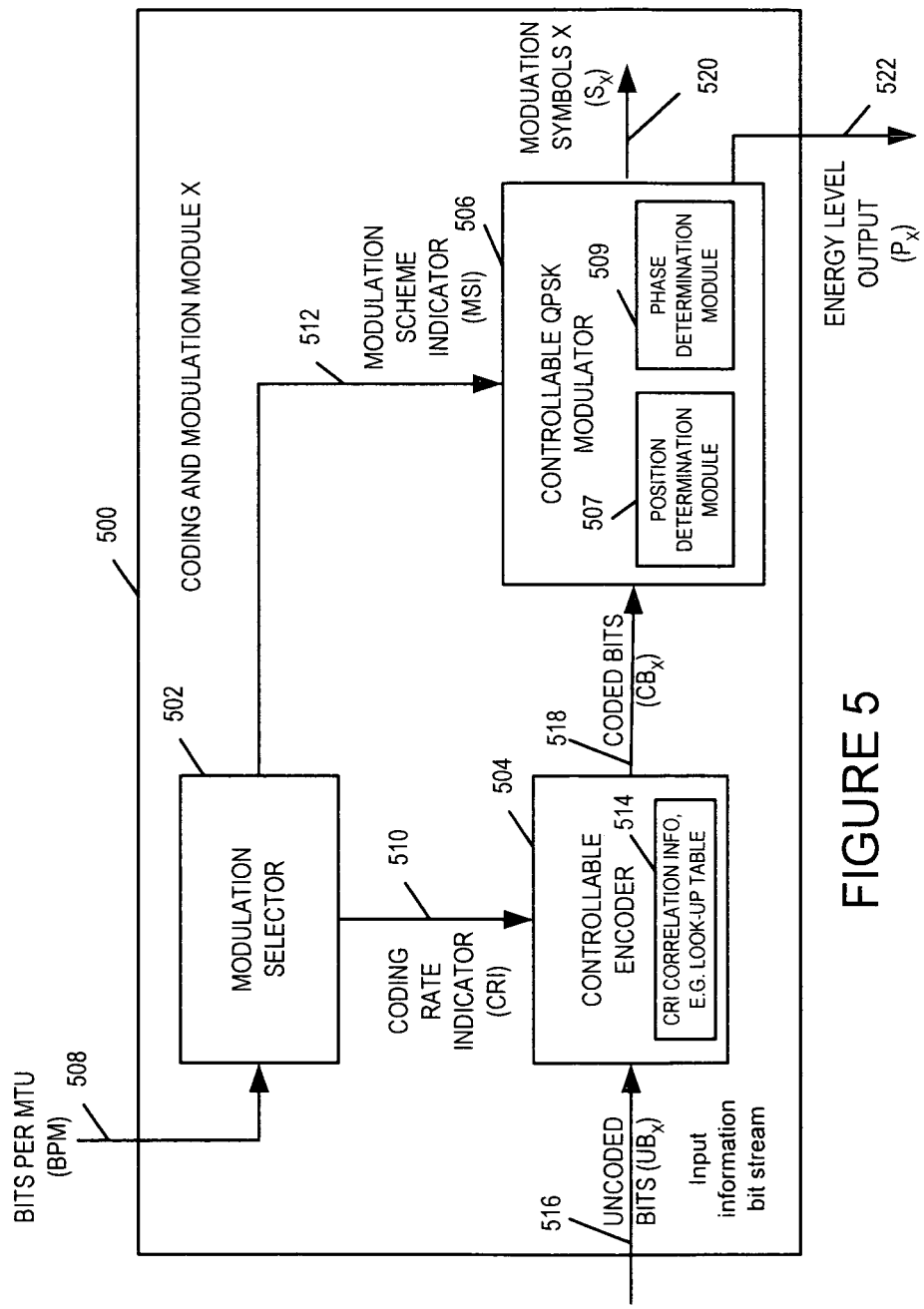
FIG. 5 is a drawing of an exemplary coding and modulation module.

In some embodiments, various features and or functions included in the coding and modulation transmission control module 242 may be implemented either in part or in full in the coding and modulation transmission module 216. In FIG. 2, the modulation selector module 244, controllable encoder module 246, controllable QPSK modulator module 248, encoder module 250, modulator module 252, and second user selection module 240 have been indicated by dotted lines as being optionally included in downlink signaling module 234; such functionality not included in the downlink signaling module 234 would typically be included in the coding and modulation transmission module 216, e.g., either in hardware, software, or a combination of hardware and software. FIG. 4 and FIG. 5 provide exemplary embodiments including at least some of the functionality previously described with respect to coding and modulation transmission control module 234 being implemented in coding and modulation transmission module 216 within transmitter 204.

Uplink signaling module 230 controls the operation of the receiver 202 and its decoder 214 including the reception, demodulation and decoding of channel quality reports 258, and received uplink traffic channel messages 260.

Data/information 220 includes a plurality of sets of WT data/information 254 (WT 1 data/info 268, WT N data/info 270) and system data/information 256. WT 1 data/information 268 includes user data 272, WT identification information 274, device/session/resource information 276, channel quality information 278, downlink resource request information 280 and downlink traffic channel segment assigned segment information 282.

User data 272 includes user data/information such as e.g., data/info representing voice, text or video, sourced from a peer node of WT 1 to be communicated to WT 1 via downlink traffic channel segment signals. User data 272 also includes user data/information received on uplink traffic channel segments from WT 1 intended to be forwarded to a peer node of WT 1 in a communications session with WT 1.

WT identification information 274 includes, e.g., a base station assigned active user identifier and an IP address associated with WT 1. Device/session/resource information 276 includes uplink and downlink segments, e.g., traffic channel segments, assigned to WT 1 by scheduling module 226 and session information including address and routing information pertaining to peer nodes of WT1 in communication sessions with WT 1. Channel quality information 278 includes channel quality feedback information, channel estimation information, and channel interference information. Channel quality information 278 is used by user selection modules 236, 240. Downlink resource request information 280 includes information indicating the requests, e.g., received requests, granted requests, outstanding requests, current requests, estimated information, for downlink traffic channel resources for WT 1, e.g. in terms of information bits to be communicated and/or frames of information bits to communicate. Downlink resource request information 280 may also include qualifying information associated with the requests, e.g., priority level, time constraints, reliability requirements, urgency, retransmission policy, etc.

Downlink traffic channel segment assigned segment information 282 includes information bits 284, segment identification information 286, and coding/modulation information 288. For WT1, there may be multiple sets of DL traffic channel assigned segment information 282, e.g., one set of information 282 for each D.L. traffic channel segment assignment by scheduling module 226 to WT1. Information bits 284 includes information bits input to controllable encoder module 246 or encoder module 250. Segment identification information 286 identifies the downlink traffic channel segment in the downlink timing structure and the classification of WT1 as either a first type user or a second type user. Coding/modulation information 288 includes modulation type information 290, e.g., QPSK and zero symbol rate modulation scheme, conventional QPSK, QAM16, QAM64, QAM256, where the modulation scheme may include for first type users sub-segment size, coding rate, zero MTU fraction information and coded bit mapping information. Coding/modulation information 288 also includes bits per MTU 299, modulation symbol transmission power information 294, coded bits 296, and modulation symbol information 298. Coded bits 296 may be an output from controllable encoder module 246 or encoder module 250, while the modulation symbol information 298 may include the values of modulation symbols to be generated by modulator modules 248 or 252.

System data/information 256 includes uplink/downlink timing and frequency structure information 207, coding/modulation module X information 209 and coding/modulation module Y information 211. Uplink/downlink timing and frequency structure information 207 includes MTU information 213 and downlink traffic channel segment information 215. For example, the minimum transmission unit (MTU) may be an OFDM tone-symbol representing the basic air link resource used in an OFDM system, e.g., one tone for the duration of one OFDM symbol timing interval. Downlink traffic channel segment information 215 includes information identifying each of the downlink traffic channel segments in a downlink timing and frequency structure, e.g., each segment including a fixed number of designated predetermined OFDM tone-symbols. Uplink/downlink timing and frequency structure information 207 also includes other system structure information, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, uplink traffic segment structure information, repetitive timing structures, e.g., symbol time intervals and grouping of symbol time intervals into, e.g., dwells, half-slots, slots, superslots, beacon slots, ultra slots, etc.

Coding and modulation X information 209 includes first user selection criteria 228, e.g., levels of BPM user requirements which are supported by the implemented first user coding and modulation data rate levels. Coding rate indicator information 219 includes, e.g., a look-up table, correlating coding rate indicator values to: numbers of information bits, number of coded bits, mapping information of information bits to coded bits used, mapping information of coded bits to zero/non-zero modulation symbol locations, and mapping of coded bits to modulation symbol values. MSI information 221 includes information correlating each modulation scheme indicator value with one a plurality of modulation schemes which may be used by controllable QPSK modulator module 248. Sub-segment information 223 includes information identifying the potential sub-segment sizes, e.g., 2, 4, or 8 MTUs per sub-segment, information identifying each of the sub-segments within a segment, information identifying the position each sub-segment within the segment.

Coding and modulation module Y information 211 includes second user selection criteria 225, coding modulation information 227 and power information 229. Second user selection criteria 225 includes information used by second user selection module 240 in evaluating potential second users for a downlink traffic channel segment, e.g., user profile evaluation criteria information, data rate level information, power ratio threshold levels with respect to the assigned first user, etc. Coding/modulation information 227 includes information pertaining to a plurality of data rate levels supported by the coding and modulation module Y 250, each data rate level corresponding to a coding rate including a number of information bits, number of coded bits, and modulation symbol type, e.g., conventional QPSK, QAM 16, QAM 64, QAM 256. Power information 229 includes reference power levels associated with each of the data rate levels identified in information 227.

Data/information 220 also includes received channel quality reports 258, received uplink traffic channel messages 260, received user data messages via I/O interface 261, downlink traffic channel segment assignment messages 262, potential second user information 264, and power ratio information 266. Received channel quality reports 258 are, e.g., feedback reports from WTs 300 indicating measured downlink channel quality, e.g., based on received pilot signals and/or received beacon signals. Received uplink traffic channel messages 260 include user data intended to be routed to the peer node of the WT transmitting the uplink signals. Received user data messages via I/O interface 261 include user data received via the backhaul network that is being requested to be transmitted via a downlink traffic channel signals to a WT currently using BS 200 as its point of network attachment. For example, BS 200 may receive via I/O interface 208 N frames of user data, requested to be communicated to WT1; the received N frames of user data may have been originally generated from a peer node of WT 1 in a communications session with WT1. The received N frames of user data may also be accompanied by qualifying information, e.g., time validity information. Downlink traffic channel segment assignment messages 262 are assignment messages generated to convey the downlink traffic segment assignment information. In some embodiments, the segment assignment messages 262 also include user identification for an assigned segment as a first type user or a second type user, with respect to superposition signaling occurring within the segment. In some embodiments, the assignment messages are located in a timing/frequency structure known to both the BS 200 and WT 300 such that an association with a specific downlink traffic channel segment and/or the type of user, with regard to superposition, is determined from the position of the assignment message including the user's ID within the base station timing/frequency structure. Potential second user information 264 includes user profile information, e.g., channel quality info 278 retrieved and processed for each of a plurality of second users being considered for a given downlink traffic channel segment. Power ratio information $1^{st}/2^{nd}$ users 266 includes calculated power ratio information corresponding to potential transmitted modulation symbols that may be superimposed for a given downlink traffic channel segment. Power ratio information 266 is compared to second user selection criteria 225 by second user selection module 240 in determining a second user for a given downlink traffic channel segment.

Figure 3:
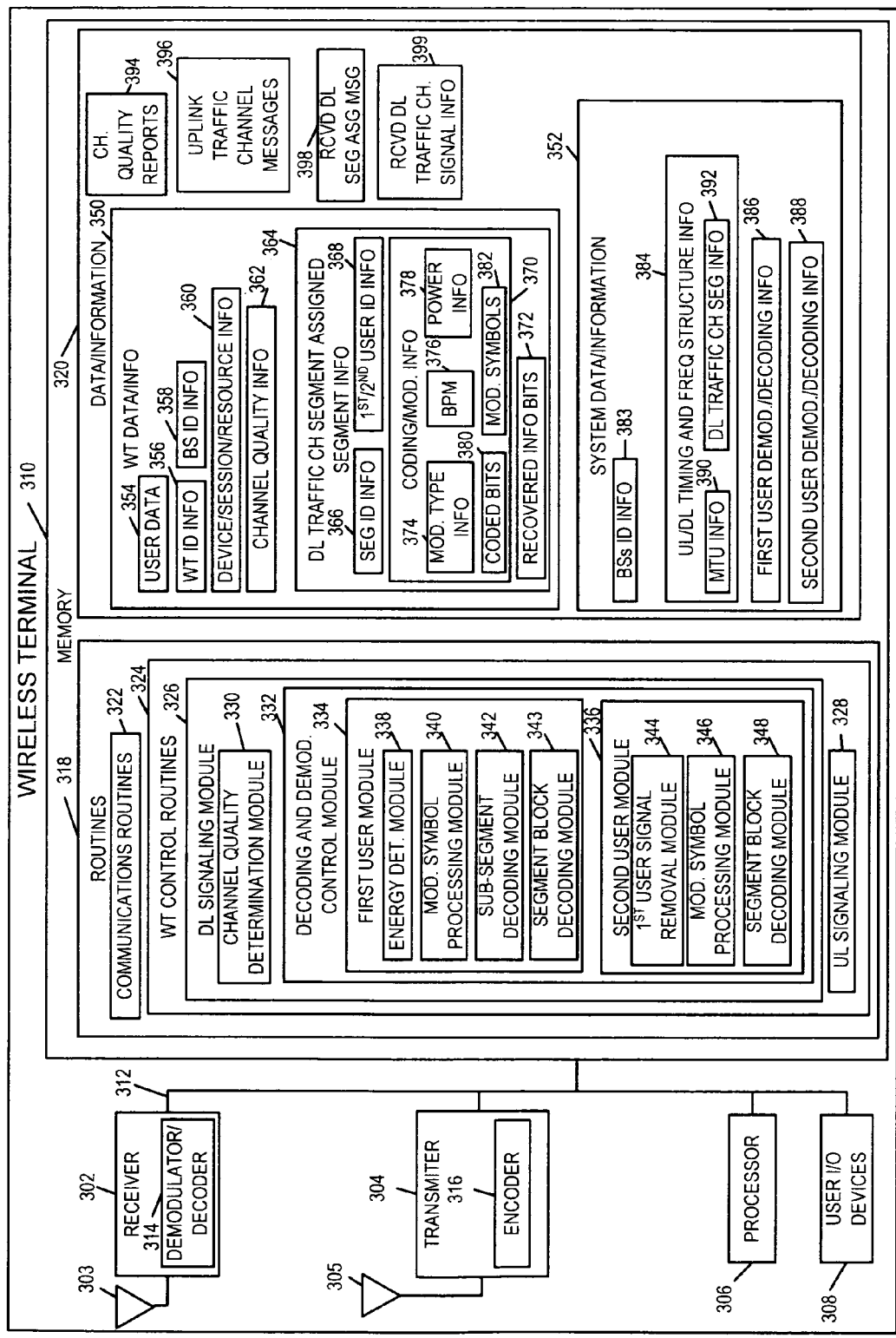
FIG. 3 is a drawing of an exemplary wireless terminal.

FIG. 3 is a drawing of an exemplary wireless terminal 300. WT 300 may be any of the WTs (110, 112, 114, 116) of system 100 of FIG. 1. Exemplary WT 300 includes a receiver 302, a transmitter 304, a processor 306, user I/O devices 308, and memory 310 coupled together via a bus 312 over which the various elements may interchange data and information.

Receiver 302 is coupled to receive antenna 303 through which WT 300 receives downlink signals from BS 200 including assignments for downlink traffic channels segments and downlink traffic channel segment signals including superposed signals. Receiver 302 includes a demodulator/decoder 314 which is used by WT 300 to demodulate and decode received downlink signals from BS 200. For a given downlink traffic channel segment, if WT is assigned the segment and is designated the first user of the segment, the WT demodulates and decodes the received superposed signal to extract the stronger level modulation signals which include non-zero QPSK modulation signals at a relatively high power level with respect to second user modulation signals, and the second user modulation signals are treated as noise. As a result the WT 300 recovers its estimation of the first user information bits conveyed in the downlink traffic channel segment.

For a given downlink traffic channel segment, if WT 300 is assigned the segment and is designated the second user of the segment, the WT demodulates the received superposed signal to extract the stronger level modulation signals which include non-zero QPSK modulation signals at a relatively high power level with respect to second user modulation signals, the second user modulation signals are treated as noise; then, the WT 300 subtracts out the demodulated QPSK modulation symbols from the original received superposed signals and demodulates and decodes the remaining signal, e.g., low power level QPSK signals or QAM signals, obtaining an estimation of the second user information bits. This is the one way of decoding the superimposed weaker signal.

The advantage of the modulation and coding scheme partly comes from an alternative decoding method which is used in some embodiments for the second user. The introduction of zero symbols facilitates the novel decoding method while making the decoding method robust against channel estimation error. A receiver can decode the weaker signal without decoding and subtracting the stronger signal from the received signal. For example, if a receiver has the ability to detect and erase very large signals compared to a predetermined nominal value, then the receiver can decode the second weaker one without even the knowledge of the existence of the stronger signal other than that the stronger signal appears as peaky interference on top of the transmission of the second weaker signals.

Transmitter 304 is coupled to transmit antenna 305 through which WT 300 transmits uplink signals to BS 200 including channel quality reports 394 and uplink traffic channel segment user data message 396. The uplink traffic channel segment user data messages 396 directed to a peer node of WT 300 may be interpreted as a request for downlink traffic channel segment resources at the base station 200 which is acting as the peer node's point of network attachment since that BS 200 needs to assign downlink traffic channel segments to communicate the information over a wireless link to the peer. In some embodiments, the same antenna is used as both the transmit antenna 305 and the receive antenna 303. Transmitter 304 includes an encoder 316 for encoding uplink data/information prior to transmission.

User I/O devices 308 include, e.g., microphones, speakers, keypad, keyboard, mouse, touch-screen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc.

Memory 310 includes routines 318 and data/information 320. The processor 306, e.g., a CPU, executes the routines 318 and uses the data/information 320 in memory 310 to control the WT 300 operation.

Routines 318 include communications routines 322 and wireless terminal control routines 324. The communications routines 322 implement the various communications protocols used by the WT 300. The wireless terminal control routines 324 control operations of WT 300 including the operation of receiver 302, transmitter 304, and user I/O devices 308. Wireless terminal control routines 324 includes a downlink signaling module 326 controlling operation of receiver 302 and an uplink signaling module 328 controlling operation of transmitter 304.

Downlink signaling module 326 includes a channel quality determination module 330 and a decoding and demodulation control module 332. Channel quality determination module 330 processes received downlink pilot signals and/or beacon signals and generates a channel quality report 394. Decoding and demodulation control module 332 includes a first user module 334 and a second user module 336. First user module 334 controls the operation of demodulator/decoder 314 to process received superposed downlink traffic channel signals and extract first user information bits. First user module 334 includes an energy detection module 338, a modulation symbol processing module 340, a sub-segment decoding module 342, and a segment block decoding module 343. In some embodiments, various combinations of one or more of modules 338, 340, 342, and 343 may be implemented as a single module, e.g., performing sub-segment and segment decoding operations as a joint operation for a given coding block corresponding to a segment. The energy detection module 338 processes received signals corresponding to a downlink traffic channel segment to which WT 300 has been assigned as a first user to determine which of the received signals, e.g., in terms of which MTUs, e.g., which OFDM tone-symbols in the segment, are the relative higher energy signals. Superposed second user modulation signals, e.g., conventional QPSK or QAM signals at lower power levels than the non-zero first user QSPK modulation signals are treated as noise. First user modulation signals include at least some zero modulation symbols in each sub-segment. In a received MTU including a zero first user modulation signal and a non-zero second user modulation signal, the energy detection module 338 should classify the MTU as a zero modulation signal from the first user perspective. The position of the relatively high power signals within each sub-segment of the segment conveys coded bit values. Then, the located relatively high power modulation symbols, QSPK modulation symbols, are processed by the modulation symbol processing module 340 to obtain additional coded bit values. Sub-segment decoding module 342 converts, e.g., via a look-up table, the determined values of the received non-zero first user modulation symbols into coded bits and the determined position information on the non-zero modulation symbols into additional coded bits. Sub-segment decoding module 342 combines the coded bits corresponding to the location determination with the coded bits corresponding to the value determination into a set of coded bits for the sub-segment. Sub-segment decoding module 342 forwards sub-segment the coded bits corresponding to each sub-segment of the segment to the segment block decoding module 343. Segment block decoding module 343 combines the sets of coded bits from each sub-segment for a given segment into a set for the segment, and the segment block decoding module 343 decodes the coded bits to obtain a set of recovered information bits.

Second user module 336 controls the operation of demodulator/decoder 314 to process received superposed downlink traffic channel signals and extract second user information bits. Second user module 336 includes a $1^{st}$ user signal removal module 344, a modulation symbol processing module 346, and a segment block decoding module 348. First user signal removal module 344 uses energy detection module 338 and first user modulation signal processing module 340 to obtain locations, e.g. MTUs within the segment, and estimated values for the first user QSPK signals, and then subtracts the estimated first user estimated signals from the received composite superposed signals. The resulting signals are forwarded to the modulation signal processing module 346. Modulation signal processing module 346 receives signals corresponding to MTUs of the segment, e.g., adjusted signals from module 344 corresponding to MTUs including first user non-zero modulation symbols and unadjusted signals corresponding to MTUs determined to be first user zero modulation symbol locations. Modulation symbol processing module 346 controls demodulator operation to demodulates the second user conventional QPSK or QAM signals, e.g., QAM 16 or QAM 64 or QAM 256 modulation signals to obtain coded bits for each demodulation symbol. Segment block decoding module 348 receives the output coded bits from module 346 and controls the decoder to decode and recover the information bits conveyed in the segment to the second user.

Note that first and second user are designations used with respect to each downlink traffic channel segment assignment. In general, the first and second users will correspond to different WTs. A WT designated a first user, for one downlink traffic channel segment may be designated a second user for a different downlink traffic channel segment, e.g., depending on current resource needs. In some embodiments, for a given downlink traffic channel segment WT 300 may be both the first user and the second user for the same downlink traffic channel segment, receiving a lower number of information bits at a low BPM rate conveyed via $1^{st}$ user modulation and coding, e.g., QPSK with some zero symbols, at relatively high power levels and a higher number of information bits at a high BPM rate conveyed via $2^{nd}$ user modulation and coding, e.g., conventional QPSK, QAM 16 or QAM 64 or QAM 256, at a relatively low power level.

Uplink signaling module 328 controls the operation of transmitter 304 and encoder 316 to encode, modulate, and transmit uplink signals to BS 200, said uplink signals including channel quality reports 394 and uplink traffic channel segment messages 396. The uplink traffic channel segment messages 396 may include user data directed to a peer of WT 300 in a communications session with WT 300. Such uplink traffic channel messages 396 may be viewed as downlink resource request messages by the BS 200 which the peer node is using as its point of network attachment.

Data/information 320 includes WT data/info 350, system data/information 352, channel quality reports 394, uplink traffic channel messages 396, received downlink segment assignment messages 398, and received downlink traffic channel signal information 399.

WT data/information 350 includes user data 354, WT identification (ID) information 356, base station ID information 358, device/session/resource information 360, channel quality information 362, and downlink traffic channel segment assigned segment information 364. User data 354 includes data/information intended for a peer of WT 300 in a communications session with WT 300 intended to be transmitted by WT 300 to BS 200 over uplink traffic channel segments. User data 354 also includes data/information sourced from a peer of WT 300 in a communications session with WT 300 and received from BS 200 via downlink traffic channel segment messages 399.

Wireless terminal identification information 356 includes, e.g., a WT IP address and a BS 200 assigned WT active user identifier. Base station identifier information 358 includes an identifier, e.g., a value distinguishing the specific BS 200 point of network attachment to which WT 300 is using as its current point of network attachment, from among a plurality of different BS point of network attachment in the wireless communications system. In some embodiments BS ID information 358 includes information identifying a specific sector and/or carrier frequency being used by the BS point of network attachment. Device/session/resource information 360 includes uplink and downlink segments, e.g., traffic channel segments, assigned to WT 300 and session information including address and routing information pertaining to peer nodes of WT 300 in communication sessions with WT 300. Channel quality information 362 includes information measured, derived and/or estimated pertaining to the wireless communications channel between WT 300 and BS 200. Channel quality information 362 may include, e.g., signal-noise-ratio and/or signal-to-interference ratio information measured, derived, and/or estimated based upon received pilot and/or beacon downlink signals.

Downlink traffic channel assigned segment information 364 includes segment identification information 366, $1^{st}/2^{nd}$ user identification information 368, coding/modulation information 370, and recovered information bits 372. Segment identification information 366 includes information identifying the assigned downlink traffic channel segment within the downlink timing/frequency structure. $1^{st}/2^{nd}$ user identification information 368 includes information identifying whether for the assigned downlink traffic channel segment, WT 300 has been designated as the $1^{st}$ user or the $2^{nd}$ user. Coding/modulation information 370 includes modulation type information 374, BPM information 376, power information 378, coded bits 380, and modulation symbol information

382. Modulation type information 374 includes, e.g., for a $1^{st}$ type user, a modulation scheme indicator and a coding rate indicator value. Modulation type information 374 includes, e.g., for a $2^{nd}$ type user, information designating, QPSK, QAM16 or QAM64 or QAM256. Bits per MTU (BPM) 376 is the information data rate for the segment for the $1^{st}$ or $2^{nd}$ type user. Power information 378 includes measured power levels on received modulation signals, determined power level differences between received signals, and power margin information used to identify signals conveying non-zero modulation intended for $1^{st}$ users. Coded bits 380 are the recovered coded bits for either the $1^{st}$ or $2^{nd}$ user, as identified by info 368, from the received downlink traffic channel signals of the segment. For $1^{st}$ type users coded bits 380 may be grouped in sub-sets on a per-sub-segment basis and as a single block on a per segment basis, while for second type users coded bits 380 may be grouped as a single block for the segment. Modulation symbol information 382 includes information identifying which MTUs within segment and/or sub-segment are conveying non-zero $1^{st}$ user QSPK modulation symbols. Modulation symbol information 382 also includes information identifying estimated values of the received modulation symbols that are processed. Recovered information bits 372 includes the WT's estimate, following demodulation and decoding operations, of the information bits that were being conveyed to WT 300, as either a first or second user, in the segment. Multiple sets of downlink traffic channel segment assignment information 364 may exist, e.g., one for each downlink traffic channel segment assignment to WT 300, each assignment corresponding to a downlink traffic channel segment and corresponding user type designation in terms of superposition signaling.

System data/information 352 includes base stations' identification information 383, uplink/downlink timing and frequency structure information 384, first user demodulation/decoding information 386, and second user demodulation/decoding information 388. Base station ID information 383 includes a plurality of different base station identifiers corresponding to different BS points of network attachment in the system, e.g., based on cell, sector, and/or carrier frequency used. Uplink/downlink timing and frequency structure information 384 includes MTU information 390 and downlink traffic channel segment information 392. For example, the minimum transmission unit (MTU) may be an OFDM tone-symbol representing the basic air link resource used in an OFDM system, e.g., one tone for the duration of one OFDM symbol timing interval. Downlink traffic channel segment information 392 includes information identifying each of the downlink traffic channel segments in a downlink timing and frequency structure, e.g., each segment including a fixed number of designated predetermined OFDM tone-symbols. Uplink/downlink timing and frequency structure information 384 also includes other system structure information, e.g., symbol timing information, tone spacing information, number of uplink tones, number of downlink tones, uplink carrier frequency, downlink carrier frequency, uplink bandwidth, downlink bandwidth, uplink set of tones, downlink set of tones, uplink tone hopping information, uplink dwell information, downlink tone hopping information, uplink traffic segment structure information, repetitive timing structures, e.g., symbol time intervals and grouping of symbol time intervals into, e.g., dwells, half-slots, slots, superslots, beacon slots, ultra slots, etc.

Different sets of UL/DL timing and frequency structure information 384 may exist and be stored in WT 300 corresponding to different BSs 200 in the wireless communications system.

First user demodulation and decoding information 386 includes sets of information corresponding to each of the coding and modulation options which may be selected by a base station 200 to communicate first user downlink traffic channel signals. For example a set of information may include a first user data rate level value, a BPM value, a coding rate indicator, a modulation scheme indicator, sub-segment size information, information to demodulate and decode the received signal such as, e.g., power level threshold used to determine the position of the non-zero QPSK modulation signals, and decoding information, e.g., look-up tables, to convert the determined position information and/or determined values of the QPSK signals into coded bits and/or information bits. A WT 300 having identified that it is designated as the first user for a downlink traffic channel segment and having identified the first user data rate level, e.g., via processing a received downlink segment assignment message or messages, identifies and accesses a set of information in first user demodulation/decoding information 386. The accessed set of information from info 386 is used by first user module 334 in processing the received signals resulting in recovered information bits 372.

Second user demodulation and decoding information 388 includes sets of information corresponding to each of the coding and modulation options which may be selected by a base station 200 to communicate second user downlink traffic channel signals. For example a set of information may include a second user data rate level value, a BPM value, coding rate information, e.g., number of information bits in the segment, number of coded bits in the segment, codeword length, a modulation type indicator, e.g., indicating QPSK or QAM16 or QAM64 or QAM256 information to be used to demodulate the received signal, such as, e.g., power level information, obtaining soft values, and decoding information, e.g., code information to convert the determined soft values into recovered information bits. A WT 300 having identified that it is designated as the second user for a downlink traffic channel segment and having identified the second user data rate level, e.g., via processing a received downlink segment assignment message or messages, identifies and accesses a set of information in second user demodulation/decoding information 388. The accessed set of information from info 388 is used by second user module 336 in processing the received signals resulting in recovered information bits 372. In some embodiments, a designated second user also receives and processes some assignment information corresponding to the first user for the same downlink traffic channel segment, e.g., information identifying the first user data rate level; such information is used in the removal of the $1^{st}$ user QPSK superposed modulation symbols prior to demodulating and decoding the second user QAM signals. In some embodiments, the power level difference between the first user QSPK signals and the second user superposed QAM signals are intentionally sufficient that the WT should be able to identify MTUs including non-zero QKSK $1^{st}$ user modulation signals without the need to decode or evaluate $1^{st}$ user rate level information.

Channel quality reports 394 are generated by channel quality determination modulation 330, e.g., based on measurements of received downlink pilot signals and/or beacon signals. Channel quality reports 394 are transmitted by WT 300 to BS 200 and are used in evaluating candidate second users for downlink traffic channel segments.

Uplink traffic channel messages 396 convey user data intended for peers of WT 300. Uplink traffic channel messages 396 are transmitted over uplink traffic channel segments to the BS 200 which WT 300 is using as its point of network attachment. The user data is forwarded, e.g., via the backhaul network, to the BS 200 that the peer of WT 300 is using as its point of network attachment, where the received user data is viewed as a request for downlink traffic channel resources. Received downlink traffic channel segment assignment messages 398 are received assignments of specific downlink traffic channel segments to WT 300. Received downlink traffic channel segment assignment messages 398 may include information identifying the assigned segment, e.g., a segment index identifier, the assigned user, e.g., a WT ID, user type for the segment, e.g., first type or second type, and/or information identifying the data rate level. Received downlink traffic channel signal information 399 includes information included in or determined from received downlink traffic channel signals, e.g., received superposed downlink traffic channel signals.

FIG. 4 is a drawing 400 of an exemplary coding and modulation transmission module 402 coupled to a transmit antenna 404. Exemplary coding and modulation transmission module 402 may be an exemplary embodiment of module 216 of BS 200 of FIG. 2, while antenna 404 may be antenna 205 of FIG. 2. Exemplary coding and modulation transmission module 402 includes a coding and modulation module X 406, a coding and modulation module Y 408, a combining module 410, a combined signal transmitter module 412, a second user selection module 414, a second user multiplexing module 416, users' profile information 418, a transmission power control module 415, and a segment partitioning information/module 417. It is assumed that the first user, for a given downlink traffic channel segment, is selected in another module within the BS, e.g., first user selection module 236 of BS 200 of FIG. 2. A first user for a downlink traffic channel segment is selected by the BS to transmit a low BPM in the segment with respect to second user for the same segment. In many embodiments, the highest BPM rate supported by coding and modulation module X 406 is less than the lowest BPM rate supported by the coding and modulation module Y 408. For a given downlink traffic channel segment including both modulation symbols X ($S_X$) 430 and modulation symbols Y ($S_Y$) 431, the non-zero modulation symbols X ($S_X$) 430 are QSPK and are higher in power level than the non-zero modulation symbols Y ($S_Y$) 431 which are typically QAM, e.g., QAM16 or QAM 64 or QAM 256. In some embodiments, coding and modulation module Y 408 includes QPSK capability.

Coding and modulation module X 406 includes a modulation selector module 420, a controllable encoder 422 and a controllable QPSK modulator 424. Coding and modulation module X 406 receives a selected first user's uncoded bits ($UB_X$) 426 and a signal 428 conveying the corresponding requested BPM (bits per MTU) data rate or an indicator of the data rate for the user. The uncoded bits ($UB_X$) 428 are input to the controllable encoder 422 and BPM signal 428 is input to the modulation selector module 420. The modulation selector module 420 selects a coding rate and modulation scheme to use as a function of the BPM 428; control signals by the modulation selector 420 are sent to the controllable encoder 422 and the controllable QPSK modulator module 424. The encoder 422 processes a set of information bits corresponding to the requested BPM, e.g., 1, 2, or 3 frames of information bits, encodes designated number of received uncoded bit steam ($UB_X$) 426 bits into a block encoded set of coded bits, and groups the coded bits for the segment into subsets, each subset of coded bits corresponding to a sub-segment of the same downlink traffic channel segment. The encoder 422 operations are performed in accordance with the commanded received control signal. The modulator 424 is controlled to generate a mix of zero modulation symbols and non-zero QPSK modulation symbols for each sub-segment, the location of the non-zero and zero modulation symbols within the sub-segment conveying some coded bit information and the values of the non-zero modulation symbols conveying some coded bit information. Output modulation symbols X ($S_X$) 430 are output from QPSK modulator 424 and routed to combining module 410. In addition a power level signal $P_X$ 432 associated with the non-zero QPSK modulation symbols is output from coding and modulation module X 406 and input to the second user selection module 414.

Potential candidate second users for the downlink traffic channel segment are identified by the base station and identification signals (potential second user 1 434, potential second user 2 436, . . . , potential second user N 438) are forwarded to the second user selection module 414. Each potential second user (potential $2^{nd}$ user 1 434, potential $2^{nd}$ user 2 436, . . . , potential $2^{nd}$ user N 438) has a corresponding uncoded bit stream ($UB_{1Y}$ 440, $UB_{2Y}$ 442, . . . $UB_{NY}$ 444), which is available as input to the second user mux module 416. Second user selection module 414 receives the power level $P_X$ 432 of the $1^{st}$ user modulation symbols and tests potential second user (434, 436, 438) as to whether the potential second user (434, 436, 438) would be acceptable, and then selects a selected second user from the set of acceptable second users and signals the selection in signal 448 directed to second user mux module 416. As part of the selection process, second user selection module 414 sends request signals 450, e.g., including a potential second user identification indicator, e.g., a WT ID, to the users' profile information storage 418. The users' profile information 418 may be located, in some embodiments, in BS memory 210. A set of profile information corresponding to a potential second user may include, e.g., user channel conditions, data rates and corresponding modulation symbol power levels ($P_Y$) that can be supported by the WT with regard to downlink traffic channel signals. User profile information is sent to the second user selection module 414 via signal 452. The second user selection module 414 may include a $SNR_{THRESHHOLD}$ 454, the $SNR_{THRESHHOLD}$ 454 representing a power ratio level which should be exceeded for the candidate second user to be considered acceptable. For a given potential second user, the second user selection module 414 determines the ratio of: the first user modulation symbol power level $P_X$ divided by the potential second user power level $P_Y$ ($P_X/P_Y$), where the value of $P_X/P_Y$ should be greater than $SNR_{THRESHHOLD}$ 454 for the potential second user to be considered acceptable. The $SNR_{THRESHHOLD}$ value 454 is selected to be larger than the expected minimum acceptable SNR required to successfully decode the X modulation signals, e.g., representing a 3 dB or 5 dB margin. As a result of the selection process, the second user selection module 414 chooses a selected second user which is conveyed in signal 448 to second user mux module 414; a corresponding control signal 456 is sent from the second user selection module 414 to the coding and modulation module Y 408, e.g., conveying a selected data rate level, the selected data rate level identifying a BPM, modulation type, e.g., QPSK, QAM16 or QAM 64 or QAM 256, coding rate, and associated modulation signal power level $P_Y$.

Second user mux module 416 receives second user selection signal 448 which controls the mux 416 to forward the selected one of the uncoded bit data streams ($UB_{1Y}$ 440, $UB_{2Y}$ 442, . . . , $UB_{NY}$ 444) corresponding to the selected second user. Uncoded Bits selected Y ($UB_{SY}$) 458 are output from second user mux module 416 and input to coding and modulation module Y 408. Coding and modulation module Y 408, e.g. supporting QPSK, QAM16, QAM64, and QAM256, includes an encoder 460 and a modulator 462. The encoder 460 receives the selected input uncoded information bit stream ($UB_{SY}$) 458 and performs block encoding for the segment in according with the selected coding rate as determined by control signal 456. The coded bits generated from the encoder 460 are forward to the modulator 462, where the coded bits are mapped to QPSK or QAM modulation signals, e.g., QAM16 modulation symbols or QAM64 modulation symbols or QAM256 modulation symbols, in accordance with the modulation type selection determined by control signal 456. In other embodiments, the coding and modulation module Y 408 may support other modulation types and/or different combinations of modulation types.

Modulation symbols Y ($S_Y$) 431 are output from coding and modulation module Y 408 and input to the combining module 410. Combining module 410 includes a summer module 411, a punch module 413, and a scaling module 419. In some embodiments combining module 410 includes one of summer module 411 and punch module 413 and not the other. When, the summer module 411 is used, the summer module 411 performs superposition of modulation symbols X ($S_X$) with modulation symbols Y ($S_Y$), and combined signal 464 is output from the combining module 464, representing the superposition of modulation symbols $S_X$ with modulation symbols $S_Y$. When, the punch module 413 is used, the punch module 413 punches out a modulation symbol from modulation symbols Y ($S_Y$) with a corresponding non-zero modulation symbol from modulation symbols X ($S_X$) when a modulation symbol from modulation symbols X ($S_X$) is non-zero and is to occupy the same tone-symbol. In this case, combined signal 464 represents the combination of modulation symbols Y ($S_Y$) 431 which have not been punched out and the non-zero modulation symbols from the modulation symbols X ($S_X$) 430. Combined signal 464 is input to combined signal transmitter module 412, e.g., including an amplifier stage, and output to antenna 404 through which the combined downlink traffic channel signals are transmitted to WTs.

Scaling module 419, which is coupled to transmission power control module 415, applies power scaling to the modulation symbols being combined, in accordance with the power level information associated with the non-zero X modulation symbols and Y modulation symbols. Transmission power control module 415 receives inputs $P_X$ and $P_Y$ associated with X and Y non-zero modulation symbols, respectively, and uses the received information to control the transmission power levels of non-zero modulation symbols used to communicate a first set of data and modulation symbols used to communicate a second set of data to maintain a minimum power difference.

Figure 11:
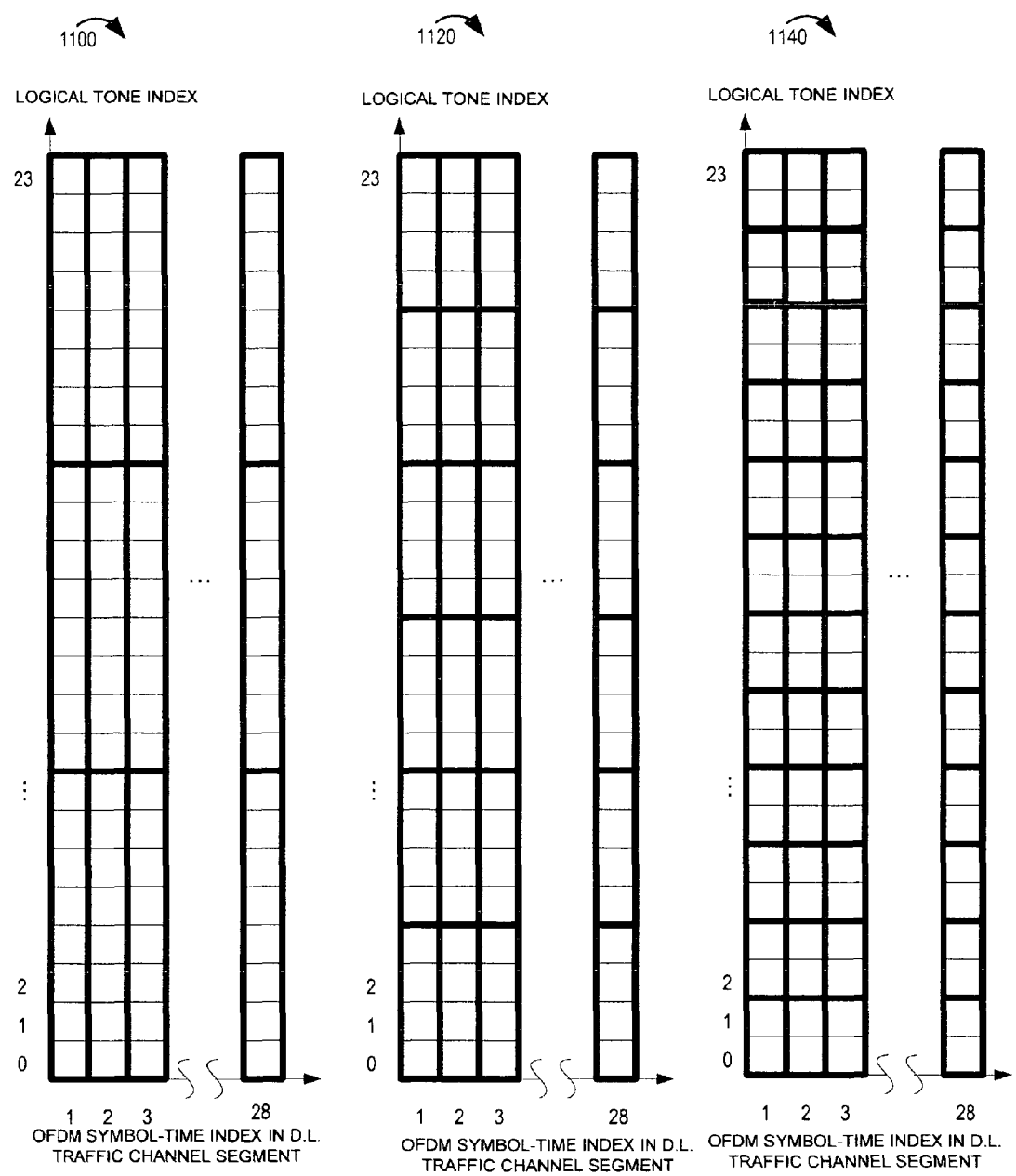
FIG. 11 illustrates exemplary subdivisions of an exemplary downlink traffic channel segment into sub-segments.

Segment partitioning information/module 417 is used for partitioning a downlink channel segment into a plurality of sub-segments, the partitioned plurality of sub-segments being used by the coding and modulation module X 406. FIG. 11 illustrates some exemplary different partitioning of an exemplary downlink traffic channel segment.

FIG. 5 is a drawing of an exemplary coding and module 500. Exemplary coding a modulation module 500 may be an exemplary embodiment of the coding and modulation module X 406 of FIG. 4. Coding and modulation module X 500 includes a modulation selector module 502, a controllable encoder module 504 and a controllable QPSK modulator module 506; modules (502, 504, 506) may correspond to modules (420, 422, 424), respectively, of FIG. 4. Modulation selector 502 receives a bits per MTU (BPM) value or a BPM indicator value such as a data rate value indicating the number of frames of information bits to be conveyed in the segment, via input signal 508 indicating the desired data rate for the selected user for the downlink traffic channel segment. The modulation selector 502 selects a coding and modulation option from among a plurality of coding and modulation options supported by module 500 such that the selecting coding and modulation option supports the desired BPM rate and satisfies a predetermined zero symbol rate criteria. In some embodiments, this selection is performed via a look-up table or similar logical mapping each possible data rate that can be conveyed via signal 508 to a coding rate indicator value and a modulation scheme indicator value. The zero symbol rate being the number of designated zero modulation symbols divided by the number of positions available to communicate a modulation symbol on a per sub-segment basis. For example, in one exemplary embodiment, the selection satisfies the following criteria: (i) if the BPM≤1.5, then the ZSR≥0.125, (ii) if the BPM≤(1), then the ZSR≥0.25, (iii) if the BPM≤(½), then the ZSR≥0.5, (iv) if the BPM≤(⅓), then the ZSR≥0.75, (v) if the BPM≤(⅙), then the ZSR≥0.875. Multiple selections may satisfy this criteria. For example, if BPM=⅓, ZSR can be chosen to be 0.75 instead of above 0.875. In some embodiments, the modulation selector 502 selects the coding and modulation option which satisfies the specified criteria and results in the fewest number of non-zero QPSK modulation symbols for the segment. The selection results in a coding rate indicator (CRI) which is output from the modulation selector 502 and input to the controllable encoder 504. The selection also results in a modulation scheme indicator (MSI) 512 which is output from the modulation selector 502 and input to the controllable QPSK modulator 506. The CRI 510 indicates a number of input information bits and a corresponding number of coded bits to be produced from the indicated number of input information bits. The controllable encoder 504 includes CRI correlation information 514, e.g., a look-up table. The CRI correlation information 514 allows the decoder to determine for a given CRI value, a first number of uncoded information bits to be processed for a segment into a second number of coded bits. The coding rate indicator information also allows the decoder to determine sub-segment size and group coded bits. The CRI 510 can also indicate to the controllable encoder the number of sub-segments within the segment, and the coding definition to use for coded bits for each sub-segment, e.g., which coded bits are associated with the position of the non-zero QPSK modulation symbol or symbols of the sub-segment and which coded bits are associated with the values of the non-zero QPSK modulation symbols of the sub-segment. Uncoded information bit stream ($UB_X$) 516 is processed by controllable encoder 504 which outputs coded bits ($CB_X$) 518 which are input to the controllable QPSK modulator 506. In accordance with various embodiments, at least some of the modulation symbols for each sub-segment are assigned to have a modulation symbol value of 0 by controllable QPSK modulator 506. The MSI 512 indicates which one of a plurality of QPSK modulation schemes to be used to modulate coded bits. In some embodiments, each of the possible QPSK modulation schemes corresponding to a different number of zero MTU fractions. Controllable QPSK modulator 506 outputs modulation symbols $S_X$ 520, the coded bits being conveyed by both the position of zero and non-zero modulation symbols within the sub-segment and the values conveyed on each non-zero QPSK modulation symbol. In addition controllable QPSK modulator 506 also outputs an energy level output indicator ($P_X$) 522, $P_X$ being a measure of the power level of a non-zero QPSK modulation symbol. The value of $P_X$ 522 is used by the second user selection module 414 in determining a suitable second user, whose downlink traffic channel signals will be communicated as superposed signals using the same air link resource, the power level of the second signal being sufficiently lower than the power level of the first user signals to allow detection of the first user downlink signals by the first user.

Controllable QPSK modulator 506 includes a position determination module 507 and a phase determination module 509. The position determination module 507 determines which of the output modulation symbols are to be zero modulation symbols and which are to be non-zero modulation symbols, the placement of the zero and non-zero modulation symbols conveying coded bit information. The phase determination module 509 determines, the phase for the non-zero modulation symbols to be output, the phase of a non-zero QPSK modulation symbol conveying additional coded bits of information.

Figure 6:
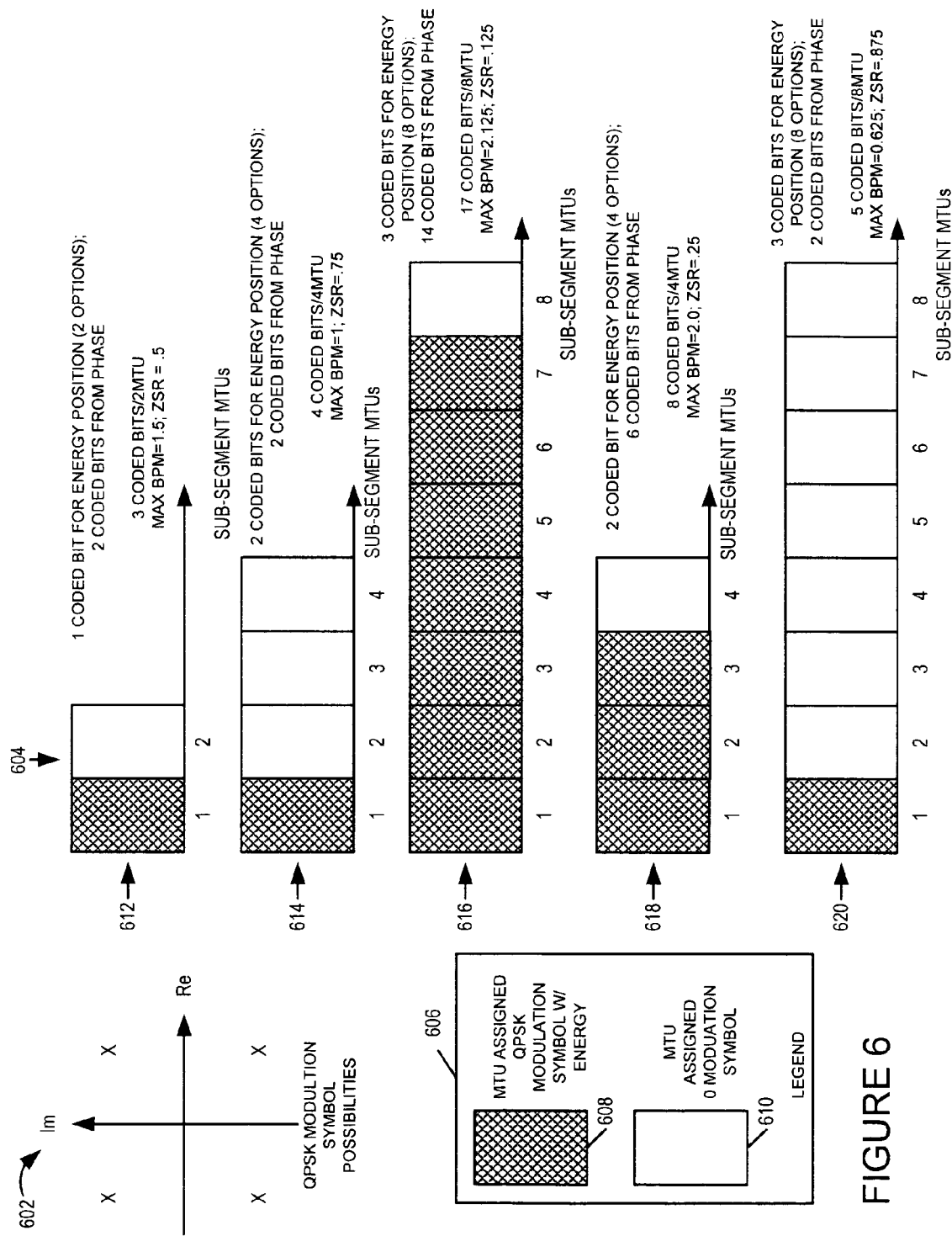
FIG. 6 includes drawings and tables illustrating exemplary embodiments of sub-segment structure, modulation symbols, and data rate information.

FIG. 6 includes drawings and tables illustrating exemplary embodiments of sub-segment structure, modulation symbols, and data rate information. The information of FIG. 6 may apply to the exemplary coding and modulation module X 500 of FIG. 5. Drawing 602 illustrates that four possibilities exist for an exemplary QPSK modulation symbol; therefore each non-zero QPSK modulation signal generated by coding and modulation module X 500 can convey 2 information bits by the phase of the complex value of the modulation symbol.

Column 604 illustrates 5 exemplary embodiments that may be used for coding and modulation of a sub-segment. Legend 606 identifies that MTUs within a sub-segment assigned QPSK modulation symbols with energy are designated by crosshatch shading as rectangle 608, while MTUs within a sub-segment assigned a zero modulation symbol are designated as an unshaded rectangle 610. Each MTU may be, e.g., an OFDM tone-symbol which is a basic unit of air link resource which may be used to convey one QPSK modulation symbol.

First example 612 illustrates an example of an embodiment where each sub-segment includes two MTU units, and one of the MTUs is assigned a QPSK modulation symbol with energy, while the other MTU is assigned a zero modulation symbol. There are 2 possible options for the location of the modulation symbol with energy; therefore, 1 coded bit can be conveyed by the location of the modulation symbol with energy. In addition, the phase of the complex value of the QPSK modulation symbol with energy conveys 2 coded bits. The coding and modulation scheme of first example 612 conveys 3 coded bits per 2 MTUs or a maximum BPM=1.5 assuming a coding rate=1. First example 612 can also be described in terms of a zero symbol rate (ZSR), where the ZSR=the number of zero modulation symbols/total number of modulation symbol slots in a sub-segment. The ZSR=0.5 for first example 612.

Second example 614 illustrates an example of an embodiment where each sub-segment includes four MTU units, and one of the MTUs is assigned a QPSK modulation symbol with energy, while the other three MTUs are assigned a zero modulation symbol. There are 4 possible options for the location of the modulation symbol with energy; therefore, 2 coded bits can be conveyed by the location of the modulation symbol with energy. In addition, the phase of the complex value of the QPSK modulation symbol with energy conveys 2 coded bits. The coding and modulation scheme of second example 614 conveys 4 coded bits per 4 MTUs or a maximum BPM=1.0, assuming a coding rate=1. The ZSR=0.75 for second example 614.

Third example 616 illustrates an example of an embodiment where each sub-segment includes eight MTU units, and seven of the MTUs are assigned a QPSK modulation symbol with energy, while the other one MTU is assigned a zero modulation symbol. There are 8 possible options for the location of the set of modulation symbols with energy; therefore, 3 coded bits can be conveyed by the location of the modulation symbol with energy. In addition, the phase of the complex value of the QPSK modulation symbols with energy conveys 2 coded bits for each non-zero QPSK modulation symbol, representing 14 coded bits. The coding and modulation scheme of third example 616 conveys 17 coded bits per 8 MTUs or a maximum BPM=2.125 assuming a coding rate=1. The ZSR=0.125 for third example 616.

Fourth example 618 illustrates an example of an embodiment where each sub-segment includes four MTU units, and three of the MTUs are assigned a QPSK modulation symbol with energy, while the other one MTU is assigned a zero modulation symbol. There are 4 possible options for the location of the set of modulation symbols with energy; therefore, 2 coded bits can be conveyed by the location of the set of modulation symbols with energy. In addition, the phase of the complex value of the QPSK modulation symbols with energy conveys 2 coded bits for each non-zero QPSK modulation symbol, representing 6 coded bits. The coding and modulation scheme of fourth example 618 conveys 8 coded bits per 4 MTUs or a maximum BPM=2.0 assuming a coding rate=1. The ZSR=0.25 for fourth example 618.

Fifth example 620 illustrates an example of an embodiment where each sub-segment includes eight MTU units, and one of the MTUs are assigned a QPSK modulation symbol with energy, while the other seven MTUs are assigned a zero modulation symbols. There are 8 possible options for the location of the modulation symbol with energy; therefore, 3 coded bits can be conveyed by the location of the modulation symbol with energy. In addition, the phase of the complex value of the QPSK modulation symbol with energy conveys 2 coded bits. The coding and modulation scheme of fifth example 620 conveys 5 coded bits per 8 MTUs or a maximum BPM=0.625 assuming a coding rate=1. The ZSR=0.875 for fourth example 618.

It should be noted that first, second, third, fourth and fifth examples (612, 614, 616, 618, 620) efficiently encode code bits into energy position since the number of energy position alternatives is a positive integer value=$2^N$, where N is a positive integer. In some embodiments sub-segment size and the number of non-zero QSPK modulation symbols per sub-segment are selected such that each of the coding and modulation schemes used by the QPSK coding and modulation module implementing the coding and modulation schemes including at least some zero modulation symbols per sub-segment, has the possible number of energy position alternatives=$2^N$, where N is a positive integer.

FIG. 7 is a table 700 summarizing exemplary embodiments of the coding and modulation schemes described with respect to FIG. 6. First row 718 describes the information included in each column of the table. First column 702 includes the $1^{st}$ user exemplary scenarios, with scenario (1, 2, 3, 4, 5) corresponding to exemplary embodiment (612, 614, 616, 618, 620), respectively, of FIG. 6. Rows (720, 722, 724, 726, 728) correspond to exemplary scenarios (1, 2, 3, 4, 5), respectively. Second column 704 includes the number of minimum transmission units (MTUs) in a sub-segment, which is (2, 4, 8, 4, 8) corresponding to scenarios (1, 2, 3, 4, 5), respectively. Third column 706 includes the number of non-zero QPSK modulation symbols in a sub-segment, which is (1, 1, 7, 3, 1) corresponding to scenarios (1, 2, 3, 4, 5), respectively. Fourth column 708 includes the zero symbol rate (ZSR), which is (0.5, 0.75, 0.125, 0.25, 0.875) corresponding to scenarios (1, 2, 3, 4, 5), respectively. Fifth column 710 includes the number of coded bits conveyed in a sub-segment by the position of the set of non-zero modulation symbol or symbols with respect to the position of the set of zero modulation symbol or symbols in the sub-segment, which is (1, 2, 3, 2, 3) corresponding to scenarios (1, 2, 3, 4, 5), respectively. Sixth column 712 includes the number of coded bits conveyed in a sub-segment by the phase of non-zero modulation symbol or symbols in the sub-segment, which is (2, 2, 14, 6, 2) corresponding to scenarios (1, 2, 3, 4, 5), respectively. Seventh column 714 includes the number of coded bits conveyed in a sub-segment, which is (3, 4, 17, 8, 5) corresponding to scenarios (1, 2, 3, 4, 5), respectively. Eighth column 716 includes the maximum number of information bits per minimum transmission units (BPM) conveyed in a sub-segment, which is (1.5, 1.0, 2.125, 2.0, 0.625) corresponding to scenarios (1, 2, 3, 4, 5), respectively, if the coding rate=1. In general, the coding rate is a value less than 1 and therefore the BPM is reduced accordingly. Column 717 is included for comparison purposes and includes the number of potential coded bits using standard QSPK with a non-zero QSPK modulation symbol in each MTU of the sub-segment, the number (n) of potential coded bits being based on sub-segment size, where 2 coded bits can be conveyed for each modulation symbol slot of the sub-segment. Column 717 indicates that sub-segment of (2, 4, 8, 4, 8) MTUs can convey, using QSPK with one QSPK modulation symbol per MTU, (4, 8, 16, 8, 16) coded bits, respectively.

Figure 8:
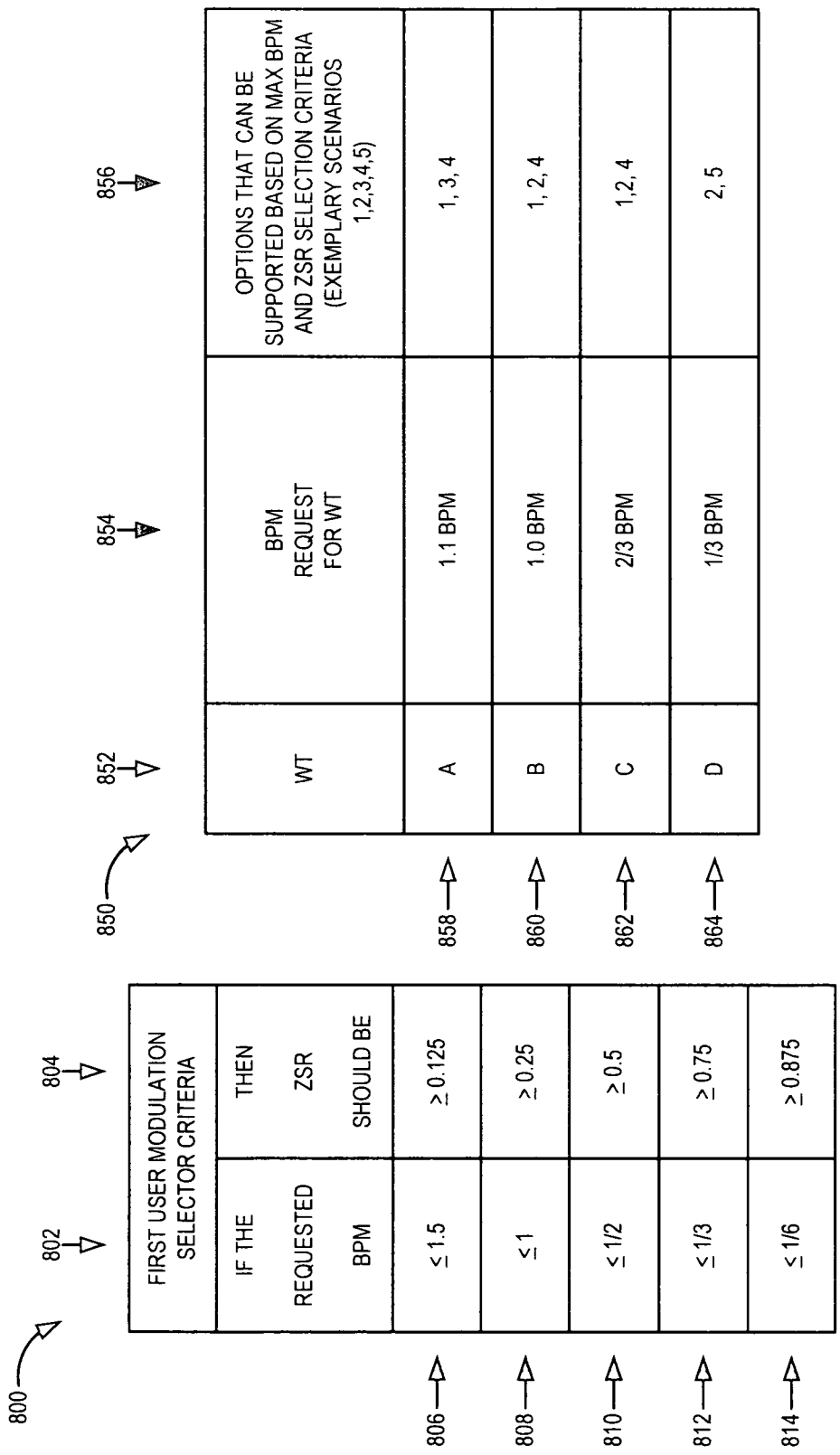
FIG. 8 includes a table listing exemplary first user modulation selector criteria and a table illustrating exemplary wireless terminal data rate needs and options that can be selected.

FIG. 8 includes a table 800 listing exemplary first user modulation selector criteria and a table 850 illustrating exemplary wireless terminal data rate needs and options that can be selected. Table 800 includes a first column listing BPM criteria 802 and second column 804 lists ZSR criteria. First row 806 indicates that if the requested BPM is less than or equal to 1.5, then the ZSR for the selected coding and modulation scheme should be greater than or equal to 0.125. Second row 808 indicates that if the requested BPM is less than or equal to 1, then the ZSR for the selected coding and modulation scheme should be greater than or equal to 0.25. Third row 810 indicates that if the requested BPM is less than or equal to (½) then the ZSR for the selected coding and modulation scheme should be greater than or equal to 0.5. Fourth row 812 indicates that if the requested BPM is less than or equal to (⅓) then the ZSR for the selected coding and modulation scheme should be greater than or equal to 0.75. Fifth row 814 indicates that if the requested BPM is less than or equal to (⅙) then the ZSR for the selected coding and modulation scheme should be greater than or equal to 0.875.

Table 850 includes: a first column 852 listing exemplary WTs (A, B, C, D), a second column 854 including exemplary BPM requests for WTs, e.g., for a given downlink traffic channel segment, and a third column 856 includes options that can be supported assuming a coding rate=1 and selection based on the criteria of table 800, e.g., which of designated exemplary scenarios (1, 2, 3, 4, 5) described with respect to FIGS. 5 and 6 could be considered as modulation scheme possibilities. In general, the coding rate will be selected to be a positive value less than 1 and thus the supported BPM will be reduced accordingly.

First row 858 indicates that a request of 1.1 BPM is made for WT A needs. Table 800 indicates that the coding and modulation scenario selected should have a ZSR of 0.125 or greater. Table 700 indicates that each of the scenarios (1, 2, 3, 4, 5) have a ZSR of 0.125 or greater; however scenario 2 does not support the information data throughput as its maximum BPM=1.0 which is less than the requested BPM of 1.1; therefore, scenario 2 is removed from consideration as an option. In addition scenario 5 does not support the information data throughput as its maximum BPM=0.625 which is less than the requested BPM of 1.1; therefore, scenario 5 is removed from consideration as an option. Therefore, any of the scenario options (1, 3, 4) could be used to transmit the information bits to WT A in the segment.

Second row 860 indicates that a request of 1.0 BPM is made for WT B needs. Table 800 indicates that the coding and modulation scenario selected should have a ZSR of 0.25 or greater. Table 700 indicates that each of the scenarios (1, 2, 4, 5) have a ZSR of 0.25 or greater; however scenario 5 does not support the information data throughput as its maximum BPM=0.625 which is less than the requested BPM of 1.0; therefore, scenario 5 is removed from consideration as an option. Therefore, any of the scenario options (1, 2, 4) could be used to transmit the information bits to WT B in the segment.

Third row 862 indicates that a request of (⅔) BPM is made for WT C. Table 800 indicates that the coding and modulation scenario selected should have a ZSR of 0.25 or greater. Table 700 indicates that each of the scenarios (1, 2, 4, 5) have a ZSR of 0.25 or greater; however scenario 5 does not support the information data throughput as its maximum BPM=0.625 which is less than the requested BPM of (⅔); therefore, scenario 5 is removed from consideration as an option. Therefore, any of the scenario options (1, 2, 4) can be used to transmit the information bits to WT C in the segment.

Fourth row 864 indicates that a request of (⅓) BPM is made for WT D. Table 800 indicates that the coding and modulation scenario selected should have a ZSR of 0.75 or greater. Table 700 indicates that each of the scenarios (2, 5) have a ZSR of 0.75 or greater. Therefore, any of the scenario options (2, 5) could be used to transmit the information bits to WT D in the segment.

FIG. 8 has been used to illustrate different exemplary WT data rate requirements, maximum BPM supported by different zero symbol rate QPSK modulation schemes and exemplary ZSR selection criteria that may be imposed. In general, typically, in a given implementation, a given BPM data rate which corresponds to a number of frames of information bits per segment maps to a coding and modulation scheme including a block coding rate, a zero symbol rate, and a sub-segment size. Different BPM values, e.g., corresponding to 1, 2, or 3 frames of information bits for the segment may map to three distinct coding and modulation schemes.

Figure 9:
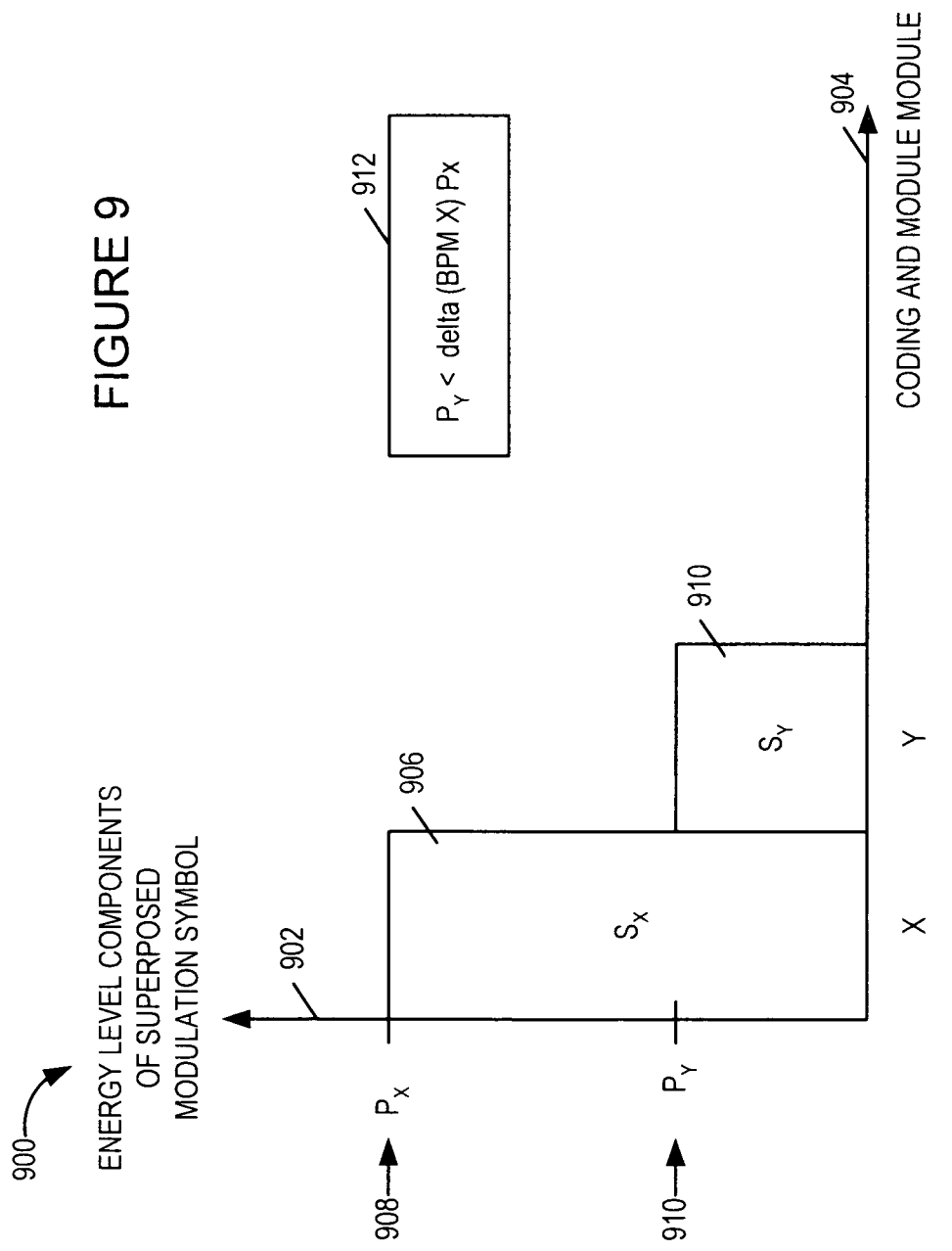
FIG. 9 illustrates an exemplary energy relationship between a non-zero modulation symbol from a first coding and modulation module and a non-zero modulation symbol from a second coding and modulation module, the two modulation symbols to be transmitted as a superposed signal.

FIG. 9 is a drawing 900 illustrating an exemplary energy relationship between a non-zero modulation symbol from a first coding and modulation module and a non-zero modulation symbol from a second coding and modulation module, the two modulation symbols to be transmitted as a superposed signal. FIG. 9 plots energy level of the components of the superposed modulation symbol on the vertical axis 902 vs coding and modulation module (X, Y) on the horizontal axis 904. The X coding and modulation module, using block encoding and zero symbol rate QPSK with some zero modulation symbols per sub-segment, is used typically to support low BPM data rate users for a given segment, e.g., a downlink traffic channel segment. The Y coding and modulation module, e.g., using block coding techniques and conventional QPSK, QAM 16, QAM 64, and/or QAM 256 modulation, is used typically to support higher BPM data rate users with respect to the X coding and modulation module, for the same given segment. Symbol X ($S_X$) 906 with corresponding power level $P_X$ 908 is shown in comparison to symbol Y ($S_Y$) 910 with its corresponding power level $P_Y$ 910. In the case of QAM, e.g. QAM64, QAM256, for the Y coding and modulation module, the $P_Y$ 910 can be considered to be the modulation symbol power level associated with the highest amplitude QAM symbol that may be generated, the highest power level producing the minimum power level difference between the X and Y symbols. Box 912 illustrates the relationship between $P_Y$ and $P_X$, $P_Y < \delta$ (BPM X) $P_X$; the power level associated with generated modulation symbol values of the second user corresponding to modulation module Y is less than the power level associated with generated non-zero modulation symbols for the first user corresponding to the modulation module X times some value delta ($\delta$), where delta is a positive value greater than one and delta is a function of the BPM X being used in the coding and modulation module X selected scheme. In some embodiments delta is selected to be a value, such that if the receiver in the WT for which $S_X$ is intended treats the $S_Y$ component as noise, said WT should be able to recover the $S_X$ symbol value. In some embodiments, a power margin, e.g., 3 dB to 5 dB is maintained above the minimum margin that is expected to be required for successful recovery of the $S_X$ value.

Figure 10:
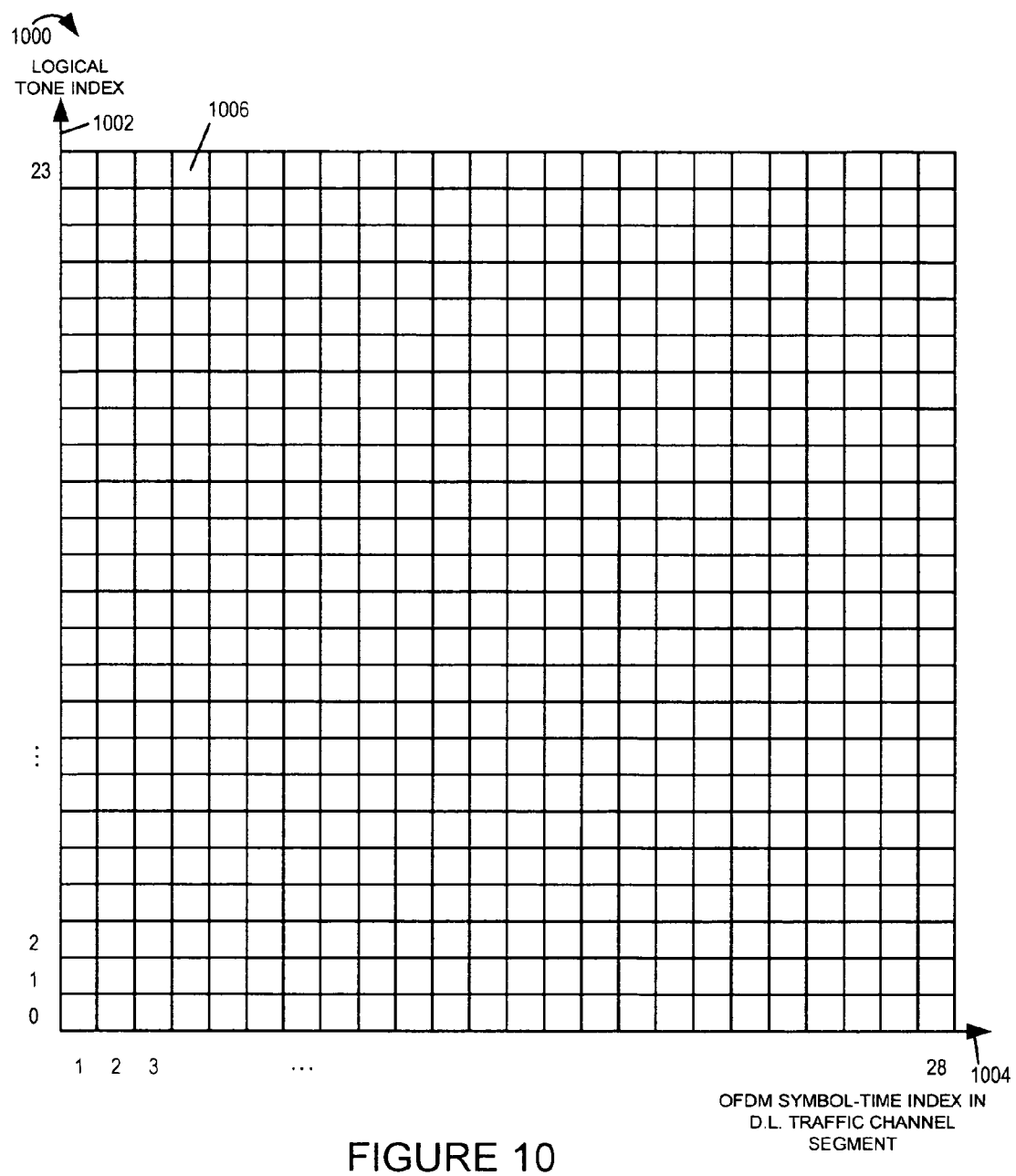
FIG. 10 illustrates an exemplary downlink traffic channel segment.

FIG. 10 illustrates an exemplary downlink traffic channel segment 1000. Vertical axis 1002 plots logical tone index 1002 within the segment while horizontal axis 1004 plots OFDM symbol time index in the downlink traffic channel segment. In exemplary downlink traffic channel segment 1000 the logical tone index ranges from 0 to 23, representing 24 tones or 24 frequencies; the OFDM symbol time index ranges from 1 to 28, representing 28 symbol time intervals. Each small square, e.g., exemplary square 1006, represents one tone-symbol, the minimum transmission unit (MTU) being using in the exemplary OFDM system. Exemplary downlink traffic channel segment 1000 includes 672 OFDM tone-symbols.

FIG. 11 illustrates several exemplary subdivisions of an exemplary downlink traffic channel segment into sub-segments. Drawing 1100 illustrates an embodiment where exemplary segment 1000 of FIG. 10 is sub-divided into exemplary sub-segments, each sub-segment having eight OFDM tone-symbols, each tone-symbol being an MTU. The exemplary segment includes 84 sub-segments. In the exemplary embodiment of drawing 1100, each OFDM symbol time interval index value within the segment includes three sub-segments. In accordance with one feature of some embodiments, sub-segments are structured within a segment such that each of the OFDM tone-symbols of a sub-segment occur during the same OFDM symbol time interval of the segment, where possible.

Drawing 1120 illustrates another embodiment where exemplary segment 1000 of FIG. 10 is sub-divided into exemplary sub-segments, each sub-segment having four OFMD tone-symbols, each tone-symbol being an MTU. The exemplary segment includes 128 sub-segments. In the exemplary embodiment of drawing 1120, each OFDM symbol time interval index value within the segment includes six sub-segments.

Drawing 1140 illustrates another embodiment where exemplary segment 1000 of FIG. 10 is sub-divided into exemplary sub-segments, each sub-segment having two OFMD tone-symbols, each tone-symbol being an MTU. The exemplary segment includes 256 sub-segments. In the exemplary embodiment of drawing 1140, each OFDM symbol time interval index value within the segment includes twelve sub-segments.

Figure 12:
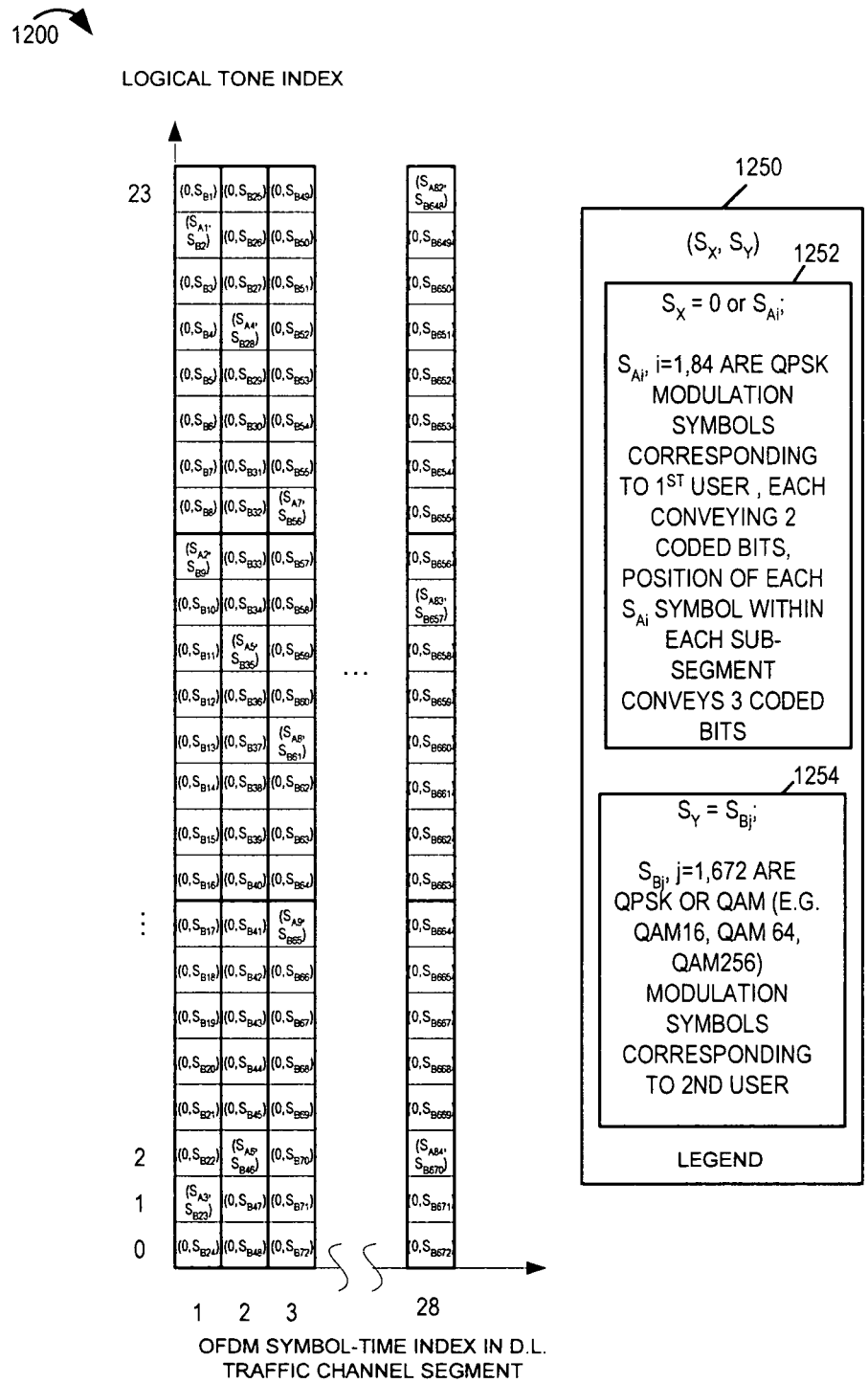
FIG. 12 illustrates an exemplary downlink traffic channel segment including sub-segments and superposed modulation symbols from first and second coding and modulation modules.

FIG. 12 illustrates an exemplary downlink traffic channel segment 1200 including sub-segments and superposed modulation symbols from first and second coding and modulation modules. Exemplary traffic channel segment 1200 may be the exemplary traffic channel segment 1000 of FIG. 10 and may have been sub-divided into sub-segments of size 8 OFDM-tone symbols per sub-segment for first user signaling as shown in example 1100 of FIG. 11. Legend 1250 identifies the modulation symbol notation used $S_X$ 1252 and $S_Y$ 1254. In each OFDM tone-symbol, a pair of modulation symbols are shown as $(S_X, S_Y)$, where $S_X$ is the modulation symbol generated for the first user by the coding and modulation module X and $S_Y$ is the modulation symbol generated for the second user by the coding and modulation module Y. For each OFDM tone-symbol, $S_X$ is either a 0, representing a zero modulation symbol or a non-zero QSPK modulation symbol, shown as $S_{Ai}$, i=1,84, where the value of i represents the sub-segment index within the segment. Each $S_{Ai}$ value conveys two coded bits by the phase of the modulation symbol, and the position of each $S_{Ai}$ modulation symbol within each sub-segment conveys 3 additional coded bits. For each OFDM tone-symbol $S_Y$ is a modulation symbol $S_{Bj}$, j=1,672, where the value of j corresponds to the tone-symbol index of the dwell and the modulation type is QSPK or QAM, e.g., QAM16 or QAM64 or QAM256, the same modulation type being used for each symbol $S_{Bj}$ of the segment, and the set of modulation symbols $S_{Bj}$ corresponding to block encoded information.

Figure 13:
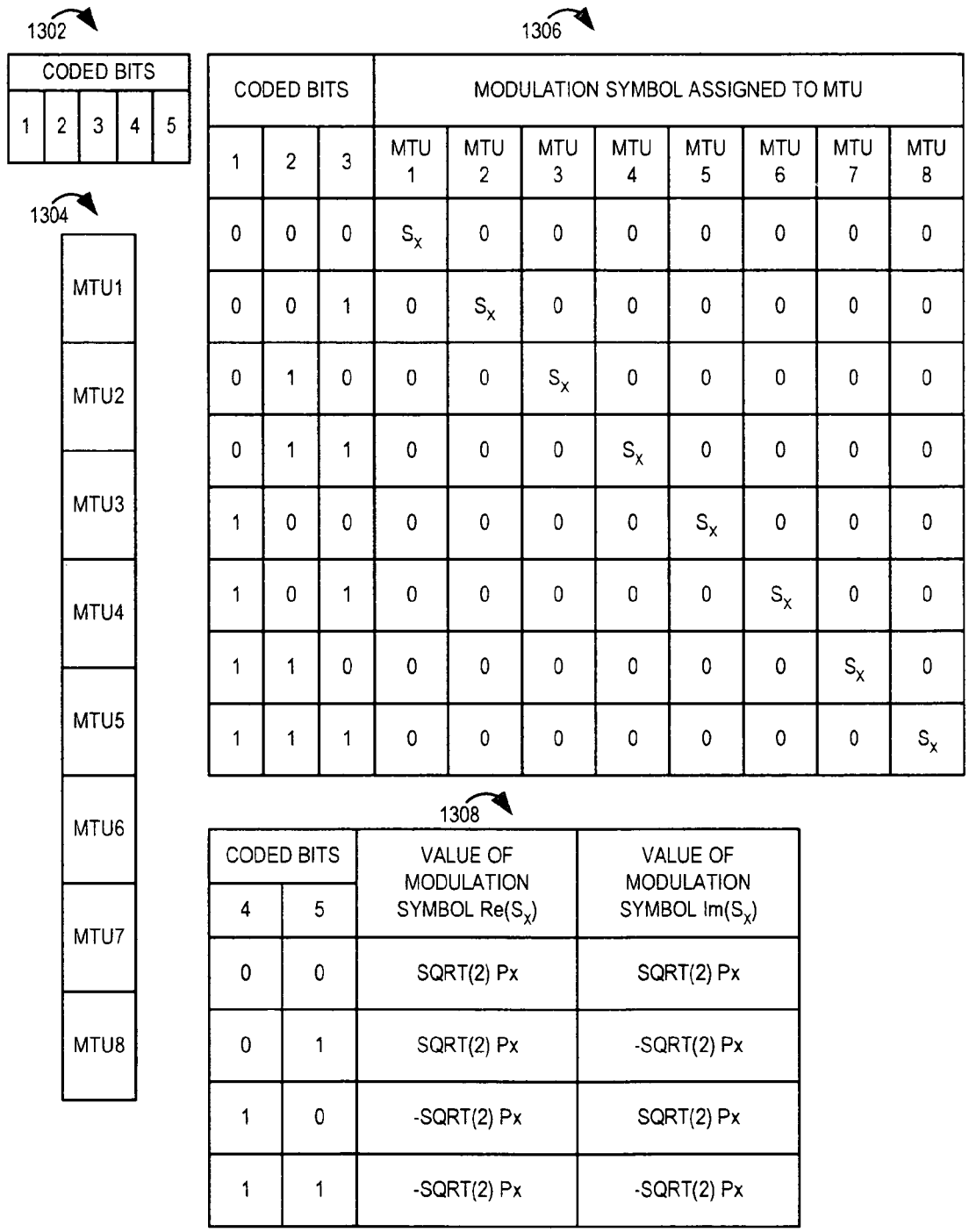
FIG. 13 illustrates an exemplary downlink traffic channel sub-segment and exemplary information bit mapping.

FIG. 13 illustrates an exemplary downlink traffic channel sub-segment and exemplary coded bit mapping. Drawing 1302 illustrates that for this exemplary coding and modulation scheme, the coded bit stream is processed in sets of five bits bits (1, 2, 3, 4, 5). Drawing 1302 illustrates that the exemplary sub-segment for this exemplary coding and modulation scheme uses a sub-segment of eight MTUs (MTU1, MTU2, MTU 3, MTU4, MTU5, MTU6, MTU7, MTU8). Drawing 1304 indicates that the eight MTUs of a sub-segment have been selected to occur on different frequencies during the same OFDM symbol time interval. Table 1306 identifies the mapping of the set of coded bits (1, 2, 3) into an energy pattern within the sub-segment where one of the MTUs is assigned a non-zero QSPK modulation symbol $S_X$, while the other seven MTUs are assigned a zero modulation symbol. Each different combination of input bits (1, 2, 3) values places the non-zero QPSK modulation symbol $S_X$ in a different MTU. Table 1308 identifies the mapping of the set of coded bits (4, 5) into the complex value of the QSPK modulation symbol. Each different combination of input coded bit (4, 5) values results in a different phase of the complex QSPK symbol value.

Figure 14:
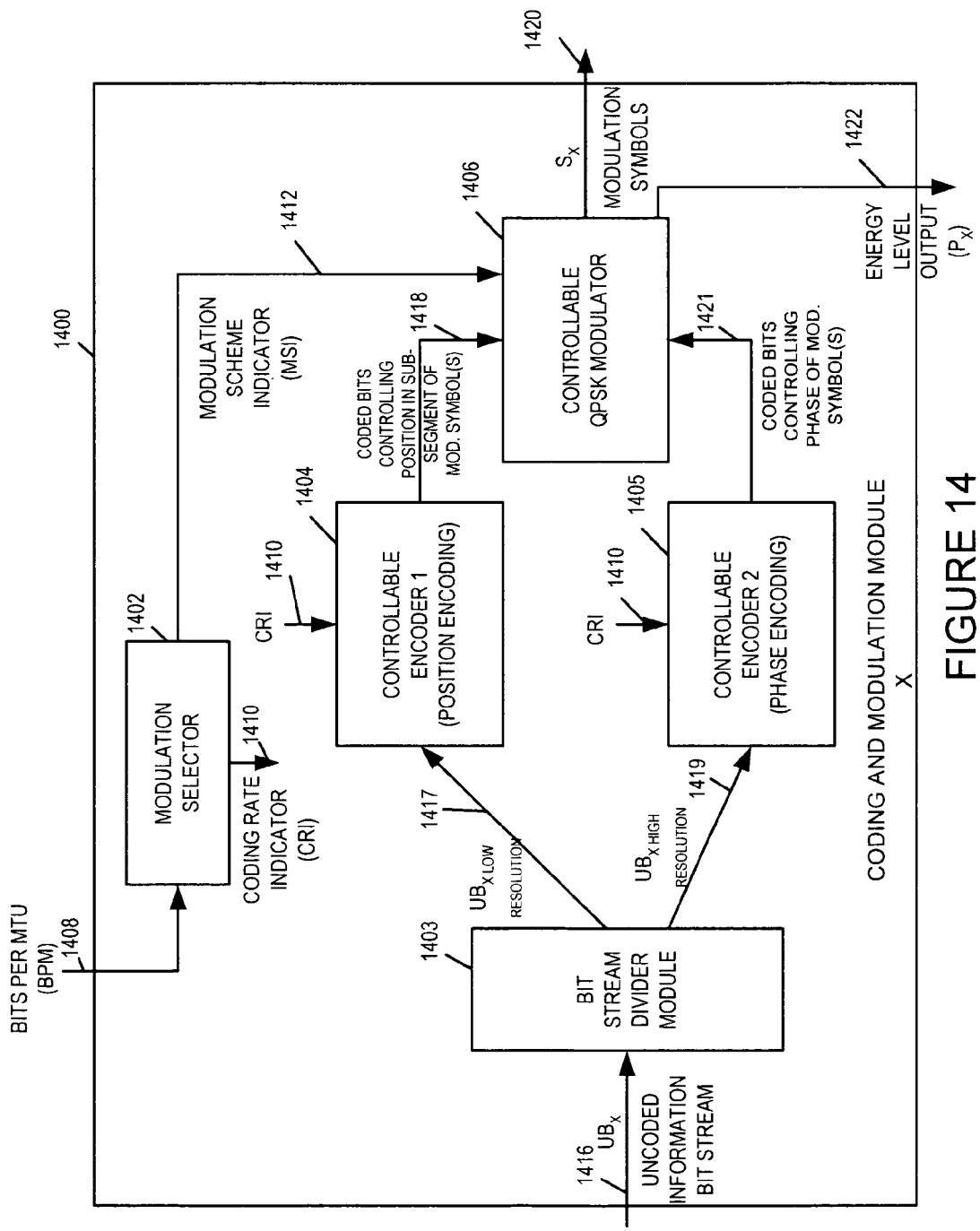
FIG. 14 illustrates an exemplary coding and modulation module implemented and structured to take advantage of the property of incoming data streams which include two distinct types of information which may be prioritized in terms of which set of information is more important to be successfully recovered.

FIG. 14 illustrates an exemplary coding and modulation module X 1400 implemented and structured to take advantage of the property of incoming data streams which include two distinct types of information which may be prioritized in terms of which set of information is more important to be successfully recovered. Coding and modulation module X 1400 may be an exemplary embodiment of coding and modulation module X 406 of FIG. 4. Coding and modulation module X 1400 includes a modulation selector module 1402, a bit stream divider module 1403, a controllable encoder 1 position encoding module 1404, a controllable encoder 2 phase encoding module 1405, and a controllable QPSK modulator module 1406; modules (1402, 1404 and 1405, 1406) may correspond to modules (420, 422, 424), respectively, of FIG. 4. Bit stream divider module 1403 receives an incoming uncoded information bit stream $UB_X$ 1416 corresponding to a selected user and divides the bit stream into two bits streams 1417 and 1419, e.g. $UB_{XLOW\ RESOLUTION}$ and $UB_{XHIGH\ RESOLUTION}$. Modulation selector 1402 receives a bits per MTU (BPM) value via input signal 1408 indicating the desired data rate for the selected user for the downlink traffic channel segment. The modulation selector 1402 selects a coding and modulation option from among a plurality of coding and modulation options supported by module 1400 such that the selecting coding and modulation option supports the desired BPM rate and satisfies a predetermined zero symbol rate criteria. The selection results in a coding rate indicator (CRI) 1410 which is output from the modulation selector 1402 and input to the controllable encoders 1404 and 1405. In some embodiments, individual coding rate indicators are generated and sent to the two encoders 1404, 1405, e.g., identifying different coding rates for each encoder (1404, 1405). The selection also results in a modulation scheme indicator (MSI) 1412 which is output from the modulation selector 1402 and input to the controllable QPSK modulator 1406. Uncoded information bit stream 1417 ($UB_{X LOW RESOLUTION}$) is processed by controllable encoder1 position encoding module 1404 which performs block encoding of the low resolution information bits on a per segment basis and outputs coded bits 1418. Coded bits 1418, which control the position in the sub-segment of the set of non-zero modulation symbols, are input to the controllable QPSK modulator 1406. In accordance with various embodiments, at least some of the modulation symbols for each sub-segment are assigned to have a modulation symbol value of 0 by controllable QPSK modulator 1406. Uncoded information bit stream 1419 ($UB_{X HIGH RESOLUTION}$) is processed by controllable encoder 2 phase encoding module 1405 which performs block encoding of the high resolution bits on a per segment basis and outputs coded bits 1421. Coded bits 1421, which control the phase of the non-zero QPSK modulation symbol or symbols in the sub-segment, are input to the controllable QPSK modulator 1406. The MSI 1412 indicates which one of a plurality of QPSK modulation schemes to be used to modulate coded bits. In some embodiments, each of the possible QPSK modulation schemes corresponding to a different number of zero MTU fractions. Controllable QPSK modulator 1406 outputs modulation symbols $S_X$ 1420, the coded bits being conveyed by both the position of zero and non-zero modulation symbols within the sub-segment and the values conveyed on each non-zero QPSK modulation symbol. In addition controllable QPSK modulator 1406 also outputs an energy level output indicator ($P_X$) 1422, $P_X$ being a measure of the power level of a non-zero QPSK modulation symbol or symbols. The value of $P_X$ 1422 is used by the second user selection module 414 in determining a suitable second user, whose downlink traffic channel signals will be communicated as superposed signals using the same air link resource, the power level of the second signal being sufficiently lower than the power level of the first user signals to allow detection of the first user downlink signals by the first user.

Coded bits conveyed by the position encoding have a higher probability of being successfully recovered than coded bits conveyed via the phase value of the non-zero modulation signal, since to recover the phase value of the communicated non-zero QPSK modulation symbol, the non-zero modulation symbols location within the sub-segment needs to be first be successfully recovered. The implementation of coding and modulation module X 1400 takes advantage of this inherent recovery probability difference to intentionally direct different priority level uncoded information bits streams so that the higher priority stream is likely to have a higher successful transmission recovery rate. In one exemplary embodiment the higher priority information may be low resolution image data while the lower priority information may be higher resolution image data, the higher resolution image data being used to enhance the resolution of the image communicated using the lower resolution image data.

In some embodiments, bit stream divider module 1403 is located external to the coding and modulation module X 1400 and the module 1400 receives two input uncoded bit streams, e.g., of different priority level. In some embodiments, the modulation selector module 1402 also directs CRI signal 1410 and/or MSI signal 1412 to the bit stream divider module 1403 so that the incoming bit stream division can be coordinated in conjunction with the coding and modulation scheme selected.

FIG. 15 is a table 1500 illustrating exemplary data rate options for a downlink traffic channel segment in an exemplary system. A number of data rate options (0, 1, 2, 3, 4, 5, 6, 7, 8, 9, 10) are available to be used for a given downlink traffic channel segment. The bits per minimum transmission unit (BPM) increases as the data rate option value increases. Data rate options (0, 1, 2) correspond to different zero symbol rate QPSK coding and modulation schemes and would be used for a first user in the exemplary system. Data rate 0, corresponding to the lowest BPM, using a ¾ ZSR QPSK modulation scheme, e.g., where 1 out of 4 of the modulation symbols is a non-zero value and the other 3 are 0 values. Data rate 1, corresponding to the next lowest BPM, also uses a ¾ ZSR QPSK modulation scheme, e.g., where 1 out of 4 of the modulation symbols is a non-zero value and the other 3 are 0 values, but uses a different coding rate. Data rate 2, corresponding to the next lowest BPM, uses a ½ ZSR QPSK modulation scheme, e.g., where 1 out of 2 of the modulation symbols is a non-zero value and the other 1 is 0. Data rate options (3), (4, 5, 6), (7, 8), (9,10) correspond to conventional QPSK, QAM16, QAM64, QAM 256 modulation schemes, respectively, and would be used for a second user in the exemplary system. For a given downlink traffic channel segment there can be first user modulation symbols and second user modulation symbols assigned to the same air link resources of the segment, e.g., OFDM tone-symbols.

In some embodiments a variation of the previously described apparatus and methods is used such that for a given downlink traffic channel segment including first user directed signaling using zero symbol rate QPSK modulation schemes and second using directed signaling using, e.g., conventional QPSK modulation or QAM modulation techniques, each MTU, e.g., tone-symbol, of the segment can carry either a first user directed non-zero QPSK modulation symbol or a second user non-zero modulation symbol, e.g., a QPSK or QAM modulation symbol. The non-zero modulation symbols from a first coding and modulation module supporting zero symbol rate QPSK signaling being interwoven with the non-zero modulation symbols from a second coding and modulation module supporting conventional QPSK or QAM signaling.

Figure 16:
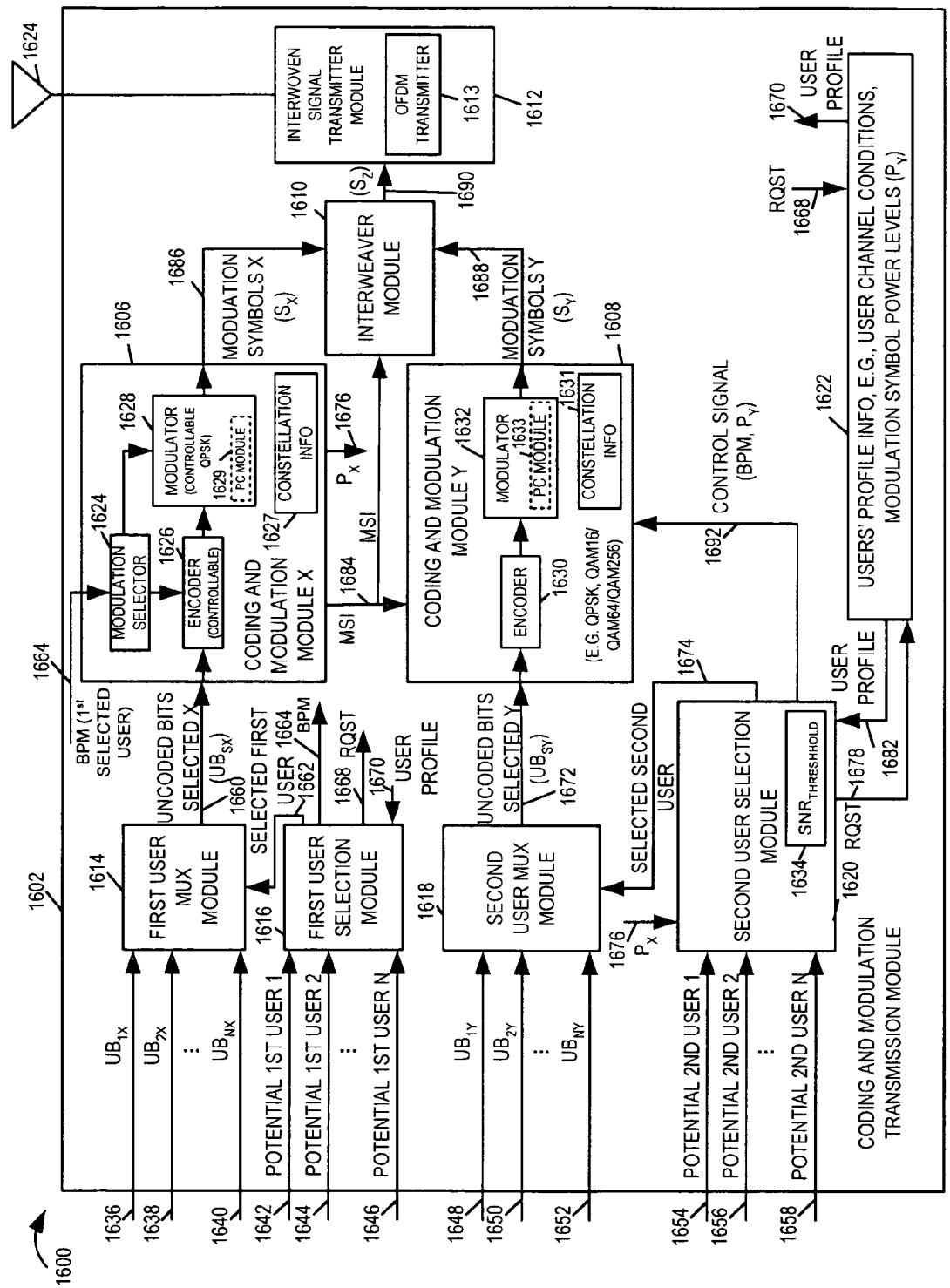
FIG. 16 is a drawing of an exemplary coding and modulation transmission module supporting an interweaving capability.

FIG. 16 is a drawing 1600 of an exemplary coding and modulation transmission module 1602 supporting such an interweaving capability. The coding and modulation module 1602 of FIG. 16 is similar to the coding and modulation and module 402 of FIG. 4 and may be used in the exemplary base station 200 of FIG. 2 or a similar base station.

The coding and modulation module 1602 of FIG. 16 includes an interweaver module 1610 replacing the combiner module 410 of FIG. 4, and an interwoven signal transmitter module 1612 replacing the combined signal transmitter module 412 of FIG. 4. In addition, in FIG. 16 coding and modulation module Y 1608 is coupled to the coding and modulation module X 1606 by a modulation signal indicator 1684. The number of modulation symbols in the segment allocated to coding and modulation module Y 1608 is a function of the number of non-zero modulation symbols allocated to the coding and modulation module X 1606, which is a function of the BPM for the selected first user 1664 for the given segment. In FIG. 16, a first user selection module 1616 and a first user mux module 1614 are included. A BPM signal 1662 can be an indicator of a data rate, e.g., identifying a number of frames of information bits to be conveyed using a zero symbol rate modulation scheme in the segment.

Coding and modulation transmission module 1602 includes first user mux module 1614, first user selection module 1616, second user mux module 1618, second user selection module 1620, users' profile information 1622, coding and modulation module X 1606, coding and modulation module Y 1608, interweaver module 1610 and interwoven signal transmitter module 1612. The coding and modulation module X 1606 includes a modulation selector module 1624, an encoder module 1626, e.g., a controllable encoder module, a modulator module 1628, e.g., a controllable QPSK modulator, and constellation information 1627. The coding and modulation module Y 1608, e.g., a module capable of producing a plurality of different types of modulation symbols, e.g., QPSK, QAM16/QAM64/QAM256 modulation symbols, includes an encoder module 1630, a modulator module 1632, and constellation information 1631. Second user selection module 1620 includes an SNR threshold 1634. Users' profile information 1622 includes, e.g., user channel condition information and modulation symbol power level information ($P_Y$).

First user selection module 1616 receives signals identifying potential $1^{st}$ users (potential $1^{st}$ user 1 1642, potential $1^{st}$ user 2 1644, . . . , potential $1^{st}$ user N 1646). The first user selection module 1616 sends request signal 1668 to users' profile information 1662 requesting user profile information for one or more of the potential $1^{st}$ users, and in response to request signal 1668, user profile signal 1670 is returned from users' profile information 1622 to first user selection module 1616. The first user selection module 1616, using information conveyed in signal 1670 selects a first user, and signals its selection via selected first user signal 1662 to first user mux module 1614. The first user selection module 1616 also outputs a selected $1^{st}$ user information bit per minimum transmission unit (BPM) signal 1664 conveying the BPM of the selected first user to the modulation selector 1624 of the coding and modulation module X 1606.

The first user mux module 1614 has uncoded bit stream inputs corresponding to the potential $1^{st}$ users, (uncoded bit stream 1X ($UB_{1X}$) 1636, uncoded bit stream 2X ($UB_{2X}$) 1638, . . . , uncoded bit stream NX ($UB_{NX}$) 1640) which correspond to (potential $1^{st}$ user 1 1642, potential first user 2 1644, . . . , potential $1^{st}$ user N 1646), respectively. The selected first user signal 1662, selects one of the input uncoded bit streams, which firs user mux module 1614 outputs as uncoded bits selected X ($UB_{SX}$) which is input to coding and modulation module X 1606.

Modulation selector 1624 selects a modulation scheme indicator 1684, as a function if the $1^{st}$ selected user BPM indicated in signal 1664. At least some of the modulation scheme indicator values which can be selected are associated with zero symbol rate modulation schemes, e.g., QPSK zero symbol rate modulation schemes. Table 1750 of FIG. 17 indicates some exemplary MSI/ZSR corresponding information. The selection of the modulation selector 1624 is forwarded to the encoder 1626 and modulator 1628. The encoder 1626 receives uncoded bits selected ($UB_{SX}$) 1660 as input, generates coded bits as a function of the modulation selector 1626 selection, and outputs encoded bits, which are forwarded to modulator 1628 as input. The modulator 1628, e.g., a controllable QPSK modulator supporting a plurality of different ZSR QPSK modulation schemers, generates zero and non-zero modulation symbols as a function of the modulation selector 1624 selection and the coded information bits received as input. Modulator 1628 includes a position module and a phase module. The position encoding module determines which output modulation symbols are to be zero modulation symbols and which output modulation symbols are to be non-zero modulation symbols, thus conveying coded information bits via position. The phase module determines the phase of the non-zero QPSK modulation symbols output from module 1606. In some embodiments, modulator 1628 includes a power control module 1629 for controlling the power level associated with non-zero modulation symbols output from the coding and modulation module X 1606. The modulator 1628 outputs modulation symbols ($S_X$) 1686 to interweaver module 1610.

Coding and modulation module X 1606 also outputs MSI signal 1684 to the coding and modulation module Y 1608 and the interweaver module 1610. In addition coding and modulation module X 1606 outputs signal $P_X$ 1676 indicating the transmission power level associated with non-zero QPSK modulation symbols from coding and modulation module X 1606. Signal $P_X$ 1676 is routed to second user selection module 1620, where it is an input signal.

Second user selection module 1620 receives signals identifying potential $2^{nd}$ users (potential $2^{nd}$ user 1 1654, potential $2^{nd}$ user 2 1656, . . . , potential $2^{nd}$ user N 1658). The second user selection module 1620 sends request signal 1678 to users' profile information 1662 requesting user profile information for one or more of the potential $2^{nd}$ users, and in response to request signal 1678, user profile signal 1682 is returned from users' profile information 1622 to second user selection module 1620. The second user selection module 1620, using information conveyed in signal 1682 and/or $P_X$ signal 1678 information selects a second user. The second user selection module 1620 uses stored SNR threshold information 1634, $1^{st}$ user power level information $P_X$, $2^{nd}$ user channel conditions, and/or modulation symbol power levels that may be associated with second user modulation symbols to select a second user and set the bit per minimum transmission unit (BPM) and/or power level $P_Y$ to be used for the second user. The selected second user identification information is sent via signal 1674 to second user mux module 1618. The BPM and $P_Y$ information is sent form second user selection module 1620 to coding and modulation module Y 1608 via signal 1692.

The second user mux module 1618 has uncoded bit stream inputs corresponding to the potential $2^{nd}$ users, (uncoded bit stream 1Y ($UB_{1Y}$) 1648, uncoded bit stream 2Y ($UB_{2Y}$) 1650, . . . , uncoded bit stream NY ($UB_{NY}$) 1652) which correspond to (potential $2^{nd}$ user 1 1654, potential second user 2 1656, . . . , potential $2^{nd}$ user N 1658), respectively. The selected second user signal 1674, selects one of the input uncoded bit streams, which it outputs as uncoded bits selected Y ($UB_{SY}$) 1672 which is input to coding and modulation module Y 1608.

Coding and modulation module Y 1608 receives as input uncoded bits selected Y 1672, MSI 1674, and control signal 1692 indicating a BPM and power level PY associated with the second user. The coding and modulation module Y 1608 determines a modulation scheme to use, e.g., one of QPSK, QAM16, QAM 64 and QAM256, a power level to use associated with the selected constellation, a coding block size and/or a coding rate to use, e.g., for the segment to be communicated. The encoder 1630 encodes the uncoded input bits 1672, in accordance with the selected coding rate and coding block size to generate coded bits which are forward to modulator 1632. Modulator 1632 uses the selected modulation constellation and power level to map the coded bits onto modulation symbols which are output from modulator 1632 as modulation symbols Y ($S_Y$) 1688. In some embodiments, modulator 1632 includes a power control module 1633 for controlling the power level associated with modulation symbols output from the coding and modulation module Y 1608. Power control module 1633 controls the power level of modulation symbols from module 1632 so that the modulation symbols will be transmitted at a lower power level than non-zero modulation symbols output from modulator 1628. The modulation symbols Y ($S_Y$) 1688 are input to interweaver module 1610.

The interweaver module 1610 interweaves non-zero modulation symbols from modulation symbols X ($S_X$) 1686 with modulation symbols Y ($S_Y$) 1688 forming modulation symbol stream $S_Z$ 1690 which is forwarded to interwoven signal transmitter module 1612. If a non-zero modulation symbol from the modulation symbols X 1686 is input to interweaver module 1610, that modulation symbol is forwarded into the stream $S_Z$; however, if a zero modulation symbol from the modulation symbols X 1686 is input to the interweaver module 1610, a modulation symbol from the modulation symbols Y 1688 is forwarded into the stream $S_Z$ in place of the zero modulation symbol.

Interwoven signal transmitter module 1612, e.g., including an OFDM symbol transmitter module 1613, transmits the modulation symbols $S_Z$ via transmit antenna 1624 which is coupled to transmitter module 1612.

Figure 17:
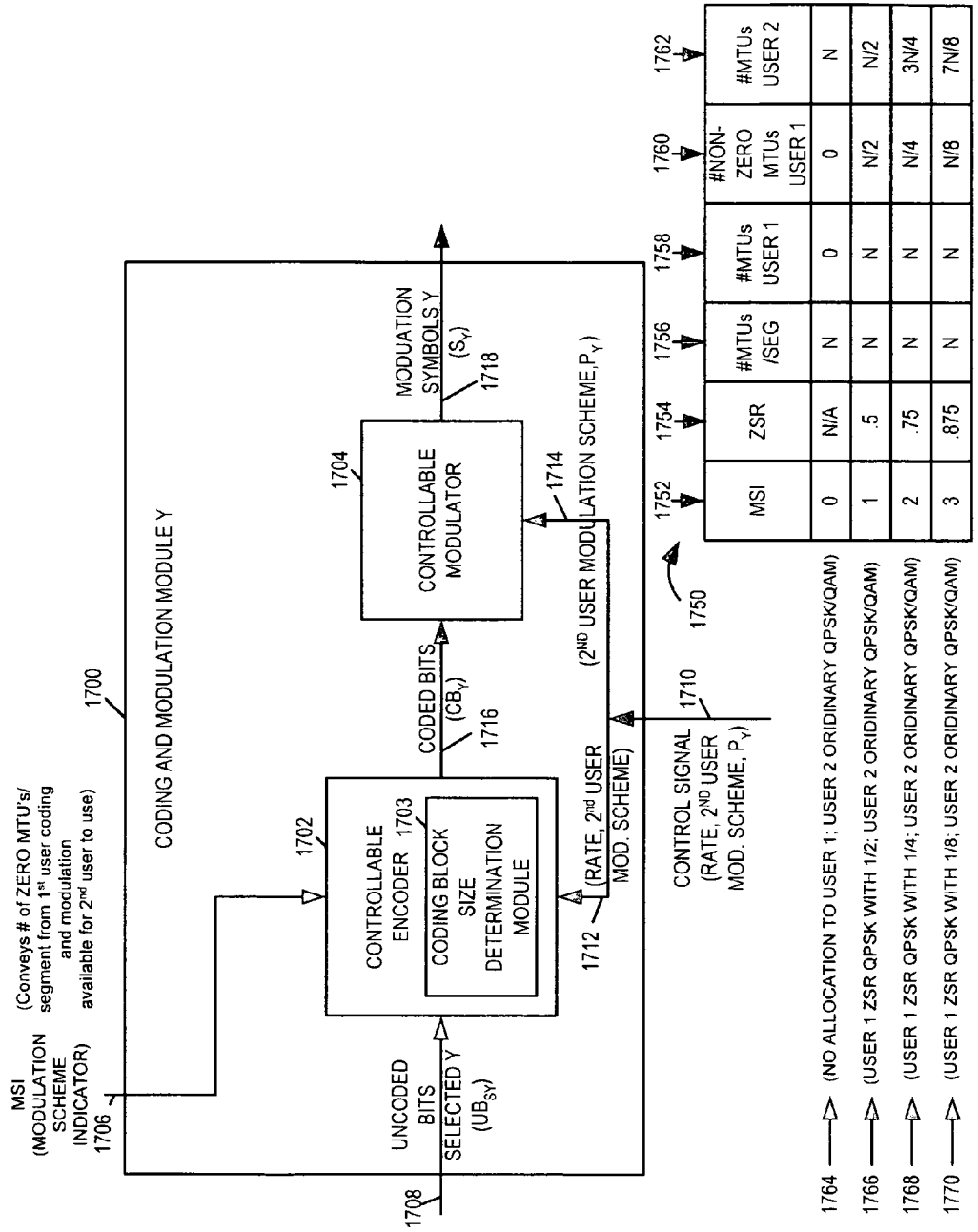
FIG. 17 is a drawing of an exemplary coding and modulation module which may be used in the coding and modulation transmission module of FIG. 16.

FIG. 17 is a drawing of an exemplary coding and modulation module Y 1700 which may be the coding and modulation module Y 1608 of FIG. 16. Coding and modulation module Y 1700 includes a controllable block encoder 1702, e.g., an LDPC encoder, and a controllable modulator 1704. The controller encoder 1702 receives uncoded bits for the selected $2^{nd}$ user 1708, a modulation scheme indicator 1706 and control signal(s) 1710 including rate, modulation scheme, and/or modulation symbol power level information corresponding to the second user. Control signaling 1712, indicating rate and/or second user modulation scheme, is directed to the controllable encoder 1702; control signaling 1714, indicating $2^{nd}$ user modulation scheme and/or second user power level information ($P_Y$), is directed to controllable modulator 1704. The MSI 1706, from the coding and modulation module X, indicates to the encoder 1702 the number of zero MTUs/segment that the $1^{st}$ user will have, thus informing the encoder 1702 how many modulation symbols are allocated within the segment to be used to convey the second user modulation symbols. The second user control signals 1712 received by the controller encoder 1702 in addition to the MSI 1706, allows the coding block size determination module 1703 in the controller encoder 1702 to determine the coding block size, and then the encoder 1702 encodes the input information bits 1708 into coded bits 1716 which are forwarded to the controllable modulator 1704. The controllable modulator 1704 receives a $2^{nd}$ user modulation scheme indicator signal and a power level indicator signal, signals 1714, e.g., identifying a conventional QPSK or QAM modulation scheme and an associated power level for the modulation symbols.

In FIG. 17, a table 1750 is also included indicating several exemplary MSI values and corresponding information. First column 1752 indicates modulation scheme indicator (MSI); second column 1754 indicates zero symbol rate (Z SR); third column 1756 indicates the number of minimum transmission units per segment (MTUs/seg). Fourth column 1758 indicates the number or MTUs for user 1 for the segment (MTUs user 1); fifth column 1760 lists the number of non-zero MTUs for user 1 for the segment (# non-zero MTUs user 1); sixth column 1762 lists the number of MTUs for user 2 for the segment. First row 1764 indicates that for the example of FIG. 17, for a modulation scheme indicator value of 0, there is no allocation to user 1 and the entire set of N MTUs for the segment can be used by user 2. Second row 1766 indicates that for a MSI=1, the ZSR=0.5, the N MTUs of the segment are used by user 1 for the ZSR QPSK modulation scheme with half of the MTUs carrying a $1^{st}$ user non-zero QPSK modulation symbol; the half of the N MTUs that end up with a zero modulation symbol from the perspective of $1^{st}$ user are utilized to carry $2^{nd}$ user modulation symbols. Third row 1768 indicates that for a MSI=2, the ZSR=0.75, the N MTUs of the segment are used by user 1 for the ZSR QPSK modulation scheme with ¼ of the MTUs carrying a $1^{st}$ user non-zero QPSK modulation symbol; the ¾ of the N MTUs that end up with a zero modulation symbol from the perspective of $1^{st}$ user are utilized to carry $2^{nd}$ user modulation symbols. Fourth row 1770 indicates that for a MSI=3, the ZSR=0.875, the N MTUs of the segment are used by user 1 for the ZSR QPSK modulation scheme with ⅛ of the MTUs carrying a $1^{st}$ user non-zero QPSK modulation symbol; the ⅞ of the N MTUs that end up with a zero modulation symbol from the perspective of $1^{st}$ user are utilized to carry $2^{nd}$ user modulation symbols.

Figure 18:
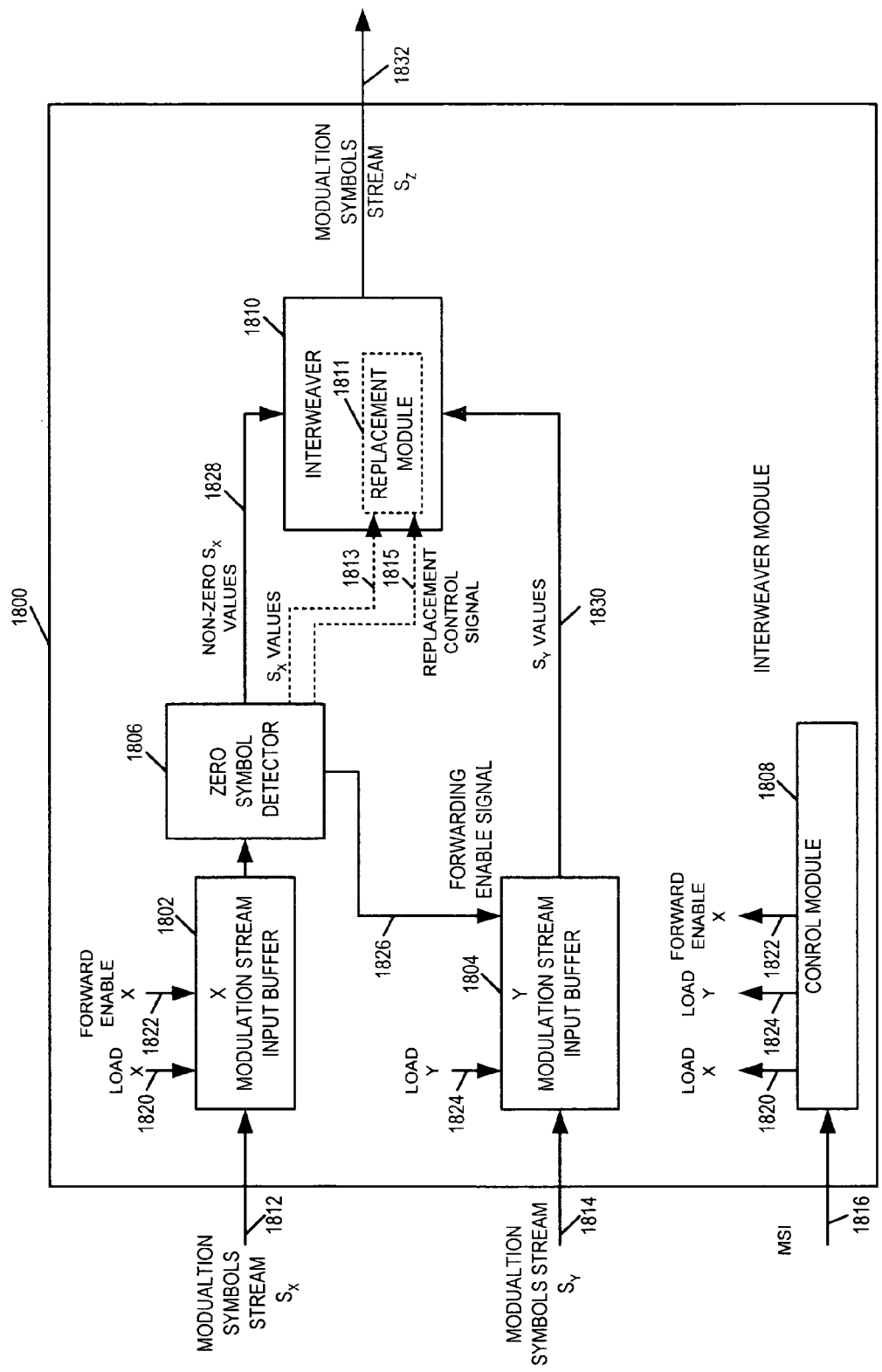
FIG. 18 is a drawing of an exemplary interweaver module that may be the interweaver module used in the coding and modulation transmission module of FIG. 16.

FIG. 18 is an exemplary interweaver module 1800 that may be the interweaver module 1610 of FIG. 16. The interweaver module 1800 includes a control module 1808, an X modulation symbol stream input buffer 1802, a Y modulation symbol stream input buffer 1804, a zero symbol detector 1806, and an interweaver 1810. The MSI signal 1816 from the modulation X ($1^{st}$) user module signals the control module 1808 to load a set of X modulation symbols and a set of Y modulation symbols to be interwoven and communicated for the segment. The control module 1808 sends load X signal 1820 to X modulation stream input buffer 1802 to load modulation symbols from the X stream 1812, $S_X$ modulation symbols. The control module 1808 sends load Y signal 1824 to Y modulation stream input buffer 1804 to load modulation symbols from the Y stream 1814, $S_Y$ modulation symbols. The control module 1808 sends a X forwarding enable signal 1822 to the X modulation stream input buffer 1802 which forwards a modulation symbol to the zero symbol selector 1806. If the forwarded value is non-zero, it is forwarded as one of non-zero $S_X$ values 1828 to the interweaver 1810 and output into the Z modulation stream 1832 as a $S_Z$ modulation symbol. However, if the forwarded value is zero, a forwarding enable signal 1826 is sent to the Y modulation stream input buffer 1804, and a Y modulation symbol is forwarded, as one of $S_Y$ values 1830, to the interweaver 1810 and output into the Z modulation stream 1832. The X forwarding enable signal 1822 is repeated by the control module 1808 to clock through each location of the X modulation stream input buffer, e.g., the total number of MTUs, e.g., the total number of OFDM tone-symbol locations, of the segment.

In some embodiments, interweaver module 1810 includes a replacement module 1811. The replacement module 1811 receives as input $S_X$ modulation symbol values 1813 and a replacement control signal 1815, the $S_X$ modulation symbols 1813 including both zero modulation symbol and non-zero modulation symbols. In some embodiments, the replacement control signal 1815 is the same as forwarding enable signal 1826. The replacement control module 1811 replaces, as part of the interweaving, zero modulation symbols from the $S_X$ stream input 1813 with a modulation symbol from the $S_Y$ modulation symbols input 1830. Thus locations, in the $S_X$ stream where a non-zero modulation symbol occurs remain unchanged, while locations in the $S_X$ stream where a zero modulation symbol occurs are replaced by an $S_Y$ modulation symbol.

Figure 19:
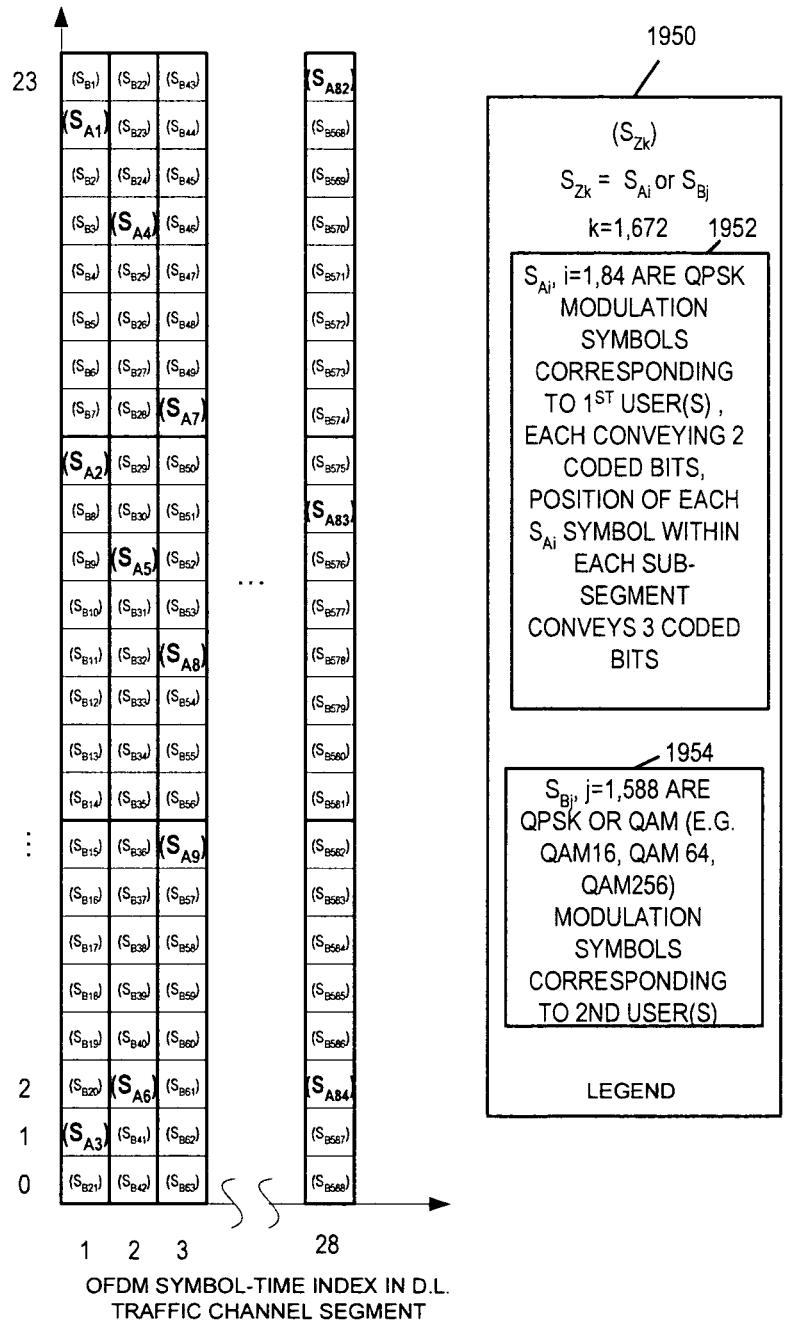
FIG. 19 shows a portion of an exemplary downlink traffic channel segment which has been interwoven to include first user and second user modulation symbols.

FIG. 19 shows a portion of an exemplary downlink traffic channel segment 1900 which has been interwoven to include $1^{st}$ user and second user modulation symbols. The first user modulation scheme being a ZSR QPSK modulation scheme and the second user modulation scheme being a conventional QPSK or QAM modulation scheme. The power level of the $1^{st}$ user non-zero modulation symbols are higher than the power level of the second user modulation symbols, allowing receivers, e.g. WT receivers to be able to distinguish between $1^{st}$ user non-zero modulation symbols and $2^{nd}$ user modulation symbols. WT receivers, implemented, in accordance with various embodiments, are capable of detecting modulation symbols, distinguishing between $1^{st}$ and second user modulation symbols, de-interweaving, demodulating and decoding the received signals to recover information bits.

FIG. 19 illustrates exemplary downlink traffic channel segment 1900 including sub-segments and indexed modulation symbols ($S_{Zk}$) from first and second coding and modulation modules. The exemplary segment includes 672 OFDM tone-symbols and the index, k, of $S_{Zk}$ ranges from 1 to 672. Exemplary traffic channel segment 1900 may be the exemplary traffic channel segment 1000 of FIG. 10 and may have been sub-divided into sub-segments of size 8 OFDM-tone symbols per sub-segment for first user signaling as shown in example 1100 of FIG. 11. A $S_{Zk}$ modulation symbol can be from a set of 84 non-zero modulation symbols corresponding to the $1^{st}$ user, a $S_{Ai}$ modulation symbol where i is in the range of 1 to 84, or from the set of 588 modulation symbols corresponding to the $2^{nd}$ user, a $S_{Bj}$ modulation symbol where j is in the range 1 to 588. In this example, there is one $S_{Ai}$ modulation symbol per sub-segment and 7 $S_{Bj}$ modulation symbols per sub-segment. Legend 1950 identifies that the modulation symbol notation used $S_{Ai}$ 1952, where i=1,84 identifies non-zero QPSK modulation symbols corresponding to a first user(s), each non-zero QPSK modulation symbol conveying two coded bits, e.g., by the phase of the non-zero modulation symbol, and the position of each $S_{Ai}$ modulation symbol within a sub-segment conveys 3 coded bits. Legend 1950 also identifies that the modulation symbol notation used $S_{Bj}$ 1954, where j=1,588 identifies QPSK or QAM, e.g., QAM 16, QAM64, QAM256, modulation symbols corresponding to a second user(s), the same modulation type being used for each symbol $S_{Bj}$ of the segment, and the set of modulation symbols $S_{Bj}$ corresponding to block encoded information. In each OFDM tone-symbol, a modulation symbol ($S_{Zk}$) is shown, the modulation symbol being one of the $S_{Ai}$ modulation symbols or one of the $S_{Bj}$, modulation symbols where $S_{Ai}$ is a modulation symbol generated for the first user by the coding and modulation module X, e.g., module 1606, and $S_{Bj}$ is a modulation symbol generated for the second user by the coding and modulation module Y, e.g., module 1608.

Figure 20:
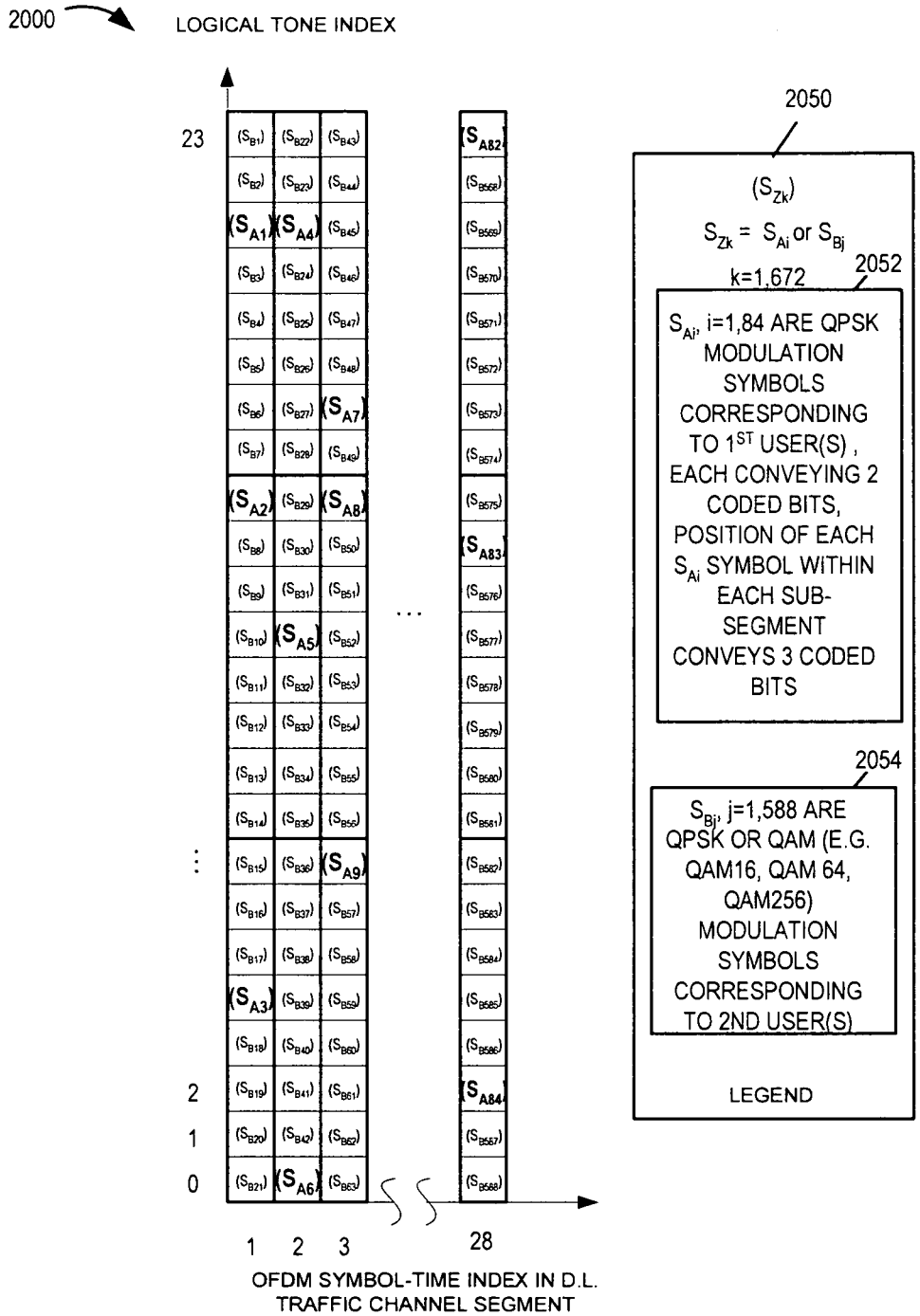
FIG. 20 shows a variation of FIG. 19, illustrating the placement of the first user non-zero modulation symbols within the segment, which conveys first user coded bits, determines the placement of the second user modulation symbols for the segment.

FIG. 20 shows a variation of FIG. 19, illustrating the placement of the first user non-zero modulation symbols within the segment, which conveys first user coded bits, determines the placement of the second user modulation symbols for the segment.

Exemplary downlink segment 2000 of FIG. 20 corresponds to exemplary downlink segment 1900 of FIG. 19, and may represent, e.g., the same downlink traffic channel segment in a downlink channel structure at a different time. Legend 2050 with legend information 2052 and 2054 of FIG. 20 corresponds to legend 1950 with legend information 1952 and 1954 of FIG. 19.

In segment 1900 first user modulation symbols ($S_{A1}$, $S_{A2}$, $S_{A3}$, $S_{A4}$, $S_{A5}$, $S_{A6}$, $S_{A7}$, $S_{A8}$, $S_{A9}$, ..., $S_{A82}$, $S_{A83}$, $S_{A84}$), respectively, occupies the OFDM tone-symbol within the segment having (logical tone index, OFDM symbol time index), ((22, 1), (15,1), (1,1), (20,2), (13,2), (2,2), (16,3), (11,3), (7,3), ..., (23,28), (14,28), (2,28)) respectively. The $S_{Bj}$, j=1, 588 symbols corresponding to the second user(s) utilize OFDM tone-symbols of the segment not being used by the $S_{Ai}$ symbols. The transmit power level of non-zero modulation symbols for the $1^{st}$ user is higher than the transmit power level of non-zero modulation symbols for the $2^{nd}$ user, as indicated by boldface used for $S_{Ai}$ modulation symbols in the segment and regular typeface used for $S_{Bj}$ modulation symbols in segment 1900. In segment 2000 first user modulation symbols ($S_{A1}$, $S_{A2}$, $S_{A3}$, $S_{A4}$, $S_{A5}$, $S_{A6}$, $S_{A7}$, $S_{A8}$, $S_{A9}$, ..., $S_{A82}$, $S_{A83}$, $S_{A84}$), respectively, occupies the OFDM tone-symbol within the segment having (logical tone index, OFDM symbol time index), ((21, 1), (15,1), (4,1), (21,2), (12,2), (0,2), (17,3), (15,3), (7,3), ..., (23,28), (14,28), (2,28)) respectively. The $S_{Bj}$, j=1, 588 symbols utilize OFDM tone-symbols of the segment not being used by the $S_{Ai}$ symbols.

In FIGS. 19 and 20, one non-zero modulation symbol, either belonging to a $1^{st}$ user or a second user, occupies each given tone-symbol of the segment; the specific allocation of a given tone-symbol to the first or second user to convey one of its modulation symbols depends upon $1^{st}$ user coded bits conveying location information within the sub-segment.

In contrast, in the exemplary embodiment including at least some overlap between first user non-zero modulation symbols and second user non-zero modulation symbols illustrated by FIG. 12, the position of the second user's modulation symbols is not affected by the location of the $1^{st}$ user non-zero modulation symbols. In addition, the number of $2^{nd}$ user modulation symbols for a given segment is not altered by the ZSR modulation scheme used by the $1^{st}$ user of the same segment.

In some embodiments, the selection between which users utilize ZSR modulation schemes ($1^{st}$ users) and which users utilize conventional modulation schemes ($2^{nd}$ users) is based upon the amount of data to be communicated, with lower data rates typically being directed to ZSR modulation schemes. In some embodiments, channel quality conditions are also taken into consideration, e.g., those with better channel quality being directed to be $2^{nd}$ type users. In some embodiments, where $1^{st}$ user signaling is directed to a group of users and $2^{nd}$ user signaling is also directed to a group of users, for the same segment, typically, the $2^{nd}$ user signaling is directed to a smaller group of users. In some embodiments, where $1^{st}$ user signaling is directed to a group of users and $2^{nd}$ user signaling is also directed to a group of users, for the same segment, typically, the $2^{nd}$ user signaling is directed to the group of users with better channel quality conditions.

Various combinations are possible between unicast, multicast, and/or broadcast. In some embodiments the same one of unicast, multicast, or broadcast is used for both first and second user designations for a given segment. In other embodiments a mixture between two different ones of unicast, multicast and broadcast is used with the first and second users corresponding to different ones of unicast, multicast and broadcast.

In some embodiments, the combination of ZSR QPSK modulation for first users and conventional modulation techniques, e.g., conventional QPSK, QAM for second users, with the non-zero ZSR QPSK modulation symbols having higher power levels than the second user modulation symbols is used in a broadcast environment. For example, every or most user in the cell may including users at the edge of the cell should be able to receive and successfully decode the ZSR signals, while a limited group of users, e.g., those with better quality channel conditions, e.g., closer to the base station may be able to receive the second user signals. In some embodiments, different resolution or different quality signals are communicated via first user signaling and second user signaling. For example, first user signaling may include coarse resolution video signals, which second user signaling may be used to achieve finer resolution video signals.

A receiver receiving a signal transmitted can use Soft-In-Soft-Out demodulation techniques to efficiently decode the signals transmitted using a zero symbol rate.

Soft demodulation of position-modulated QPSK block will now be discussed. The following discussion describes an exemplary demodulation method that applies to the case where 1 out of 2/4/8 symbols is non-zero QPSK. The case that 1 out of 4 or 8 symbols is a zero symbol would differ somewhat from the described method but will be readily apparent to those skilled in the art in view of the teachings of the present application.

The principle of a soft-in soft-out algorithm applying to a group of bits satisfying certain constraints is well understood. Given respective a priori information (soft-in messages) of these bits, the algorithm calculates updated, or a posteriori, beliefs (soft-out messages) of these bits using the constraints satisfied by these bits. Often, the optimal maximum a posteriori (MAP) update is feasible; other times, an approximated suboptimal update replaces a MAP decision.

A SISO module is ideal in iterative decoding and/or demodulation. For example, iterative SISO decoding of two convolution codes renders the amazing performance of turbo codes; iterative SISO decoding and SISO demodulation approximate the optimal joint decoding-demodulation decision.

We consider a sub-block, of $2^{(k-2)}$ MTUs, modulated using k bits b0, b1, ..., b(k-1). There is one and only one nonzero (QPSK) symbol inside this sub-block. We assume that the first (k-2) bits determine the position of the QPSK symbol and the last 2 bits determine the phase of the QPSK symbol. Without loss of generality, let's assume the one-to-one mapping between position x and (k-2)-tuple pb=(b0, ..., b(k-3)) is that pb is the binary expansion of y, in other words, bit-sequence (b0, b1, ..., b(k-3)) means the QPSK symbol position is x=b0+b1*2+b2*4+ ... +b(k-3)*(2<<(k-3)). For convenience, let the 4 phases of QPSK symbols be PI/4, PI/2+PI/4, 2*(PI/2)+PI/4, 3*(PI/2)+PI/4 and be indexed as 0, 1, 2, 3. We assume bits (b(k-2), b(k-1)) determine the index y to be (b(k-2)+b(k-1)*2). This arrangement simplifies the extraction of soft-information of bits, but it is not essential. A different arrangement of bits will render algorithms identical in essence.

We now describe a soft-in soft-out (SISO) demodulation for such a position-modulated QPSK block. For simplicity, henceforth we assume k=4. The 4-bits uniquely determines the modulation among (2<<4=16) possible cases, which are C[0][0]: QPSK symbol at $0^{th}$ symbol, with phase index 0;
C[0][1]: QPSK symbol at $0^{th}$ symbol, with phase index 1;
C[0][2]: QPSK symbol at $0^{th}$ symbol, with phase index 2;
C[0][3]: QPSK symbol at $0^{th}$ symbol, with phase index 3;
C[1][0]: QPSK symbol at $1^{th}$ symbol, with phase index 0;
...
C[3][2]: QPSK symbol at $3^{th}$ symbol, with phase index 2;
C[3][3]: QPSK symbol at $3^{th}$ symbol, with phase index 3.

The soft-in (a priori) messages about bits (b0, b1, ..., b3) are soft_in[0], soft_in[1], ..., soft_in[3] and we would like to calculate MAP soft decision soft_out[0], soft_out[1], ..., soft_out[3] given the constraint that received symbols (r0, ..., r3) are the noisy version of the modulated symbols. Let's associate a log-likelihood metric T[m][n] to the case C[m][n]. Let us denote the logarithm of the conditional probability that C[m][n] is the transmitted symbol given what is received as I[m][n], e.g. I[m][n]=log (prob(C[m][n]|r0, r3)), which is proportional to log (prob(r0, ... r3|C[m][n])). Without a priori information, T[m][n] is identical to I[m][n] up to a constant shift. With a priori information, T[m][n]=I[m][n]+A[m]+S[n], where A[m] denotes the log-likelihood that the QPSK symbol at $0^{th}$ symbol and S[n] denotes the log-likelihood that the QPSK symbol has phase index n.

Before we describe the calculation of A[m] and S[n], let's see how we derive soft_out[j] when we have T[m][n].

For the position bits j=0, 1, soft_out[j]=LogSum_{m,n:m[j]=0}T[m][n]−LogSum_{m,n:m[j]=1}T[m][n], where m has the binary expansion (m[0],m[1]) and the LogSum operator is defined as LogSum(a,b)=log(exp(a)+exp(b)).

For the phase bits j=2,3, soft_out[j]=LogSum_{m,n:n[j]=0}T[m][n]−LogSum_{m,n:n[j]=1}T[m][n], Where n has the binary expansion (n[2],n[3]).

From the set of soft_out and soft_in messages, we can also derive extrinsic information ext[j]=soft_out[j]−soft_[n], which is the proper log-likelihood required in iterative decoding/demodulation module.

Now let's see how we obtain A[m] and S[n]. Again let m have the binary expansion (m[0],m[1]) and n have the binary expansion (n[2]m n[3]).

Then A[m]=sum_{j:m[j]=0} soft_in [j],

And S[n]=sum_{j: n[j]=0} soft_in[j].

Figure 21:
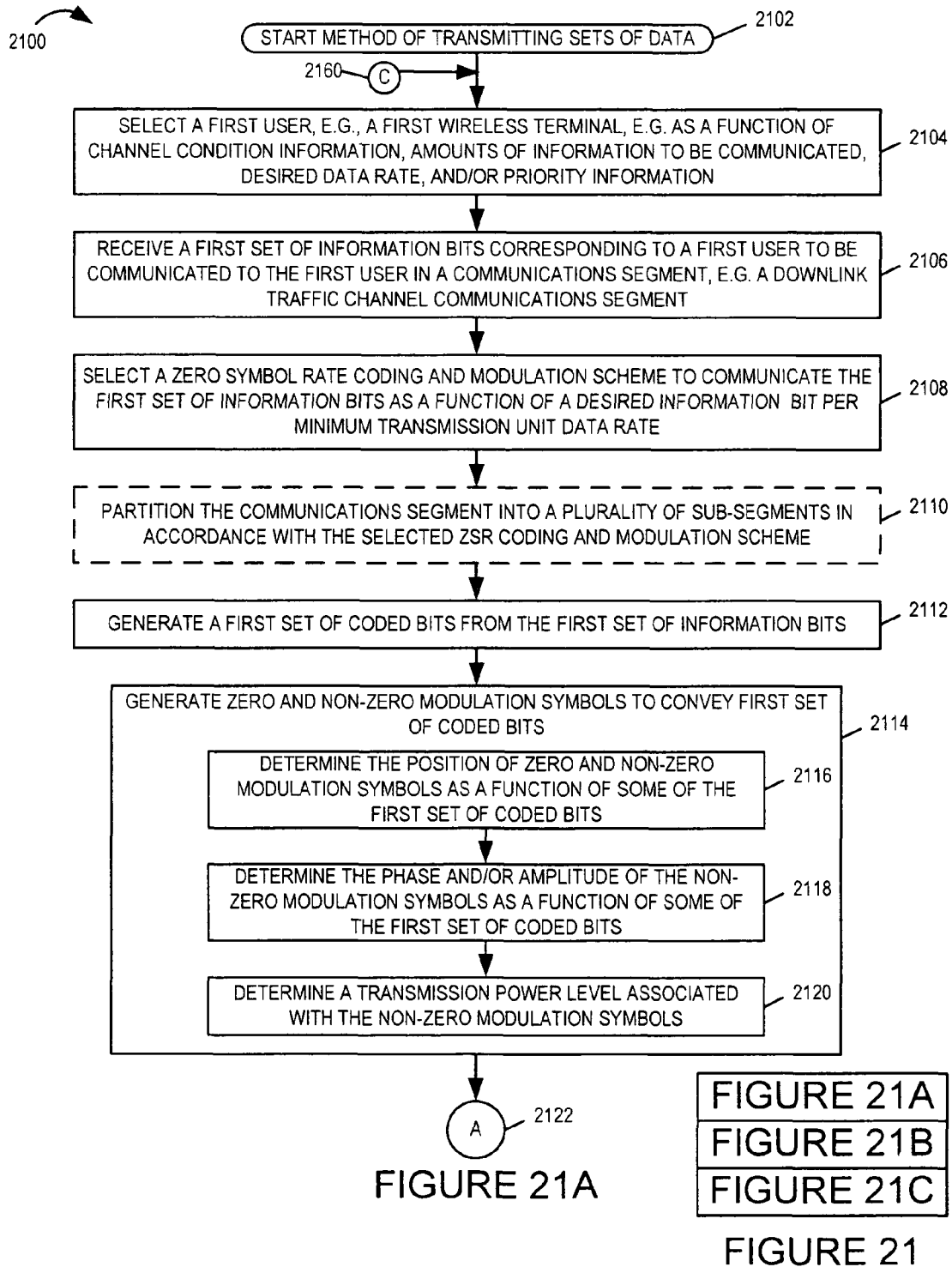
FIG. 21 is a drawing of a flowchart of an exemplary method of transmitting sets of data.
Figure 21B:
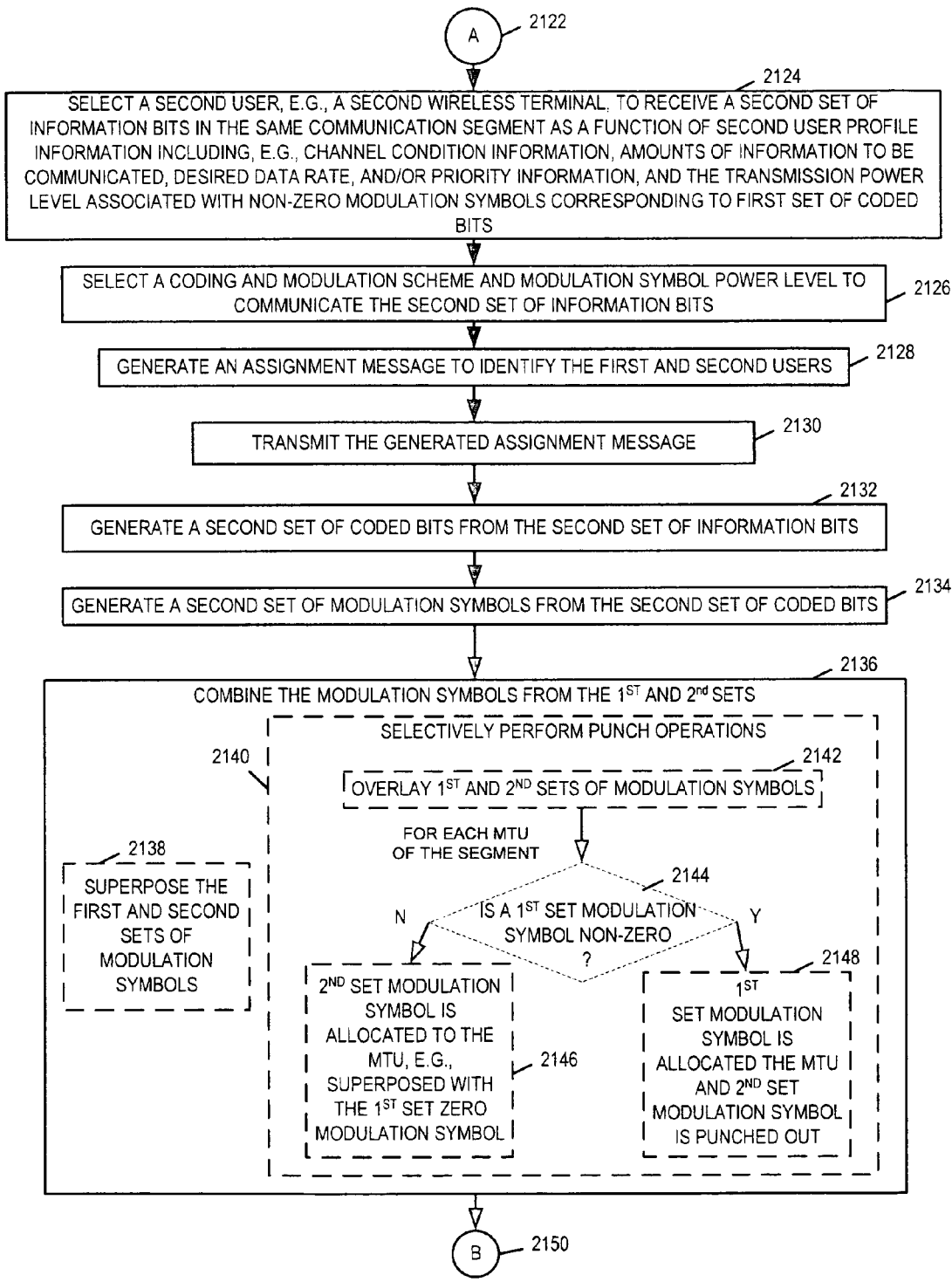
Figure 21C:
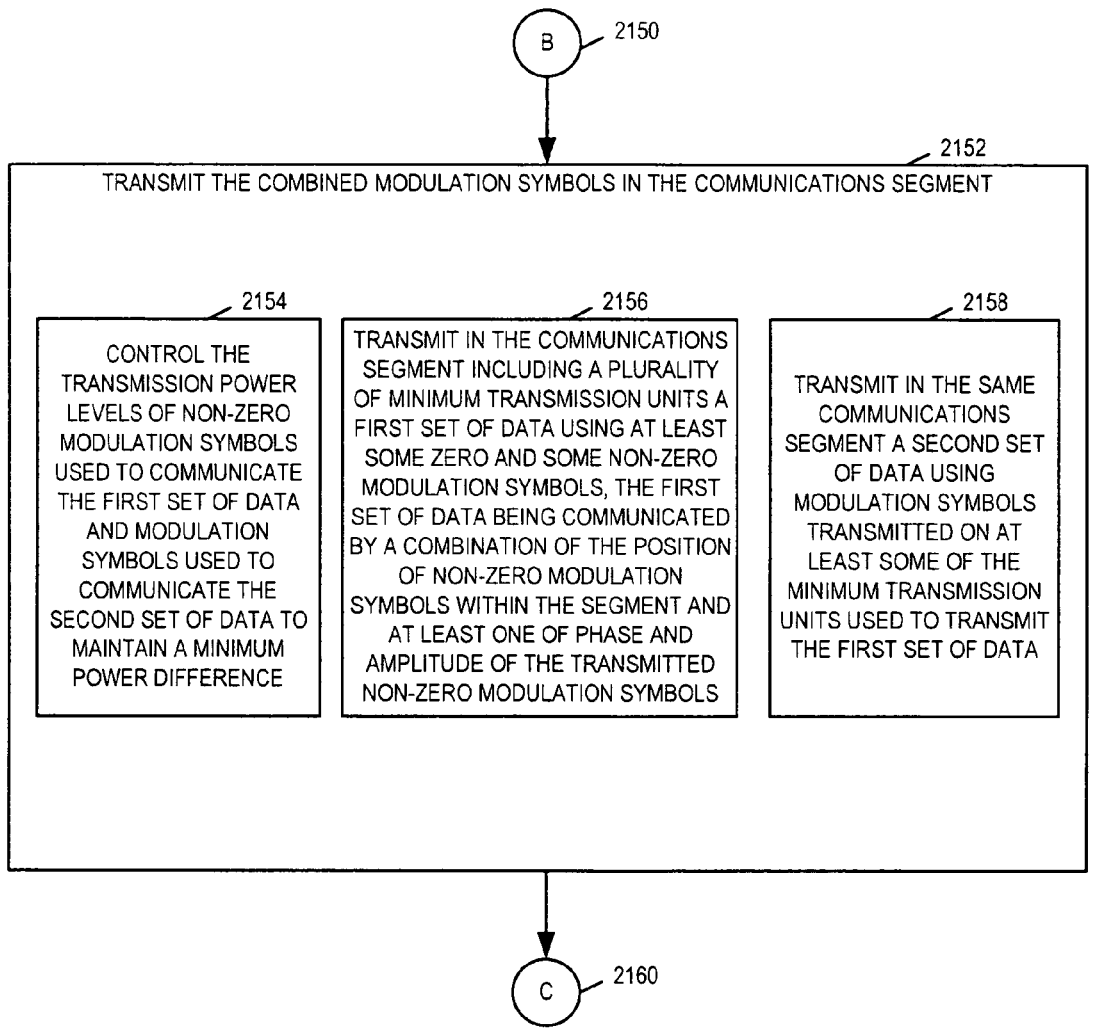

FIG. 21 is a drawing of a flowchart 2100 of an exemplary method of transmitting sets of data. The exemplary method of flowchart 2100 is well suited for operations in a wireless communications system where a base station is transmitting to multiple wireless terminals, e.g., an OFDM wireless communications system using segments such as downlink traffic channel segments. Operation of the exemplary method is started in step 2102, where the transmitting apparatus, e.g., a base station, is powered on and initialized. Operation proceeds from step 2102 to step 2104. In step 2104, the apparatus selects a first user, e.g., a first wireless terminal, e.g., as a function of channel condition information, amounts of information to be communicated, desired data rates, and/or priority information. Operation proceeds from step 2104 to step 2106. In step 2106, the apparatus receives a first set of information bits corresponding to the first user to be communicated to the first user in a communications segment, e.g., a downlink traffic channel segment. For example, the exemplary downlink traffic channel segment may include a fixed number of minimum transmission units, e.g., OFDM tone-symbols. Operation proceeds from step 2106 to step 2108.

In step 2108, the apparatus selects a zero symbol rate coding and modulation scheme to communicate the first set of information as a function of a desired information bit per minimum transmission unit data rate. For example, the selected zero symbol rate coding and modulation scheme may be one of a plurality of possible predetermined zero symbol rate coding and modulation schemes, e.g., different QPSK based ZSR coding and modulation schemes. An exemplary ZSR coding and modulation scheme may include a coding rate, a sub-segment size, a ZSR to be applied to sub-segments, a modulation type for non-zero modulation symbols, e.g., QPSK. In some embodiments different information bit data rate are associated with different zero symbol rate coding and modulation schemes. Operation proceeds from step 2108 to step 2110 in some embodiments, while in other embodiments operation proceeds from step 2108 to step 2112.

In step 2110, the apparatus partitions the communications segment into a plurality of sub-segments in accordance with the selected ZSR coding and modulation scheme. In various embodiments, the same ZSR coding and modulation scheme is used for each of sub-segments of the segment. In some embodiments, the same ZSR coding and modulation scheme is used for multiple sub-segments of the segment. In some embodiments, some portion of the segment may be left unused with respect to communicating the first set of information bits. Operation proceeds from step 2110 to step 2112.

In step 2112, the apparatus generates a first set of coded bits from the first set of information bits. Operation proceeds from set 2112 to step 2114. In step 2114, the apparatus generates zero and non-zero modulation symbols to convey the first set of coded bits. Step 2114 includes sub-step 2116, 2118, and 2120. In sub-step 2116, the apparatus determines the position of zero and non-zero modulation symbols as a function of some of the first set of coded bits. In sub-step 2118, the apparatus determines the phase and/or amplitude of the non-zero modulation symbols as a function of some of the first set of coded bits, and in sub-step 2120, the apparatus determines a transmission power level associated with the non-zero modulation symbols. For example, consider an example, where the ZSR has been selected to be ¾, where the non-zero modulation symbols are QPSK modulation symbols and where the sub-segment size is 4 minimum transmission units, e.g., 4 OFDM tone-symbols. In such an embodiment, corresponding to a sub-segment, there is one non-zero and there zero modulation symbols in the sub-segment. The location of the one non-zero modulation symbol is used to convey two coded bits and the phase of the non-zero modulation symbol is used to convey two additional coded bits. A transmission power level is determined and associated with the non-zero QPSK modulation symbol.

In some embodiments, the first set of data, first set of information bits, includes data having a first priority and data having a second priority, the second priority being lower than the first priority. In some such embodiments, the high priority data is communicated through position encoding of the non-zero modulation symbols, and the low priority data is communicated through phase encoding.

Operation proceeds from step 2114 via connecting node A 2122 to step 2124. In step 2124, the apparatus selects a second user, e.g., a second wireless terminal, to receive a second set of information bits in the same communications segment, the selection being performed as a function of second user profile information and/or the transmission power level associated with non-zero modulation symbols corresponding to the first set of coded bits. The second user profile information includes, e.g., channel condition information, amounts of information to be communicated, desired data rate, and/or priority information. Operation proceeds from step 2124 to step 2126. In various embodiments the first and second user are different, e.g., during at least some times. In some such embodiments, the steps of selecting first and second wireless terminals from a plurality of wireless terminals is based on information indicative of channel quality between the apparatus' transmitter used to perform the transmitting steps and the first and second wireless terminals, wireless terminals having different channel quality conditions being selected as first and second wireless terminals. In some embodiments at some times the first and second wireless terminal may be the same wireless terminal, e.g., with the first set of data corresponding to a low data rate application and the second set of data corresponding to a high data rate application.

In step 2126, the apparatus selects a coding and modulation scheme and modulation symbol power level to communicate the second set of information bits. For example, in some embodiments, the coding and modulation used to communicate the second set of bits includes block encoding at one of a plurality of different coding rates and a modulation method such as, e.g., one of QPSK, QAM16, QAM64, and QAM256. In some embodiments, the information bit per minimum transmission unit (MTU) data rates that may be selected corresponding to the second set of information bits are higher than the information bit per MTU data rates that may be selected corresponding to the first set of information bits.

Operation proceeds from step 2126 to step 2128. In step 2128, the apparatus generates an assignment message or messages to identify the first and second users corresponding to the communications segment. Operation proceeds from step 2128 to step 2130. In step 2130, the apparatus transmits the generated assignment message or messages. Operation proceeds from step 2130 to step 2132.

In step 2132, the apparatus generates a second set of coded bits from the second set of information bits, e.g., as part of a block encoding operation for the communications segment. Operation proceeds from step 2132 to step 2134. In step 2134, the apparatus generates a second set of modulation symbols from the second set of coded bits, e.g., a set of modulation symbols using one of a QPSK constellation, a QAM16 constellation, a QAM16 constellation, and a QAM256 constellation in accordance with the selection of step 2126. Different numbers of coded bits are mapped to a modulation symbol depending upon the type of modulation constellation being used. Operation proceeds from step 2134 to step 2136.

In step 2136, the apparatus combines the modulation symbols from the $1^{st}$ and $2^{nd}$ sets. Two alternative embodiments are illustrated in step 2136. In the first alternative, step 2138 is performed, in which the first set of modulation symbols and the second set of modulation symbols are superposed. In the second alternative step 2140 is performed in which the apparatus performs selective punch operations. Step 2140 includes sub-steps 2142, 2144, 2146 and 2148. In sub-step 2142, the apparatus overlays $1^{st}$ and $2^{nd}$ sets of modulation symbols. Then, for each MTU of the segment for which there is an overlap, step 2144 is performed. In step 2144, the apparatus checks and determines if a $1^{st}$ set modulation symbol corresponding to the MTU location is a non-zero modulation symbol. If it is a non-zero modulation symbol, then operation proceeds from step 2144 to step 2148; otherwise operation proceeds to step 2146. In step 2148, the apparatus allocates the $1^{st}$ set modulation symbol to the MTU and the $2^{nd}$ set modulation symbol is punched out. In step 2146, the $2^{nd}$ set modulation symbol is allocated to the MTU, e.g., superposed with the $1^{st}$ set zero modulation symbol. For MTUs of the segment in which there is no overlap between $1^{st}$ and $2^{nd}$ sets of modulation symbols but in which a modulation symbol from one of the $1^{st}$ and $2^{nd}$ set is mapped to the MTU, the modulation symbol is allocated to use the MTU. Operation proceeds from step 2136 via connecting node B 2150 to step 2152.

In step 2152, the apparatus transmits the combined modulation symbols in the communications segment. Step 2152 includes steps 2154, 2156, and 2158.

In step 2154, the apparatus controls the transmission power level of non-zero modulation symbols used to communicate the first set of data, first set of information bits, and modulation symbols used to communicate the second set of data, second set of information bits, to maintain a minimum power difference. The minimum power difference is such that non-zero modulation symbols used in communicating the first set of data are transmitted at a higher power level than non-zero modulation symbols used to communicate the second set of data.

In step 2156, the apparatus transmits in the communications segment including a plurality of minimum transmission units, e.g., OFDM tone-symbols, the first set of data, first set of information bits, using at least some zero and some non-zero modulation symbols, the first set of data being communicated by a combination of the position of non-zero modulation symbols within the segment and at least one of phase and amplitude of the transmitted non-zero modulation symbols. For example, step 2156, in some embodiments, includes transmitting into the communications segment modulation symbols following a zero symbol rate QPSK modulation scheme, e.g., using sub-segments.

In step 2158, the apparatus transmits in the same communications segment a second set of data, second set of information bits, using modulation symbols transmitted on at least some of minimum transmission units used to transmit the first set of data. For example, step 2156, in some embodiments, includes transmitting into the communications segment using one of a QPSK, QAM16, QAM64 and QAM256 modulation symbols. In some such embodiments, some of the modulation symbols from the second set have been punched out by non-zero modulation symbols from the first set.

Operation proceeds from step 2152 via connecting node C 2160 to step 2104, where the apparatus performs operations for another transmission segment.

In some embodiments, transmitting a first set of data includes transmitting information at a first information bit per minimum transmission unit data rate and transmitting a second set of data includes transmitting information at a second information bit per minimum transmission unit data rate, the second information bit per minimum transmission unit data rate being different, e.g., higher than, the first information bit per minimum transmission unit data rate.

In the exemplary embodiment, the apparatus selects a zero symbol rate coding and modulation scheme from among a plurality of different zero symbol rate schemes supported by the apparatus, at least some of the different zero symbol rate schemes using different zero symbol rates, e.g., a ¾ ZSR and a ⅞ZSR. In some other embodiments, the apparatus uses a fixed zero symbol rate, e.g., a ¾ ZSR, for communicating the first set of information bits. In some embodiments, different coding rates are supported corresponding to one or more different ZSR symbol rates.

In various embodiments, the ZSR being used by the apparatus and information bit per MTU data rate satisfies one of more of the following: (i) the ZSR indicates a predetermined ZSR greater than or equal to 0.125 and the information bits per MTU used to transmit the first set of data is less than or equal to 1.5; (ii) the ZSR indicates a predetermined ZSR greater than or equal to 0.25 and the information bits per MTU data rate used to transmit the first set of data is less than or equal to 1; (iii) the ZSR indicates a predetermined ZSR greater than or equal to 0.5 and the information bits per MTU data rate used to transmit the first set of data is less than or equal to 0.5; (iv) the ZSR indicates a predetermined ZSR greater than or equal to 0.75 and the information bits per MTU data rate used to transmit the first set of data is less than or equal to ⅓; and (v) the ZSR indicates a predetermined ZSR greater than or equal to 0.875 and the information bits per MTU data rate used to transmit the first set of data is less than or equal to $0.1/6$.

In various other embodiments, a communications segment may include sub-segments using ZSR coding and modulation schemes, which may be different and/or different sub-segments may correspond to multiple wireless terminals, e.g. some sub-segments using a first ZSR coding and modulation scheme being used to communicate a first set of information bits to a first wireless terminal and some sub-segments using a second ZSR coding and modulation scheme corresponding to a third wireless terminal being used to communicate a third set of information bits. In embodiments, some of the sub-segments of the same segment may have different sizes, e.g., a 4 MTU size sub-segment corresponding to a ¾ ZSR coding and modulation scheme, and an 8 MTU size sub-segment corresponding to a ⅞ ZSR coding and modulation scheme. In some embodiments, the sub-segments within the segment are structured such that some of the MTUs of the segment do not correspond to a sub-segment.

Figure 22:
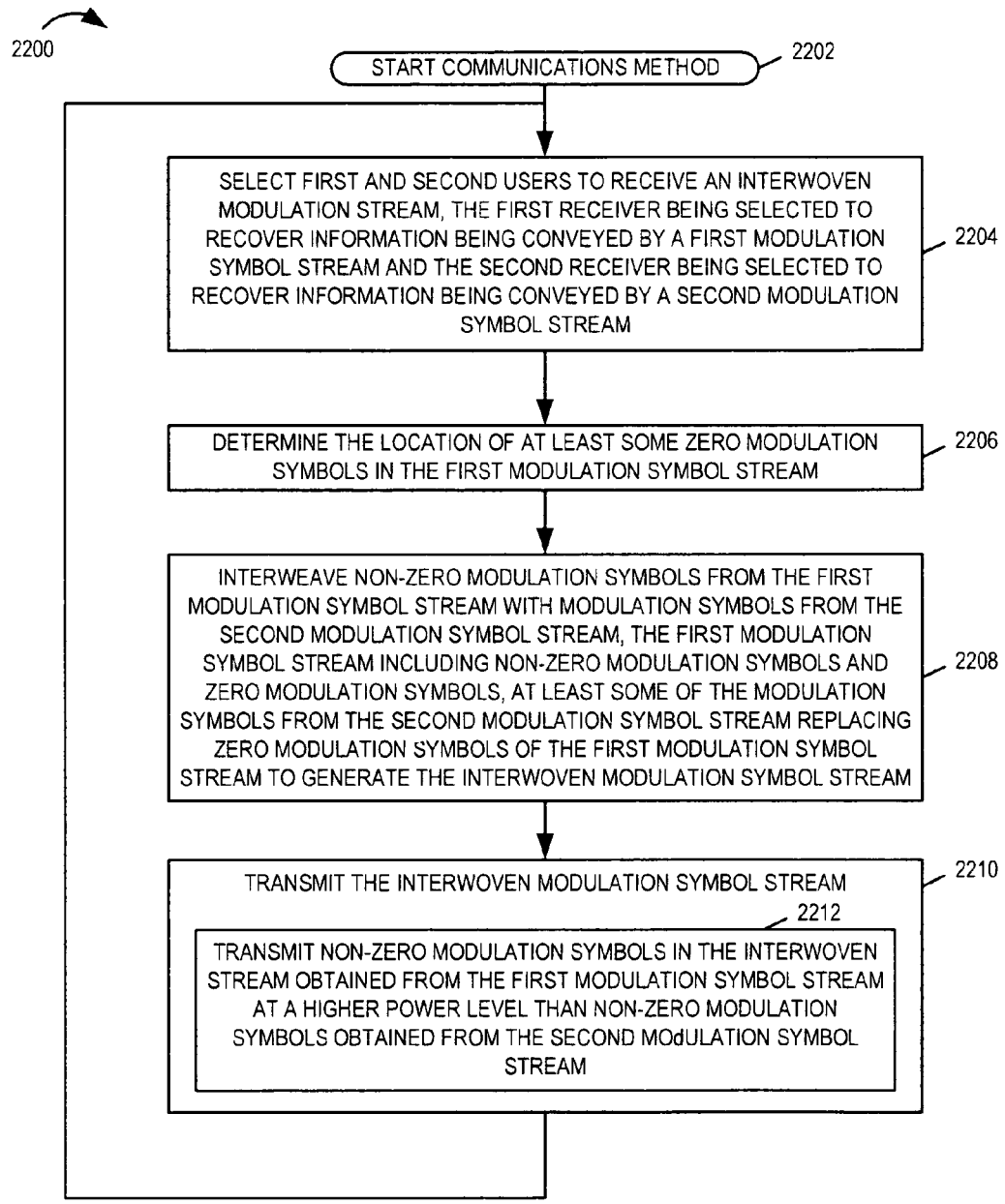
FIG. 22 is a drawing of a flowchart of an exemplary communications method.

FIG. 22 is a drawing of a flowchart 2200 of an exemplary communications method. The exemplary method of flowchart 2200 is well suited for operations in a wireless communications system, e.g., where a base station is transmitting to multiple wireless terminals. The exemplary wireless communications system is, e.g., an OFDM wireless communications system using segments such as downlink traffic channel segments. The method of flowchart 2200 will be explained in the context of an exemplary base station implementing the steps of the method; however, the method is also suitable for other communications applications.

Operation of the exemplary communications method starts in step 2202, where the base station is powered on and initialized. Operation proceeds from step 2202 to step 2204. In step 2204, the base station selects first and second users to receive an interwoven modulation symbol stream, the first user being selected to recover information being conveyed by the first modulation symbol stream and the second receiver being selected to recover information being conveyed by the second modulation symbol stream. In some embodiments, the first modulation symbol stream has a lower information data rate than the second modulation symbol stream. In various embodiments, the first and second users correspond to different users and are selected based on different transmitted power levels required for successful recovery of information being conveyed to the selected wireless terminal. Operation proceeds from step 2204 to step 2206.

In step 2206, the base station determines the location of at least some zero modulation symbols in the first modulation symbol stream. Operation proceeds from step 2206 to step 2208. In step 2208, the base station interweaves non-zero modulation symbols from the first modulation symbol stream with modulation symbols from the second modulation symbol stream, the first modulation symbol stream including non-zero modulation symbols and zero modulation symbols, at least some of the modulation symbols from the second modulation symbol stream replacing zero modulation symbols of the first modulation symbol stream to generate an interwoven modulation symbol stream. Replacing performed as part of the interweaving replaces a zero modulation symbol from the first modulation symbol stream corresponding to a determined location from step 2206 with a modulation symbol from the second modulation symbol stream. Operation proceeds from step 2208 to step 2210.

In step 2210, the base station transmits the interwoven modulation symbol stream. Step 2210 includes sub-step 2212. In step 2212, the base station controls the transmission power levels of the modulation symbols to transmit non-zero modulation symbols in the interwoven stream obtained from the first modulation symbol stream at a higher power level than non-zero modulation symbols obtained from the second modulation symbol stream.

In various embodiments, the transmitting of step 2210 includes transmitting modulation symbols from the interwoven modulation symbol stream using OFDM tone-symbols, e.g., an individual modulation symbol from the interwoven modulation symbol stream being conveyed by an individual tone-symbol of a communications segment, e.g., a downlink traffic channel segment.

In some embodiments, the first modulation symbol stream has a zero symbol rate, e.g., a selected zero symbol rate. In some such embodiments, the selected zero symbol rate is one of a plurality of predetermined zero symbol rates, e.g., a 1/2 ZSR, a 3/4 ZSR, a 7/8 ZSR, etc. The selected zero symbol rate is, in some embodiments, selected to be used for modulation symbols to be transmitted in a communications segment, e.g., a traffic channel segment. In some embodiments, the communications segment is sub-divided to include a plurality of sub-segments, the size of the sub-segment, e.g., in terms of minimum transmission units, e.g., OFDM tone-symbols, is such as to correspond to the selected zero symbol rate being used. For example, if a ZSR of 3/4 is used, some exemplary sub-segment sizes are 4 OFDM tone-symbols and 8 OFDM tone-symbols. If a ZSR of 7/8 is used, some exemplary sub-segment sizes are 8 OFDM tone-symbols and 16 OFDM tone-symbols.

In some embodiments, the non-zero modulation symbols of the first modulation symbol stream correspond to a first constellation and the non-zero modulation symbols of the second modulation symbol stream correspond to a second constellation, the first and second constellations being different. For example, the first constellation is, in some embodiments a QPSK constellation, and the second constellation is one of a QAM 16, QAM 64, and QAM 256 constellation.

Operation proceeds from step 2210 to step 2204, where the base station repeats the operation, e.g., for another communications segment.

In various embodiments such as those discussed above with respect to FIGS. 4 and 16, the first modulation symbol stream may include zero and non-zero modulation symbols used to communicate information corresponding to a first set of data at one or more selected zero symbol rates. In some embodiments the zero symbol rate is selected on a per segment basis. In other embodiments the zero symbol rate is selected on, e.g., a per sub-segment basis, wherein a sub-segment may correspond to a portion of a communications segment, e.g., a downlink traffic segment. In some embodiments a traffic channel segment is partitioned into sets of MTUs, each being a sub-segment of the partitioned traffic channel segment. In cases where the sub-segment size is the same size as the traffic channel segment, the partitioning step may be skipped. In some embodiments, the partitioning is performed in a uniform manner with the number of MTUs in a segment being an integer multiple of the number of MTUs in a sub-segment, e.g., an integer multiple equal to or greater than 2 in many embodiments. In at least some embodiments, the method involves including in at least a sub-segment zero modulation symbols and non-zero modulation symbols according to a ratio. The zero modulation symbols and non-zero modulation symbols which are included according to said ratio corresponding to the first set of data, said ratio being a ratio of integers, $N_Z/N_{SS}$, said ratio indicating a fractional proportion of the number of zero modulation symbols in the sub-segment corresponding to the first set of data to the total number of minimum transmission units in said sub-segment. In some implementations said ratio $N_Z/N_{SS}$ is one of 7/8, 3/4, 5/8, 1/2, 3/8, 1/4 and 1/8. Such ratios are particularly well suited for use with QPSK coding. In various embodiments sub-segment size for a sub-segment is one of 2, 3, 4, 5, 6, 7, and 8, where sub-segment size refers to the number of MTUs in the sub-segment. In various embodiments the sub-segment size is an integer multiple of one of 2, 3, 4, 5, 6, 7, and 8, where sub-segment size refers to the number of MTUs in the sub-segment. Such sub-segment sizes are convenient for supporting the zero symbol ratios. In some implementations, the segment size is an integer multiple of the sub-segment size, said integer multiple being at least 2, such a relationship facilitates efficient utilization of the available MTUs in the segment and relatively easy portioning since the sub-segments can be uniform in size. As discussed above, a combination of position and phase encoding can be used for communicating information bits being communicated by the symbol stream controlled to have one of the above described zero symbol rates. Different zero symbol rates can, and in some embodiments are, selected for use with different sub-segments of the same segment. Various variations are possible beyond those described.

In various embodiments nodes described herein are implemented using one or more modules to perform the steps corresponding to one or more methods, for example, selecting a first user, selecting a first user coding and modulation scheme, selecting a second user, performing first user encoding and modulation, performing second user coding, superimposing generated modulation signals, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above description. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the described methods.

The techniques of various embodiments may be implemented using software, hardware and/or a combination of software and hardware. Various embodiments are directed to apparatus, e.g., mobile nodes such as mobile terminals, base stations, communications system. It is also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus, are applicable to a wide range of communications systems including many non-OFDM and/or non-cellular systems.

Numerous additional variations on the methods and apparatus described above will be apparent to those skilled in the art in view of the above description. Such variations are to be considered within scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the described methods.

What is claimed is:

1. A method of transmitting sets of data, the method comprising operating a communications device to perform the steps of:
    transmitting in a transmission segment including a plurality of minimum transmission units, a first set of data using at least some non-zero modulation symbols and some zero modulation symbols, the first set of data being communicated by a combination of position coding with the position of non-zero modulation symbols within the first segment communicating at least some information and at least one of phase and amplitude modulation of the transmitted non-zero modulation symbols communicating additional information; and
    transmitting in said transmission segment a second set of data using modulation symbols transmitted on at least some of said minimum transmission units used to transmit said first set of data.

2. The method of claim 1, wherein said minimum transmission unit is an OFDM tone-symbol.

3. The method of claim 1, further comprising:
    controlling the transmission power levels of non-zero modulation symbols used to communicate said first set of data and modulation symbols used to communicate said second set of data to maintain a minimum power difference.

4. The method of claim 3, wherein said minimum power difference is such that the non-zero modulation symbols used in communicating the first set of data are transmitted at a higher power level than non-zero modulation symbols used to communicate the second set of data.

5. The method of claim 1, wherein transmitting a first set of data includes transmitting information at a first information bit per minimum transmission unit data rate; and
    wherein transmitting a second set of data includes transmitting information at a second information bit per minimum transmission unit data rate, said second information bit per minimum transmission unit data rate being different from the first information bit per minimum transmission unit data rate.

6. The method of claim 5, wherein the second information bit per minimum transmission unit data rate is higher than said first information bit per minimum transmission unit data rate.

7. The method of claim 5, further comprising, prior to said step of transmitting a first set of data:
    including in at least a portion of said segment non-zero modulation symbols and zero modulation symbols according to a predetermined zero symbol rate, said modulation symbols which are included according to said predetermined zero symbol rate corresponding to the first set of data.

8. The method of claim 5, further comprising, prior to said step of transmitting a first set of data:
    including in at least a portion of said segment non-zero modulation symbols and zero modulation symbols according to one of a plurality of ratios, said ratios indicating predetermined zero symbol rates, said modulation symbols which are included according to one of the plurality of ratios corresponding to the first set of data.

9. The method of claim 8, wherein said one of a plurality of ratios indicates a predetermined zero symbol rate that is greater than or equal to 0.125 when the information bits per minimum transmission unit data rate used to transmit said first set of data is less than or equal to 1.5.

10. The method of claim 8, wherein if said one of a plurality of ratios is greater than or equal to 0.125, the information bits per minimum transmission unit data rate used to transmit said first set of data is less than or equal to 1.5; and
    wherein if said one of a plurality of ratios is greater than or equal to 0.25, the information bits per minimum transmission unit data rate used to transmit said first set of data is less than or equal to 1.

11. The method of claim 8, wherein said one of a plurality of ratios is greater than or equal to 0.5 when the information bits per minimum transmission unit data rate used to transmit said first set of data is less than or equal to 0.5.

12. The method of claim 8, wherein said one of a plurality of ratios is greater than or equal to 0.75 when the information bits per minimum transmission unit data rate used to transmit said first set of data is less than or equal to 1/3.

13. The method of claim 8, wherein said one of a plurality of ratios is greater than or equal to 0.875 when the information bits per minimum transmission unit data rate used to transmit said first set of data is less than or equal to 1/6.

14. The method of claim 8, wherein said transmitting a first set of data includes using QPSK modulation to transmit non-zero symbol values.

15. The method of claim 8, wherein said transmitting a first set of data includes using QPSK modulation to transmit non-zero modulation symbol values;
    wherein if said one of a plurality of ratios is greater than or equal to 0.75, the information bits per minimum transmission unit data rate used to transmit said first set of data is less than or equal to 1/3; and wherein if said one of a plurality of ratios is greater than or equal to 0.875, the information bits per minimum transmission unit data rate used to transmit said first set of data is less than or equal to 1/6.

16. The method of claim 8, further comprising:
partitioning, for use in transmitting said first set of data, said channel segment into a plurality of sub-segments, said portion being one of said sub-segments.

17. The method of claim 16, wherein said segment is not partitioned for use in transmitting said second set of data.

18. The method of claim 8, further comprising, prior to said transmitting the first set of data:
coding information bits included in said first set of data to generate coded information bits;
determining the position of at least one non-zero symbol value in said portion based on the value of at least one of the coded information bits; and
determining at least one of the phase and amplitude of said non-zero modulation symbol based on the value of at least another one of the coded information bits.

19. The method of claim 8, wherein said first set of data includes data having a first priority and data having a second priority, said second priority being lower than said first priority;
wherein said high priority data is communicated through position encoding which includes at least said step of determining the position of at least one non-zero modulation symbol value; and
wherein said low priority data is communicated through phase encoding.

20. The method of claim 1, further comprising, prior to said step of transmitting a first set of data:
including in at least a sub-segment of said segment zero modulation symbols and non-zero modulation symbols according to a ratio, said zero modulation symbols and non-zero modulation symbols which are included according to said ratio corresponding to the first set of data, said ratio being a ratio of positive integers, Nz/Nss, said ratio indicating a fractional proportion of the number of zero modulation symbols in the sub-segment corresponding to the first set of data to the total number of minimum transmission units in said sub-segment.

21. The method of claim 20, wherein said ratio Nz/Nss is one of 7/8, 3/4, 5/8, 1/2, 3/8, 1/4 and 1/8.

22. The method of claim 20, wherein the sub-segment size is one of 2, 3, 4, 5, 6, 7, and 8, said sub-segment size indicating the number of minimum transmission units in the sub-segment.

23. The method of claim 20, wherein the sub-segment size is an integer multiple of one of 2, 3, 4, 5, 6, 7, and 8.

24. The method of claim 20, wherein Nss is a multiple of two; and wherein Nz is an odd number.

25. The method of claim 19, wherein the segment size is an integer multiple of a sub-segment size, said integer multiple being at least 2, said sub-segment size indicating the number of minimum transmission units in the sub-segment.

26. The method of claim 20, further comprising:
including in another sub-segment of said segment non-zero modulation symbols and zero modulation symbols according to a second ratio, said non-zero modulation symbols and non-zero modulation symbols which are included according to said second ratio corresponding to the first set of data, said second ratio being a second ratio of integers, $N_{Z2}/N_{SS2}$, said second ratio indicating a fractional proportion of the number of zero modulation symbols in the second sub-segment corresponding to the first set of data to the total number of minimum transmission units in said second sub-segment, the second ratio being different from the first ratio.

27. The method of claim 1, wherein said segment is a downlink traffic channel segment, the method further comprising, prior to said steps of transmitting in a transmission segment a first set of data and transmitting in a transmission segment a second set of data:
transmitting assignment information indicating a first wireless terminal to which said segment was assigned for use in receiving said first set of data and indicating a second wireless terminal to which said segment was assigned for use in receiving the second set of data.

28. The method of claim 27, wherein said first and second wireless terminals are different, and wherein said method further includes:
selecting said first and second wireless terminals from a plurality of wireless terminals based on information indicative of channel condition quality between a transmitter used to perform said transmitting steps and said first and second wireless terminals, wireless terminals having different channel quality conditions being selected as said first and second wireless terminals.

29. The method of claim 1, further comprising:
combining at least some non-zero modulation symbols corresponding to the first set of data with at least some non-zero modulation symbols corresponding to the second set of data prior to transmitting said first and second sets of data.

30. The method of claim 29, wherein said step of combining includes punching at least some non-zero modulation symbols corresponding to the second set of data with non-zero modulation symbols used to communicate data from said first set of data.

31. A communications apparatus, the apparatus comprising:
means for processing a first set of data to generate a first set of modulation symbols including information to be communicated in a transmission segment including a plurality of minimum transmission units, the first set of modulation symbols including at least some non-zero modulation symbols and some zero modulation symbols, the first set of data being communicated by a combination of position coding with the position of non-zero modulation symbols within the first segment communicating at least some information and at least one of phase and amplitude modulation of the transmitted non-zero modulation symbols communicating additional information;
means for processing a second set of data to generate a second set of modulation symbols to be transmitted on at least some of said minimum transmission units used to transmit said first set of data; and
means for transmitting modulation symbols corresponding to said first segment generated by said means for processing a first set of data and means for processing a second set of data.

32. The apparatus of claim 31, wherein said minimum transmission unit is an OFDM tone-symbol.

33. The apparatus of claim 31, further comprising: means for controlling the transmission power levels of non-zero modulation symbols used to communicate said first set of data and modulation symbols used to communicate said second set of data to maintain a minimum power difference.

34. The apparatus of claim 33, wherein said minimum power difference is such that the non-zero modulation symbols used in communicating the first set of data are transmitted at a higher power level than non-zero modulation symbols used to communicate the second set of data.

35. The apparatus of claim 31, wherein said means for processing a first set of data includes means for coding and modulating information at a first information bit per minimum transmission unit data rate; and
wherein said means for processing a second set of data includes means for coding and modulating information at a second information bit per minimum transmission unit data rate, said second information bit per minimum transmission unit data rate being different from the first information bit per minimum transmission unit data rate.

36. The apparatus of claim 35, wherein the second information bit per minimum transmission unit data rate is higher than said first information bit per minimum transmission unit data rate.

37. The apparatus of claim 35, wherein said means for processing a first set of data includes means for selecting a zero symbol rate at which said means for processing a first set of data is to operate, said selected zero symbol rate being one of a plurality of zero symbol rates supported by said means for processing a first set of data, said zero symbol rate being a ratio of zero modulation symbols to zero modulation symbols and non-zero modulation symbols generated by said means for processing a first set of data.

38. The apparatus of claim 37, wherein said selected zero symbol rate is a zero symbol rate greater than or equal to 0.125 when the information bits per minimum transmission unit data rate used to transmit said first set of data is less than or equal to 1.5.

39. The apparatus of claim 37, wherein if said zero symbol rate is greater than or equal to 0.125, the information bits per minimum transmission unit data rate used to transmit said first set of data is less than or equal to 1.5; and
wherein if the zero symbol rate is greater than or equal to 0.25, the information bits per minimum transmission unit data rate used to transmit said first set of data is less than or equal to 1.

40. The apparatus of claim 37, wherein said selected zero symbol rate is a zero symbol rate greater than or equal to 0.5 when the information bits per minimum transmission unit data rate used to transmit first set of data is less than or equal to 0.5.

41. The apparatus of claim 37, wherein said selected zero symbol rate is a zero symbol rate greater than or equal to 0.75 when the information bits per minimum transmission unit data rate used to transmit said first set of data is less than or equal to ⅓.

42. The apparatus of claim 37, wherein said selected zero symbol rate is a zero symbol rate greater than or equal to 0.875 when the information bits per minimum transmission unit data rate used to transmit said first set of data is less than or equal to ⅙.

43. The apparatus of claim 37, wherein said means for processing a first set of data includes means for performing QPSK modulation to generate non-zero symbol values.

44. The apparatus of claim 37, wherein said means for processing a first set of data includes means for using QPSK modulation to generate non-zero modulation symbol values;
wherein if said selected zero symbol rate is greater than or equal to 0.75, the information bits per minimum transmission unit data rate used to transmit said first set of data is less than or equal to ⅓; and
wherein if said selected zero symbol rate is greater than or equal to 0.875, the information bits per minimum transmission unit used to transmit said first set of data is less than or equal to ⅙.

45. The apparatus of claim 37, further comprising: means for partitioning said channel segment into a plurality of sub-segments for use in transmitting said first set of data, said portion being one of said sub-segments.

46. The apparatus of claim 45, wherein said segment is not partitioned for use in transmitting said second set of data.

47. The apparatus of claim 37, further comprising,
means for coding information bits included in said first set of data to generate coded information bits prior to said transmitting the first set of data; means for determining the position of at least one non-zero symbol value in said portion based on the value of at least one of the coded information bits; and
means for determining at least one of the phase and amplitude of said non-zero modulation symbol based on the value of at least another one of the coded information bits.

48. The apparatus of claim 47, wherein said first set of data includes data having a first priority and data having a second priority, said second priority being lower than said first priority;
wherein said high priority data is communicated through position encoding; and
wherein said low priority data is communicated through phase encoding.

49. The apparatus of claim 31, wherein said segment is a downlink traffic channel segment, and
wherein said means for processing a first set of data encode and modulate information at a first information bit per minimum transmission unit data rate.

50. The apparatus of claim 49, further comprising:
means for selecting a wireless terminal from a plurality of wireless terminals based on information indicative of channel condition quality between a transmitter used to transmit to said wireless terminal and said wireless terminal.

51. The apparatus of claim 31, further comprising: means for combining at least some non-zero modulation symbols corresponding to the first set of data with at least some non-zero modulation symbols corresponding to the second set of data prior to transmitting said first and second sets of data.

52. The apparatus of claim 51, wherein said means for combining includes means for punching at least some non-zero modulation symbols corresponding to the second set of data with non-zero modulation symbols used to communicate data from said first set of data.

53. A non-transitory computer readable medium embodying instructions for controlling an apparatus to perform a method of transmitting sets of data, the method comprising:
transmitting in a transmission segment including a plurality of minimum transmission units, a first set of data using at least some non-zero modulation symbols and some zero modulation symbols, the first set of data being communicated by a combination of position coding with the position of non-zero modulation symbols within the first segment communicating at least some information and at least one of phase and amplitude modulation of the transmitted non-zero modulation symbols communicating additional information; and
transmitting in said transmission segment a second set of data using modulation symbols transmitted on at least some of said minimum transmission units used to transmit said first set of data.

54. The non-transitory computer readable medium of claim 53, wherein said minimum transmission unit is an OFDM tone-symbol.

55. The non-transitory computer readable medium of claim 53, further embodying instruction for:
controlling the transmission power levels of non-zero modulation symbols used to communicate said first set of data and modulation symbols used to communicate said second set of data to maintain a minimum power difference.

56. The non-transitory computer readable medium of claim 55, wherein said minimum power difference is such that the non-zero modulation symbols used in communicating the first set of data are transmitted at a higher power level than non-zero modulation symbols used to communicate the second set of data.

57. The non-transitory computer readable medium of claim 53, further embodying instructions for:
transmitting information at a first information bit per minimum transmission unit data rate as part of said step of transmitting a first set of data; and
transmitting information at a second information bit per minimum transmission unit data rate as part of said step of transmitting a second set of data, said second information bit per minimum transmission unit data rate being different from the first information bit per minimum transmission unit data rate.

58. The method of claim 1, further comprising:
performing, using said first set of data as an input, a combination of position coding and at least one of phase and amplitude modulation to generate a first modulation symbol stream having a predictable number of zero modulation symbols on average, said at least some non-zero modulation symbols and some zero modulation symbols used to transmit said first set of data being included in said first modulation symbol stream.

59. The method of claim 58, wherein the position of said zero modulation symbols in said first modulation symbol stream is a function of data included in said first set of data.

60. The method of claim 58, wherein said step of performing at least one of phase and amplitude modulation includes performing a QPSK modulation operation.

61. The method of claim 58, further comprising:
performing a modulation operation, using said second set of data, to generate a second stream of modulation symbols, said second stream of modulation symbols including said modulation symbols transmitted on said at least some of said minimum transmission units used to transmit said first set of data.

62. The method of claim 61, wherein non-zero modulation symbols corresponding to the first and second sets of data are transmitted at different power levels.

63. The method of claim 62, wherein non-zero modulation symbols corresponding to the first set of data are transmitted at a higher power level than non-zero modulation symbols corresponding to the second set of data.

* * * * *